(12) United States Patent
Yang et al.

(10) Patent No.: US 7,479,994 B2
(45) Date of Patent: Jan. 20, 2009

(54) IMAGE SENSOR HAVING RESOLUTION ADJUSTMENT EMPLOYING AN ANALOG COLUMN AVERAGING/ROW AVERAGING FOR HIGH INTENSITY LIGHT OR ROW BINNING FOR LOW INTENSITY LIGHT

(75) Inventors: Guang Yang, Annandale, NJ (US); Taner Dosluoglu, New York, NY (US)

(73) Assignee: Digital Imaging Systems GmbH, Kirchheim/Teck-Naben (DE)

( * ) Notice: Subject to any disclaimer, the term of this patent is extended or adjusted under 35 U.S.C. 154(b) by 842 days.

(21) Appl. No.: 10/999,875

(22) Filed: Nov. 30, 2004

(65) Prior Publication Data

US 2006/0113459 A1 Jun. 1, 2006

(30) Foreign Application Priority Data

Nov. 23, 2004 (EP) .................................. 04392044

(51) Int. Cl.
*H04N 5/217* (2006.01)
*H04N 3/14* (2006.01)
*H04N 5/335* (2006.01)

(52) U.S. Cl. ........................................ 348/241; 348/297
(58) Field of Classification Search .............. 348/229.1, 348/230.1, 222.1, 241, 362, 297
See application file for complete search history.

(56) References Cited

U.S. PATENT DOCUMENTS

| | | | |
|---|---|---|---|
| 3,971,065 A | 7/1976 | Bayer | 358/41 |
| 5,585,620 A | 12/1996 | Nakamura et al. | 250/208.1 |
| 5,949,483 A * | 9/1999 | Fossum et al. | 348/303 |
| 6,104,844 A | 8/2000 | Alger-Meunier | 382/312 |
| 6,166,367 A | 12/2000 | Cho | 250/208.1 |
| 6,519,371 B1 * | 2/2003 | Pain et al. | 382/288 |
| 6,628,330 B1 * | 9/2003 | Lin | 348/252 |

(Continued)

FOREIGN PATENT DOCUMENTS

EP 04 39 2044 6/2005

(Continued)

OTHER PUBLICATIONS

Elisenda Roca, "A Programmable Imager for Very High Speed Cellular Signal Processing", 1999, Journal of VLSI Signal Processing 23, pp. 305-318.*

(Continued)

*Primary Examiner*—David L Ometz
*Assistant Examiner*—Nicholas G Giles
(74) *Attorney, Agent, or Firm*—Saile Ackerman LLC; Stephen B. Ackerman; Billy Knowles

(57) ABSTRACT

A photo-sensor image resolution adjustment apparatus is in communication with an array of image photo-sensors that are organized in columns and rows and have multiple sensor types arranged in a pattern such as a Bayer pattern to detect light. The photo-sensor image resolution adjustment apparatus has a photo-sensor array decimation circuit to partition the array of image photo-sensors into a plurality of sub-groups. A column averaging circuit averages the light conversion electrical signals from common color photo-sensors within the sub-groups. A row averaging circuit averages the common color adjacent light conversion electrical signals from color adjacent rows within the sub-groups in high light intensity condition. In low light conditions, a row binning circuit integrates the common color adjacent light conversion electrical signals from color adjacent rows within the sub-groups.

70 Claims, 36 Drawing Sheets

U.S. PATENT DOCUMENTS

| | | | | |
|---|---|---|---|---|
| 6,721,464 | B2* | 4/2004 | Pain et al. | 382/312 |
| 6,839,452 | B1* | 1/2005 | Yang et al. | 382/103 |
| 7,154,075 | B2* | 12/2006 | Krymski | 250/208.1 |
| 7,319,218 | B2* | 1/2008 | Krymski | 250/208.1 |
| 2003/0133625 | A1* | 7/2003 | Pain et al. | 382/288 |
| 2004/0169752 | A1* | 9/2004 | Stark | 348/302 |
| 2004/0246354 | A1* | 12/2004 | Yang et al. | 348/308 |

OTHER PUBLICATIONS

"Frame-Transfer CMOS Active Pixel Sensor with Pixel Binning," by Zhimin Zhou et al., IEEE Trans. on Electron Devices, vol. 44, No. 10, Oct. 1997, pp. 1764-1768.

"A Programmable Imager for Very High Speed Cellular Signal Processing," by Roca et al., Journal of VLSI Signal Processing 23, 305-318(1999), pp. 305-318, XP-00232595.

"Progress in Voltage and Current Mode On-Chip Analog-to-Digital Converters for CMOS Image Sensors," Panicacci et al., Jan. 31, 1996, http://techreports.jpl.nasa.gov/1996/1006.html, found Jul. 13, 2004.

"Variable Resolution CMOS Current Mode Active Pixel Sensor", Coulombe et al., Proc.—The 2000 IEEE Int'l Symp. on Circuits & Sys., ISCAS 2000, vol. 2, pp. 293-296.

"Frame-Transfer CMOS Active Pixel Sensor with Pixel Binning", Zhen et al., IEEE Trans. on Electron Devices, Oct. 1997, vol. 44, No. 10, pp. 1764-1768.

Co-pending U.S. Appl. No. 10/997,383, filed Nov. 27, 2004, assigned to the same assignee, "A Column Averaging/Row Binning Circuit for Image Sensor Resolution Adjusting in Lower Intensity Light End".

Co-pending U.S. Appl. No. 10/999,843, filed Nov. 30, 2004, assigned to the same assignee, "A Column Averaging/Row Averaging Circuit for Image Sensor Resolution Adjustment in High Intensity Light Environment".

"A Programmable Imager for Very High Speed Cellular Signal Processing", Elisanda Roca, Jrnl. of VLSI Signed Proc., 1999 Kluwer Academic Pub., XP-002325952, pp. 305-318.

* cited by examiner

FIG. 1a – Prior Art

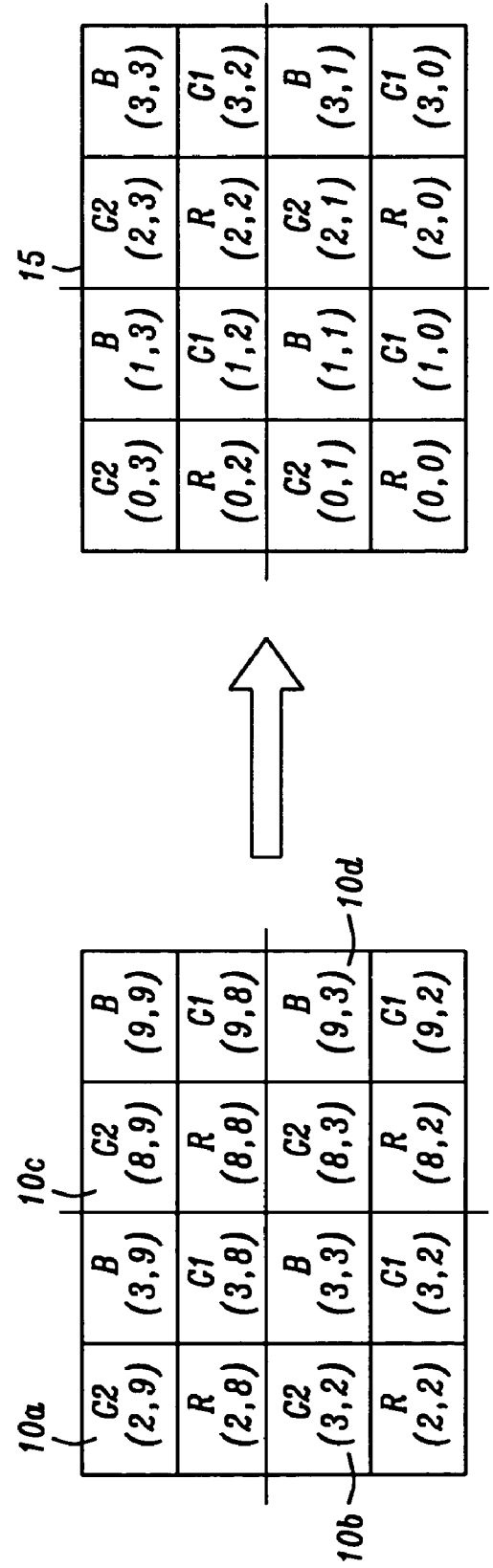
FIG. 1b – Prior Art

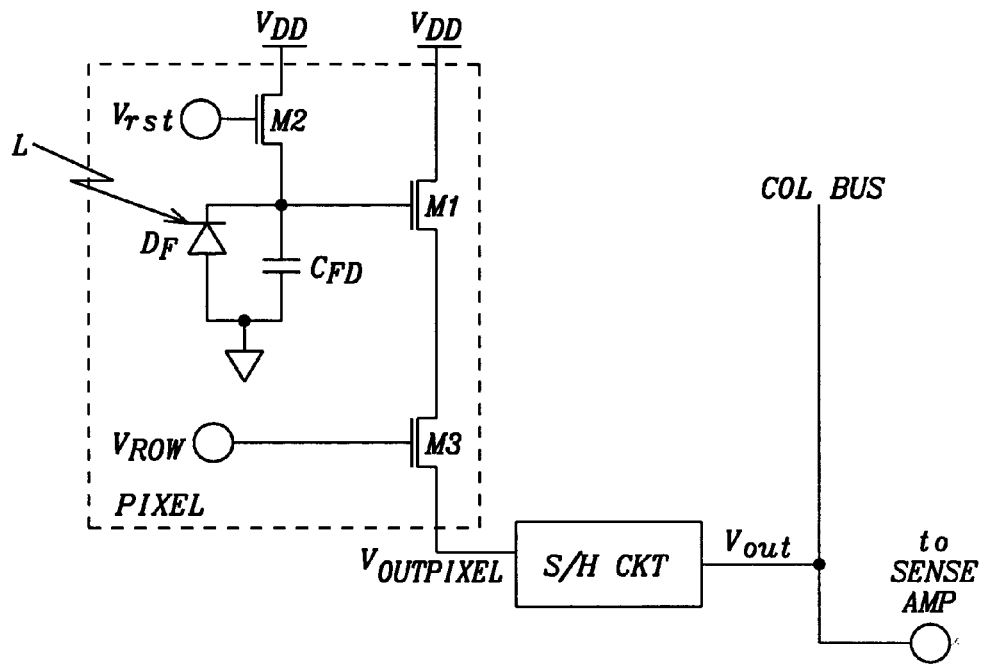
*FIG. 2 - Prior Art*
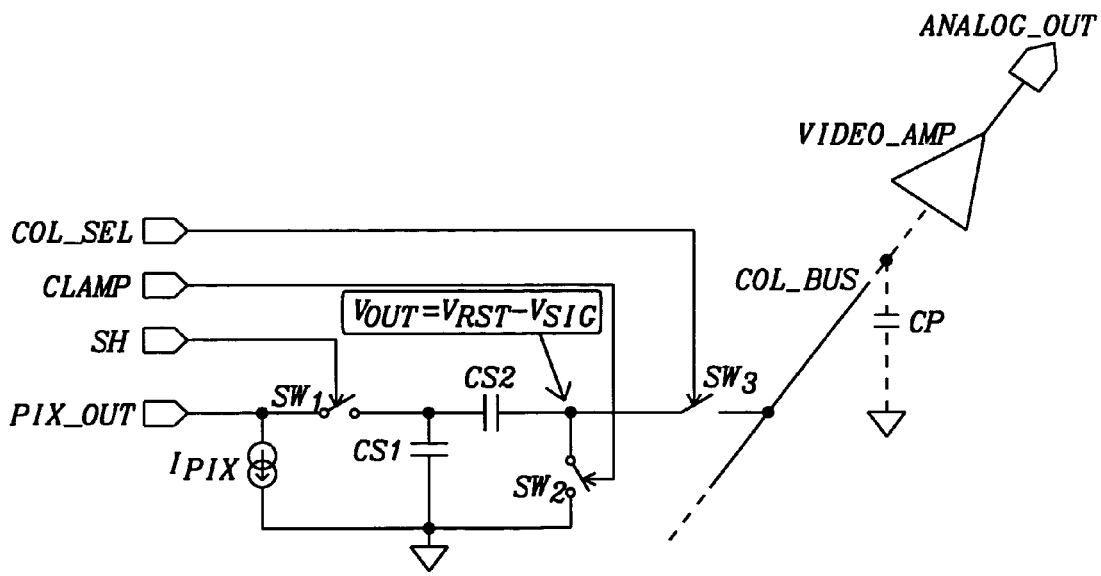
*FIG. 3 - Prior Art*

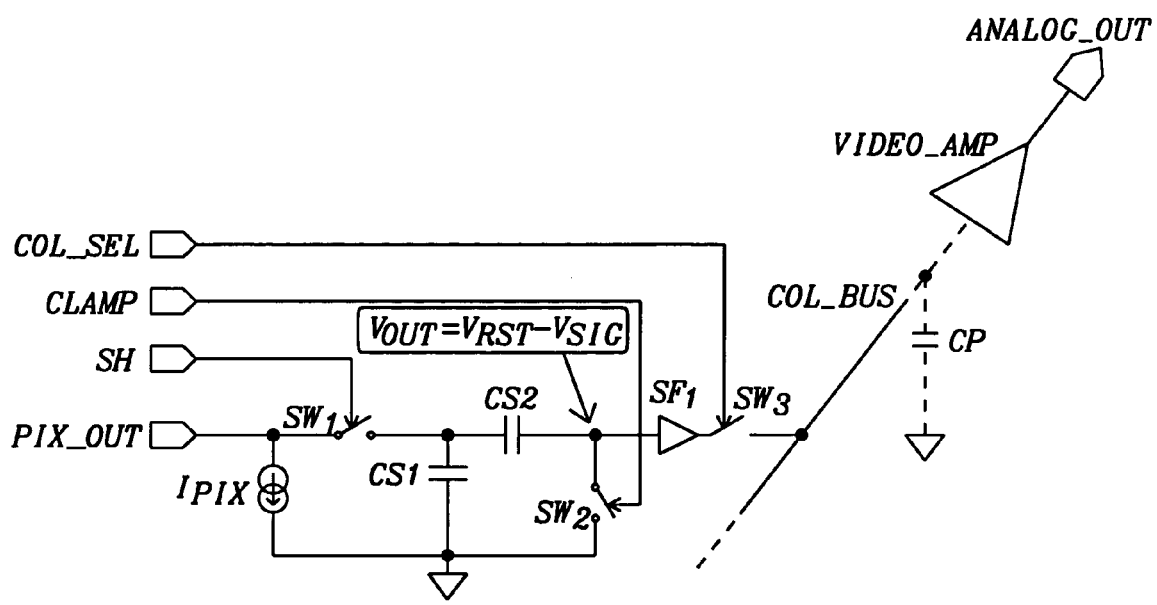
FIG. 4 – Prior Art

| Fig. 9a | Fig. 9b |
|---|---|
| Fig. 9c | Fig. 9d |

FIG. 9

| Fig. 10a |
|---|
| Fig. 10b |

FIG. 10

| Fig. 12a |
|---|
| Fig. 12b |
| Fig. 12c |

FIG. 12

| Fig. 14a |
|---|
| Fig. 14b |
| Fig. 14c |

FIG. 14

| Fig. 16a |
|---|
| Fig. 16b |
| Fig. 16c |

FIG. 16

| Fig. 17a |
|---|
| Fig. 17b |
| Fig. 17c |

FIG. 17

| Fig. 20a | Fig. 20b |
|---|---|
| Fig. 20c | Fig. 20d |

| CE[6K] | CE[6K+1] | CE[6K+2] | CE[6K+3] | CE[6K+4] | CE[6K+5] |
|---|---|---|---|---|---|
| AVERAGE_R | AVERAGE_C1 | AVERAGE_R | AVERAGE_C1 | AVERAGE_R | AVERAGE_C1 |
| {{R[6k,6l], R[6k+2,6l], R[6k+4,6l]}} | {{C1[6k+1,6l], C1[6k+3,6l], C1[6k+5,6l]}} | {{R[6k,6l+2], R[6k+2,6l+2], R[6k+4,6l+2]}} | {{C1[6k+1,6l+2], C1[6k+3,6l+2], C1[6k+5,6l+2]}} | {{R[6k,6l+4], R[6k+2,6l+4], R[6k+4,6l+4]}} | {{C1[6k+1,6l+4], C1[6k+3,6l+4], C1[6k+5,6l+4]}} |

| CO[6K] | CO[6K+1] | CO[6K+2] | CO[6K+3] | CO[6K+4] | CO[6K+5] |
|---|---|---|---|---|---|
| AVERAGE_C2 | AVERAGE_B | AVERAGE_C2 | AVERAGE_B | AVERAGE_C2 | AVERAGE_B |
| {{C2[6k,6l+1], C2[6k+2,6l+1], C2[6k+4,6l+1]}} | {{B[6k+1,6l+1], B[6k+3,6l+1], B[6k+5,6l+1]}} | {{C2[6k,6l+3], C2[6k+2,6l+3], C2[6k+4,6l+3]}} | {{B[6k+1,6l+3], B[6k+3,6l+3], B[6k+5,6l+3]}} | {{C2[6k,6l+5], C2[6k+2,6l+5], C2[6k+4,6l+5]}} | {{B[6k+1,6l+5], B[6k+3,6l+5], B[6k+5,6l+5]}} |

| CE[4(K+1)] | CE[6(k+1)+1] | CE[6(k+1)+2] | CE[6(K+1)+3] | CE[6(k+1)+4] | CE[6(K+1)+5] |
|---|---|---|---|---|---|
| AVERAGE_R | AVERAGE_C1 | AVERAGE_R | AVERAGE_C1 | AVERAGE_R | AVERAGE_C1 |
| {{R[6(k+1),6l], R[6(k+1)+2,6l], R[6(k+1)+2,6l]}} | {{C1[6(k+1)+1,6l], C1[6(k+1)+3,6l], C1[6(k+1)+6,6l]}} | {{R[6(k+1),6l+2], R[6(k+1)+2,6l+2], R[6(k+1)+4,6l+2]}} | {{C1[6(k+1)+1,6l+2], C1[6(k+1)+3,6l+2], C1[6(k+1)+5,6l+2]}} | {{R[6(k+1),6l+4], R[6(k+1)+2,6l+4], R[6(k+1)+4,6l+4]}} | {{C1[6(k+1)+1,6l+4], C1[6(k+1)+3,6l+4], C1[6(k+1)+5,6l+4]}} |

| CO[6(K+1)] | CO[6(k+1)+1] | CO[6(k+1)+2] | CO[6(K+1)+3] | CO[6(k+1)+4] | CO[6(K+1)+5] |
|---|---|---|---|---|---|
| AVERAGE_C2 | AVERAGE_B | AVERAGE_C2 | AVERAGE_B | AVERAGE_C2 | AVERAGE_B |
| {{C2[6(k+1),6l+1], C2[6(k+1)+2,6l+1], C2[6(k+1)+4,6l+1]}} | {{B[6(k+1)+1,6l+1], B[6(k+1)+3,6l+1], B[6(k+1)+5,6l+1]}} | {{C2[6(k+1),6l+3], C2[6(k+1)+2,6l+3], C2[6(k+1)+4,6l+3]}} | {{B[6(k+1)+1,6l+3], B[6(k+1)+3,6l+3], B[6(k+1)+5,6l+3]}} | {{C2[6(k+1),6l+5], C2[6(k+1)+2,6l+5], C2[6(k+1)+4,6l+5]}} | {{B[6(k+1)+1,6l+5], B[6(k+1)+3,6l+5], B[6(k+1)+5,6l+5]}} |

FIG. 13

| CE[2nk] | CE[2nk+1] |
|---|---|
| AVERAGE_R | AVERAGE_G1 |
| {R[2nk,2nl], R[2nk+2,2nl], ... R[2n(k+1)-2,2nl]} | {G1[2nk+1,2nl], G1[2nk+3,2nl], ... G1[2n(k+1)-1,2nl]} |

| CO[2nk] | CO[2nk+1] |
|---|---|
| AVERAGE_G2 | AVERAGE_B |
| {G2[2nk,2nl+1], G2[2nk+2,2nl+1], ... G2[2n(k+1)-2,2nl+1]} | {B[2nk+1,2nl+1], B[2nk+3,2nl+1], ... B[2n(k+1)-1,2nl+1]} |

| CE[2n(k+1)-2] | CE[2n(k+1)-1] |
|---|---|
| AVERAGE_R | AVERAGE_G1 |
| {R[2nk,2n(l+1)-2], R[2nk+2,2n(l+1)-2], ... R[2n(k+1)-2,2n(l+1)-2]} | {G1[2nk+1,2n(l+1)-2], G1[2nk+3,2n(l+1)-2], ... G1[2n(k+1)-1,2n(l+1)-2]} |

| CO[2n(k+1)-2] | CO[2n(k+1)-1] |
|---|---|
| AVERAGE_G2 | AVERAGE_B |
| {G2[2nk,2n(l+1)-1], G2[2nk+2,2n(l+1)-1], ... G2[2n(k+1)-2,2n(l+1)-1]} | {B[2nk+1,2n(l+1)-1], B[2nk+3,2n(l+1)-1], ... B[2n(k+1)-1,2n(l+1)-1]} |

| CE[2n(k+1)] | CE[2n(k+1)+1] |
|---|---|
| AVERAGE_R | AVERAGE_G1 |
| {R[2n(k+1),2nl], R[2n(k+1)+2,2nl], ... R[2n(k+2)-2,2nl]} | {G1[2n(k+1)+1,2nl], G1[2n(k+1)+3,2nl], ... G1[2n(k+2)-1,2nl]} |

| CO[2n(k+1)] | CO[2n(k+1)+1] |
|---|---|
| AVERAGE_G2 | AVERAGE_B |
| {G2[2n(k+1),2nl+1], G2[2n(k+1)+2,2nl+1], ... G2[2n(k+2)-2,2nl+1]} | {B[2n(k+1)+1,2nl+1], B[2n(k+1)+3,2nl+1], ... B[2n(k+2)-1,2nl+1]} |

| CE[2n(k+1)-2] | CE[2n(k+1)-1] |
|---|---|
| AVERAGE_R | AVERAGE_G1 |
| {R[2n(k+1),2n(l+1)-2], R[2n(k+1)+2,2n(l+1)-2], ... R[2n(k+2)-2,2n(l+1)-2]} | {G1[2n(k+1)+1,2n(l+1)-2], G1[2n(k+1)+3,2n(l+1)-2], ... G1[2n(k+2)-1,2n(l+1)-2]} |

| CO[2n(k+1)-2] | CO[2n(k+1)-1] |
|---|---|
| AVERAGE_G2 | AVERAGE_B |
| {G2[2n(k+1),2n(l+1)-1], G2[2n(k+1)+2,2n(l+1)-1], ... G2[2n(k+2)-2,2n(l+1)-1]} | {B[2n(k+1)+1,2n(l+1)-1], B[2n(k+1)+3,2n(l+1)-1], ... B[2n(k+2)-1,2n(l+1)-1]} |

FIG. 15

IMAGE SENSOR HAVING RESOLUTION ADJUSTMENT EMPLOYING AN ANALOG COLUMN AVERAGING/ROW AVERAGING FOR HIGH INTENSITY LIGHT OR ROW BINNING FOR LOW INTENSITY LIGHT

RELATED PATENT APPLICATIONS

"A Column Averaging/Row Averaging Circuit for Image Sensor Resolution Adjustment in High Intensity Light Environment Pixel," Ser. No. 10/999,843, Filing Date Nov. 30, 2004, assigned to the same assignee as this invention.

"A Column Averaging/Row Binning Circuit for Image Sensor Resolution Adjustment in Lower Intensity Light Environment," Ser. No. 10/997,383, Filing Date Nov. 24, 2004, assigned to the same assignee as this invention.

BACKGROUND OF THE INVENTION

1. Field of the Invention

This invention relates generally to image sensor array processing. More particularly, this invention relates to circuits and methods for adjusting resolution of image sensors. Even more particularly, this invention relates to circuits and methods for adjusting resolution of image sensors by decimating the addressing of the image sensors into sub-groups of the array of the image sensor, averaging the columns of each of the sub-groups of the image sensor, and selectively averaging in a high intensity light environment or binning in a low intensity light environment of multiple rows of the average of the columns of the sub-group of the array of the image sensors.

2. Description of Related Art

Digital Cameras employing CMOS image sensor technology include image processing and JPEG (Joint Photographic Experts Group) compression for adjusting the resolution of the camera. In general, the image sensor operates in several modes. It takes full resolution image in a relative lower speed (1 to 15 frames per second depending on the image format) which is stored in a memory. The image sensor must also acquire low resolution images at high speed (about 30 frames per second) for viewfinder or short video. In most of the CMOS image sensor designs, low resolution high speed images are acquired by decimation or partitioning the image array in to groups of pixels and choosing a sub-set of the group of pixels to sub-sample a sub-set of pixels within the group of pixels that has been selected to represent the whole image.

Figure 1A:
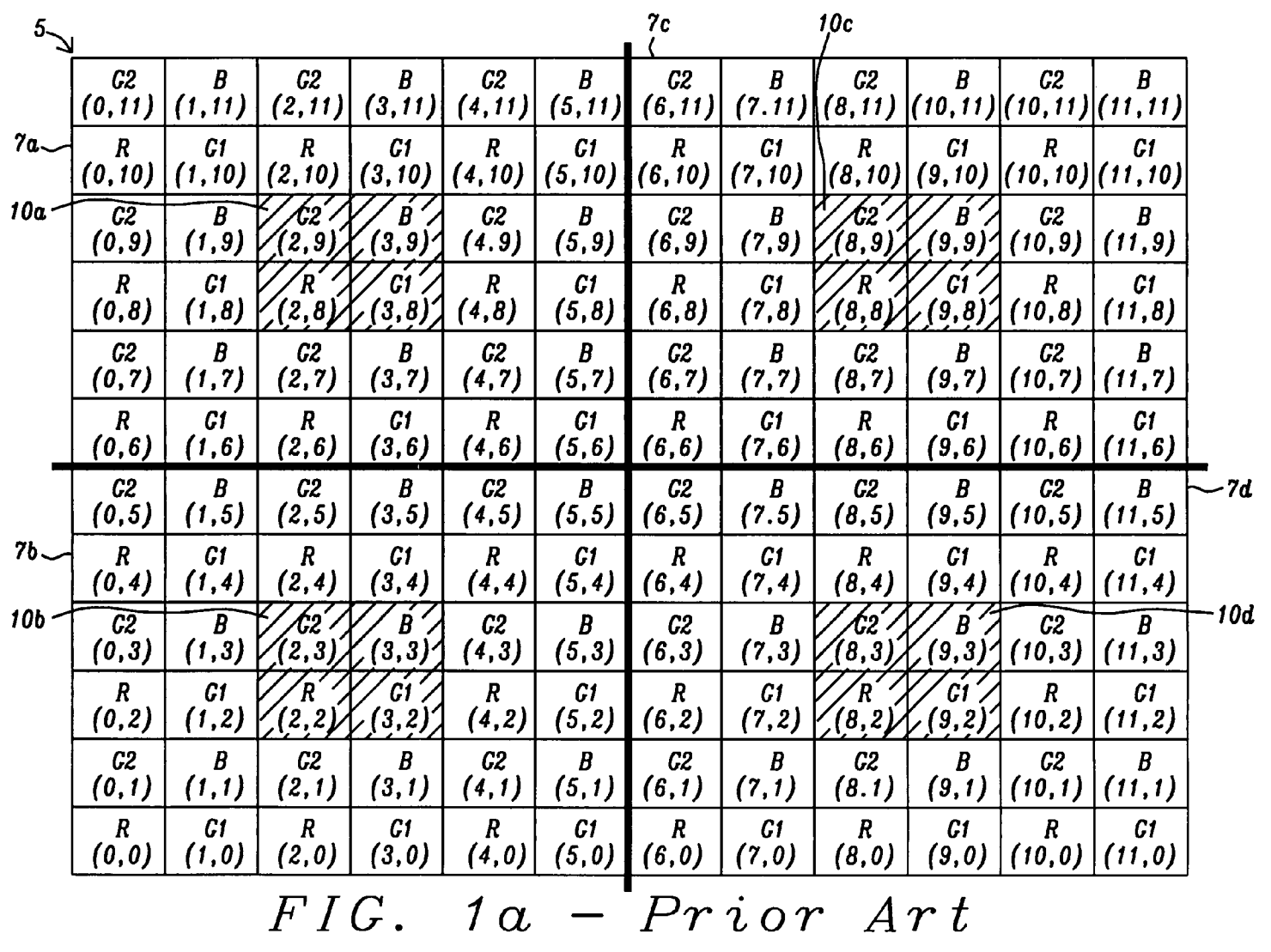

FIGS. 1a and 1b illustrate the sub-sampling of an array of Bayer pattern configured Complementary Metal Oxide Semiconductor (CMOS) Active Pixel Sensors (APS). The Bayer pattern, as shown in U.S. Pat. No. 3,971,065 (Bayer), describes a format for a color filter array. In the array as shown, the Bayer pattern has four sensors arranged in a two by two matrix of CMOS APS's. The CMOS APS's receive the Red, Green and Blue of the standard color video construction. One Pixel receives the Red, one the Blue, and the remaining two pixels receive the Green and are designated red (R), green-1 (G1), green-2 (G2), and blue (B).

In FIG. 1 the array is structured to illustrate a 3:1 ratio sub-sampling on the Bayer pattern. The array 5 of CMOS APS's shows a 6×6 array of the Bayer pattern sensors. The array 5 is physically an array having 12 pixels in the horizontal dimension and 12 pixels in the vertical dimension. The Bayer pattern groups these pixels into the 2×2 groups (Red, Green-1, Green-2, and Blue) of pixels. The sub-sampling then further groups the pixels according to the ratio of the sub-sampling. Thus, each sub-group 7a, 7b, 7c, and 7d has a 6×6 array of CMOS APS's that is further divided into a 3×3 Bayer pattern. In a sub-sampling, a central Bayer grouping of each sub-group 7a, 7b, 7c, and 7d is chosen as the output pixels $R^o$, $G1^o$, $G2^o$, and $B^o$ of the array.

In general, the output pixels as a function of original image pixel (not considering the fixed spatial offset) information are given by:

$$R^i(k,l) = [R(2 \times n \times k, 2 \times n \times l)]$$

$$G1^o(k,l) = [G1(2 \times n \times k+1, 2 \times n \times l)]$$

$$G2^o(k,l) = [G2(2 \times n \times k, 2 \times n \times l+1)]$$

$$B^o(k,l) = [B(2 \times n \times k+1, 2 \times n \times l+1)] \quad (1)$$

where:
- n is the decimation ratio of the sub-sampling of the array.
- k is the counting variable for a row dimension of the sub sampled array 15.
- I is the counting variable for the column dimension of the sub sampled array 15.
- $R^o$ is the red pixel of the sub sampled array 15.
- $G1^o$ is the first green pixel of the sub sampled array 15.
- $G2^o$ is the second green pixel of the sub sampled array 15.
- $B^o$ is the blue pixel of the sub sampled array 15.

Pixel sub-sampling reduces the output bandwidth that the frame rate can be increased with same pixel readout speed. However, the drawback of pixel sub-sampling is the lost of spatial resolution that will introduce aliasing to the image. In additional, the image obtained from pixel sub-sampling has a very poor quality at low light level because of the effective small sensing area.

The images sensors are increasing in size to accommodate the image formats such as the Super Extended Graphics Array (SXGA) display specification that is capable of displaying 1280×1024 resolution, or approximately 1.3 million pixels or the Quantum Extended Graphics Array (QXGA) display specification that is capable of supporting 2048×1536 resolution, or approximately 3.2 million pixels. As the image sensors become larger, and decimation ratio becomes higher, more and more image information will be lost due to pixel sub-sampling.

To enhance the spatial resolution of decimated image, pixel binning and/or averaging is desired. Thus, the output pixels $R^o$, $G1^o$, $G2^o$, and $B^o$ of the array 15 will represent all the information of its neighboring pixels of the sub-group 7a, 7b, 7c, and 7d of the original array 5 of CMOS APS's. In general, for the n×n pixel binning, the value of output pixels $R^o$, $G1^o$, $G2^o$, and $B^o$ are:

$$R^O(k, l) = \sum_{i=0}^{n-1}\sum_{j=0}^{n-1} [R(2 \times n \times k + 2 \times i, 2 \times n \times l + 2 \times j)] \quad (2)$$

$$G1^O(k, l) = \sum_{i=0}^{n-1}\sum_{j=0}^{n-1} [G1(2 \times n \times k + 2 \times i + 1, 2 \times n \times l + 2 \times j)]$$

$$G2^O(k, l) = \sum_{i=0}^{n-1}\sum_{j=0}^{n-1} [G2(2 \times n \times k + 2 \times i, 2 \times n \times l + 2 \times j + 1)]$$

$$B^O(k, l) = \sum_{i=0}^{n-1}\sum_{j=0}^{n-1} [B(2 \times n \times k + 2 \times i + 1, 2 \times n \times l + 2 \times j + 1)]$$

where:
- n is the decimation ratio of the sub-sampling of the array.
- i is the counting variable for the neighboring pixels in a row dimension of the sub sampled array 15.
- j is the counting variable for the neighboring pixels for a column dimension of the sub sampled array 15.
- k is the counting variable for a row dimension of the sub sampled array 15.
- l is the counting variable for the column dimension of the sub sampled array 15.
- $R^O$ is the red pixel of the sub sampled array 15.
- $G1^O$ is the first green pixel of the sub sampled array 15.
- $G2^O$ is the second green pixel of the sub sampled array 15.
- $B^O$ is the blue pixel of the sub sampled array 15.

Similarly, for n×n pixel averaging, the value of output pixels $R^O$, $G1^O$, $G2^O$, and $B^O$ are:

$$R^O(k,l) = \frac{1}{n \times n} \sum_{i=0}^{n-1} \sum_{j=0}^{n-1} [R(2 \times n \times k + 2 \times i, 2 \times n \times l + 2 \times j)] \quad (3)$$

$$G1^O(k,l) = \frac{1}{n \times n} \sum_{i=0}^{n-1} \sum_{j=0}^{n-1} [G1(2 \times n \times k + 2 \times i + 1, 2 \times n \times l + 2 \times j)]$$

$$G2^O(k,l) = \frac{1}{n \times n} \sum_{i=0}^{n-1} \sum_{j=0}^{n-1} [G2(2 \times n \times k + 2 \times i, 2 \times n \times l + 2 \times j + 1)]$$

$$B^O(k,l) = \frac{1}{n \times n} \sum_{i=0}^{n-1} \sum_{j=0}^{n-1} [B(2 \times n \times k + 2 \times i + 1, 2 \times n \times l + 2 \times j + 1)]$$

where:
- n is the decimation ratio of the sub-sampling of the array.
- i is the counting variable for the neighboring pixels in a row dimension of the sub sampled array 15.
- j is the counting variable for the neighboring pixels for a column dimension of the sub sampled array 15.
- k is the counting variable for a row dimension of the sub sampled array 15.
- l is the counting variable for the column dimension of the sub sampled array 15.
- $R^O$ is the red pixel of the sub sampled array 15.
- $G1^O$ is the first green pixel of the sub sampled array 15.
- $G2^O$ is the second green pixel of the sub sampled array 15.
- $B^O$ is the blue pixel of the sub sampled array 15.

Equations (1), (2), and (3) indicate that the pixel sub-sampling has the lowest spatial resolution and no signal level enhancement. Pixel binning has the high spatial resolution with highest signal level enhancement (factor of $n^2$). Pixel averaging has the high spatial resolution, but without the signal level enhancement.

Each of the different image decimation techniques of CMOS APS's (image sub-sampling, image binning, and image averaging) have their own set of advantages and disadvantages.

In image sub-sampling no analog circuit modification is required within the CMOS image sensor. A digital control circuit manipulates the sub-sampling addresses during the readout. For an n:1 image reduction ratio, the output rate at which the imaged is transferred from the array 15 is reduced to $1/n^2$.

In image binning, binning processing is either the digital domain or analog domain. For image binning in digital domain, an on-chip analog-to-digital converter converts all the pixel signals to digital values and store the values in a static random access memory (SRAM). Then, the stored pixel values are added digitally based on the color and number of pixels in the reduction window. This approach requires that the transfer rate of the pixel values from the SRAM to be at a higher speed (full resolution at 30 frames per second). This further requires that the SRAM to be relatively very large. If the CMOS APS's array, the analog-to-digital-converter, and the SRAM are integrated on the same substrate, the substrate dissipates very high power and is very large. Image binning in the analog domain, increases the complexity of analog circuit design significantly to accomplish the real time pixel binning.

A simple image averaging can be done by changing the column sample/hold circuit design. However, although pixel averaging gives the good spatial resolution, signal level at low light illumination condition still results the poor image performance.

FIG. 2 shows a typical CMOS Active Pixel Sensor (APS) of the prior art, using a photo-diode as a photo-conversion device for example. The drain terminals of the transistors M1 and M2 are connected to the power supply voltage distribution line, $V_{DD}$. The source of the transistor M2 is connected to the anode of the photo-diode $D_F$. The cathode of the photo-diode is connected to the ground reference point. The capacitance $C_{FD}$ is the inherent capacitance of the photo-diode $D_F$.

The gate of the transistor M2 is connected to a reset terminal to receive the reset signal $V_{rst}$. The sensor readout node FD, that is the anode of the photo-diode $D_F$, is first reset to a high voltage level ($V_{DD}$) by changing the reset signal $V_{rst}$ from a low voltage level (0) to a high voltage level ($V_{DD}$) to charge the capacitance $C_{FD}$. At the completion of charging the capacitance $C_{FD}$, the reset signal $V_{rst}$ is changed from the high voltage level ($V_{DD}$) to the low voltage level (0). Since light is shining on the photo-diode $D_F$, photo-generated electrons are collected at node FD and the voltage at the node FD decreases in the process. At the end of the exposure duration the voltage at node FD is measured, thus completing one photo-sensing cycle. The photo-sensing cycle is completed by activating the transistor M3 by changing the row select signal from the low voltage level (0) to the high voltage level ($V_{DD}$) that reads the differential voltage of signal and reset level to column sample/hold circuit (S/H CKT).

The gate of the transistor M1 is connected to the node FD and the source of the transistor M1 is connected to the drain of the transistor M3. The transistor M1 acts as a source follower such that the voltage present at the source of the transistor M1 "follows" directly the voltage present at the gate of the transistor M1 and is one transistor threshold voltage $V_T$ below the voltage present at the gate of the transistor M1.

The gate of the transistor M3 is connected to the row select line to receive the row select signal $V_{row}$. The source of the transistor M3 is connected to the sample and hold circuit. The sample and hold circuit provides the pixel output voltage $V_{OUT}$ to the column bus ColBus. The column bus ColBus interconnects all the APS's present on a column of an array of APS's. When the row select signal changes from a low voltage level (0V) to a high level ($V_{DD}$), the transistor $M_3$ turns-on and the voltage present at the source of the transistor $M_1$ is transferred to the output of the APS to couple the voltage that is proportional to the intensity of the light L. The output signal $V_{out\_pixel}$ of the APS is coupled to sample and hold circuit for conditioning and control for transfer to the column bus ColBus and to the video amplifier for further conditioning and readout.

The column sample and hold circuit, as shown in FIG. 2 is shown in more detail in FIG. 3. The column sample and hold circuit combines the column pixel row operation (pixel reset, row select) and the column operation (the photo generation, photo sensing). The clamp signal activates the switch $SW_2$ to place the capacitors of CS1 and CS2 in parallel for charging during the photo generation or conversion period of the light signal L to a light conversion electrical signal. The switch $SW_2$ is the deactivated during the pixel reset time to provide the differential output signal. This combination causes the output voltage Vout to be equal to the differential voltage of pixel reset level and photo conversion electrical signal level, i.e., $V_{out}=V_{rst\_}V_{sig}$ of all the pixels in one row is stored in the column sample/hold circuit on series capacitors of CS1 and CS2 of each column. During the pixel readout, switch $SW_3$ controlled by column select signal COL_SEL selects the column output. Column output drives the VIDEO AMP that applies the gain and offset correction to the output signal. The output of VIDEO AMP is the analog output that is digitized by an analog-to-digital converter (not shown). Since column bus has fairly large parasitic capacitance (CP), the pixel output Vout has been diluted. The actual input voltage to VIDEO AMP is given by:

$$V_{IN}^{VID\,AMP} = \frac{\left(\frac{CS1 \cdot CS2}{CS1+CS2}\right)}{\left(\frac{CS1 \cdot CS2}{CS1+CS2}\right)+CP} \cdot V_{OUT} \quad (4)$$

Where:
$V_{IN}^{VID\,AMP}$ is the voltage level representing the light level impinging upon the pixel being sensed.
CS1 is the capacitance value of the series capacitor CS1.
CS2 is the capacitance value of the series capacitor CS2.
CP is the capacitance value of the parasitic capacitor CP.

Although the passive column output scheme dilutes the output voltage, the column fixed pattern noise (FPN) is very low.

An alternate approach for the column sample/hold circuits is implementing active column circuit. The active circuit in column sample/hold approach can eliminate the signal dilution due to charge sharing in passive readout scheme. The column fixed pattern introduced by active column circuit can be minimized by a double sampling scheme. FIG. 4 shows the schematic diagram of active column sample and hold approach.

In this approach, a source follower $SF_1$ is placed between the node that develops the output voltage $V_{OUT}$ and the column select switch $SW_3$. The source follower isolates the output voltage from the effects of the stray capacitor CP. This causes the actual input voltage to VIDEO AMP is given by:

$$V_{IN}^{VID\,AMP}=GV_{OUT} \quad (5)$$

Where:
G is the gain of source follower.

"Progress in Voltage and Current Mode On-Chip Analog-to-Digital converters for CMOS Image Sensors", Panicacci, et al., Jan. 31, 1996, Found Jul. 13, 2004: http://techreports-.jpl.nasa.gov/1996/1006.html describes CMOS active pixel sensors having row and column averaging circuits for varying the resolution of the image sensors.

"Variable Resolution CMOS Current Mode Active Pixel Sensor," Coulombe, et al., Proceedings—The 2000 IEEE International Symposium on Circuits and Systems—ISCAS 2000, 2000, vol. 2, pp: 293-296, a current mediated active pixel sensor (APS) with variable image size and resolution for power saving, electronic zooming, and data reduction at the sensor level. The circuit can perform averaging of output signals in blocks of adjacent pixels (kernels) of size 1×1, 2×2 and 4×4, allowing data reduction without aliasing effects. To achieve this, a current approach is used, thus enabling high speed operation and low power supply capacity. The circuit compensates for pixel transconductance mismatch in addition to offset error via analog to digital conversion reference current scaling.

"Frame-Transfer CMOS Active Pixel Sensor with Pixel Binning", Zhou, et al., IEEE Transactions on Electron Devices, October 1997 Vol.: 44, Issue: 10, pp.: 1764-1768, reports a first frame-transfer CMOS active pixel sensor (APS). The sensor architecture integrates an array of active pixels with an array of passive memory cells. Charge integration amplifier-based readout of the memory cells permits binning of pixels for variable resolution imaging.

U.S. Pat. No. 6,721,464 (Pain, et al.) discloses a high-speed on-chip windowed averaging system using photodiode-based CMOS imager. The system has an imager array, a switching network, computation elements, and a divider circuit. The imager array has columns and rows of pixels. The switching network is adapted to receive pixel signals from the image array. The plurality of computation elements operates to compute column and row averages.

U.S. Pat. No. 5,585,620 (Nakamura, et al.) teaches an image reading device (image scanner) that includes a resolution changing device. The resolution is changed by an averaging process circuit that averages the signals output from adjacent photoelectric sensor elements. The averaging process circuit changes a resolution of the image by a factor of m by averaging the signals output by m adjacent photoelectric sensor elements, where m is an integer.

U.S. Pat. No. 6,166,367 (Cho) describes a programmable arithmetic circuit to form multiple circuit modules for different arithmetic operations that share certain common electronic elements to reduce the number of elements. Such circuit can be integrated to an imaging sensor array such as a CMOS active pixel sensor array to perform arithmetic operations and analog-to-digital conversion for imaging processing such as pixel averaging for resolution reduction.

U.S. Pat. No. 6,104,844 (Alger-Meunier) teaches an image sensor that has adjustable resolution. Neighboring sensor elements are in each case combined into pixel sensor regions. During the recording of the image, the measured values of the sensor elements of each sensor region are averaged. In this case, each average value corresponds to a pixel of the recorded image. In this manner, production-dictated tolerances of the sensor elements are compensated for by the averaging.

SUMMARY OF THE INVENTION

An object of this invention is to provide an apparatus for adjusting the resolution of an array of image sensors such as CMOS active pixel sensors.

Another object of this invention is to provide an apparatus for adjusting the resolution of an array of image sensors while maintaining high image quality.

Further, another object of this invention is to provide an apparatus for adjusting the resolution of an array of image sensors while maintaining high image quality in low light level.

Still further, another object of this invention is to provide an apparatus for adjusting the resolution of an array of image sensors that horizontally averages sub-groups of the image sensors.

Even still further, another object of this invention is to provide an apparatus for adjusting the resolution or an array of image sensors that vertically integrates or bins sub-groups of the image sensors in low light-level.

Still, another object of this invention is to provide an apparatus for adjusting the resolution or an array of image sensors that vertically averages sub-groups of the image sensors in high light level.

To accomplish at least one of these objects, a photo-sensor image resolution adjustment apparatus is in communication with an array of image photo-sensors. The array of image photo-sensors is organized in columns and rows and has multiple sensor types arranged in a pattern such as a Bayer pattern to detect light. Each sensor type detects unique colors of the light and converts the light to a light conversion electrical signals. The photo-sensor image resolution adjustment apparatus adjusts sensor resolution for reception of the light.

The photo-sensor image resolution adjustment apparatus has a photo-sensor array decimation circuit. The photo-sensor array decimation circuit is in communication with an addressing control circuitry of the array of image photo-sensors to partition the array of image photo-sensors into a plurality of sub-groups of the array of image photo-sensors and provide partition control signals. A column averaging circuit is in communication with the array of image photo-sensors to receive the light conversion electrical signals and in communication with the photo-sensor array decimation circuit to receive the partition control signals. From the partition control signals the column averaging circuit averages the light conversion electrical signals from photo-sensors detecting common colors from the columns of each of the plurality of the sub-groups of the array of image photo-sensors to create column averaged electrical signals of the columns of the plurality of the sub-group of the array of image photo-sensors.

The column averaging circuit has a plurality of even averaging capacitors. Each even averaging capacitor is connected to receive the light conversion electrical signal from the common color adjacent photo-sensors of the array of image photo-sensors on the columns. The common color adjacent photo-sensors are at one set of columns is of common color photo-sensors detects red (R) and the alternate column of common color photo-sensors detects green-1 (G1). Each of a plurality of even averaging switches is connected to receive the light conversion electrical signals from the common color adjacent photo-sensors on the columns to selectively transfer the light conversion electrical signals from the common color adjacent photo-sensor to a selected even averaging capacitor to average the light conversion electrical signals from an attached photo-sensor and the common color adjacent photo-sensors. Each of the plurality of even averaging switches is in communication with the timing and control circuit to receive the timing, control, and select signals to selectively connect one the even averaging capacitors to average the light conversion electrical signals of the common color associated photo-sensors of the array of image photo-sensors on the columns.

The column averaging circuit, additionally, has a plurality of odd averaging capacitors. Each odd averaging capacitor is connected to receive the light conversion electrical signal from the common color adjacent photo-sensors of the array of image photo-sensors on the columns. The common color adjacent photo-sensors are at one set of columns is of common color photo-sensors detects green-2 (G2) and the alternate column of common color photo-sensors detects blue (B). Each of a plurality of odd averaging switches is connected to receive the light conversion electrical signals from the common color adjacent photo-sensors on the columns to selectively transfer the light conversion electrical signals from the common color adjacent photo-sensor to a selected odd averaging capacitor to average the light conversion electrical signals from an attached photo-sensor and the common color adjacent photo-sensors. Each of the plurality of odd averaging switches is in communication with the timing and control circuit to receive the timing, control, and select signals to selectively connect one the odd averaging capacitors to average the light conversion electrical signals of the common color associated photo-sensors of the array of image photo-sensors on the columns.

The photo-sensor image resolution adjustment apparatus has a timing control circuit in communication with the photo-sensor array decimation circuit and the column averaging circuit to provide timing, control, and select signals. The timing, control, and select signals coordinate generation of the light conversion electrical signals from the plurality of sub-groups of the array of image photo-sensors, averaging of the light conversion electrical signals from selected sensors within the sub-group to create the column averaged electrical signals.

A sample and hold circuit within the photo-sensor image resolution adjustment apparatus is connected to the array of image photo-sensors to sample and hold the light conversion electrical signals from selected photo-sensors. The sampled and held light conversion electrical signals are then transferred to the column averaging circuit. The sample and hold circuit is in communication with the timing and control circuit to receive the timing, control, and select signals for sampling and holding the light conversion electrical signals.

The photo-sensor image resolution adjustment apparatus additionally includes a row binning circuit in communication with the column averaging circuit to receive, in low intensity lighting situations, the column averaged electrical signals of each sub-group of photo-sensors that detect the common colors arranged on the columns within each sub-group of the array of image photo-sensors. The row binning circuit is then in communication with the photo-sensor array decimation circuit to receive the partition control signals. From the partition control signals, the row binning circuit integrates the column averaged electrical signals for sensors having the common colors on the rows of each of the plurality of the sub-groups of the array of image photo-sensors to create binning electrical signals of the rows of the plurality of the sub-group of photo-sensors having common colors of the array of image photo-sensors, and in communication with the timing and control circuit to receive the timing, control, and select signals for creating the column averaged electrical signals.

The signal integrator includes a sampling capacitor, an operational amplifier, and a feedback capacitor. The sampling capacitor is in communication with the column averaging circuit to receive and sample the column averaged electrical signals. The operational amplifier is in communication with the sampling capacitor to receive and amplify the sampling of the column averaged electrical signals. The feedback capacitor is connected to transfer a row accumulation signal integrating the column averaged electrical signals for photo-sensors having the common colors on the rows of each of the plurality of the sub-groups of the array of sensors from an output of the operational amplifier to input of the operational amplifier such that the row accumulation signal and a current column averaged signal of one row of the rows of the photo-sensors with the common attributes on the rows of each of the plurality of the sub-groups of the array of photo-sensors are additively combined to generate the row binning electrical signal.

The signal integrator further includes a first sampling switch in communication between the sampling capacitor and the column averaging circuit to control the sampling of the column electrical signals. A second sampling switch is in communication between the sampling capacitor and the operational amplifier to control additively combining of the column averaged electrical signals and the row accumulation signal. A feedback capacitor reset switch is in communication between a top and a bottom plate of the feedback capacitor to remove the row binning electrical signals at completion of the additive combining the column averaged electrical signals for photo-sensors having the common on the columns of each of the plurality of the sub-groups of the array of photo-sensors.

The row binning circuit further includes a video amplifier connected to selectively receive one of a group of electrical signals comprising the light conversion electrical signals, the row averaging electrical signals, and the row binning electrical signals to amplify and condition the selected electrical signals for external processing.

The photo-sensor image resolution adjustment apparatus further includes a row averaging circuit in communication with the column averaging circuit to receive the column averaged electrical signals of each sub-group of photo-sensors that detect the common colors arranged on the columns within each sub-group of the array of image photo-sensors. The row averaging circuit is also in communication with the photo-sensor array decimation circuit to receive the partition control signals. From the partition control signals, the row averaging circuit averages the column averaged electrical signals for sensors having the common colors on rows of each of the plurality of the sub-groups of the array of image photo-sensors to create row averaged electrical signals of the rows of the plurality of the sub-group of photo-sensors having common colors of the array of image photo-sensors. The row averaging circuit is in communication with the timing and control circuit to receive the timing, control, and select signals for creating the row averaged electrical signals.

The row averaging circuit has a plurality of row averaging switches. Each row averaging switch is connected to the column averaging circuit to receive column averaged electrical signals for sensors with the common colors on the rows of each of the plurality of sub-groups of the array of image photo-sensors to average the column averaged light conversion electrical signals to create the row averaged electrical signals. Each of the plurality of row averaging switches is in communication with the timing and control circuit to receive the timing, control, and select signals to selectively connect the column averaging circuits of sensors having the common colors on the rows of each of the plurality of sub-groups of the array of image photo-sensors for the averaging.

The photo-sensor image resolution adjustment apparatus optionally has a plurality of source follower circuits. Each source follower is connected to receive one of the light conversion electrical signals and the column averaged electrical signals to isolate the received one of the light conversion electrical signals and the column averaged electrical signals or row averaged electrical signals from effects of a parasitic capacitor present at an output bus of the photo-sensor image resolution adjustment circuit. If the photo-sensor image resolution adjustment apparatus does not have the plurality of source follower circuits, it considered a passive column averaging, row binning or averaging resolution adjustment circuit. The isolation of the plurality of even and odd averaging capacitors from the row binning circuit with the source follower converts the photo-sensor image resolution adjustment apparatus to a column averaging, row averaging or binning circuit.

BRIEF DESCRIPTION OF THE DRAWINGS

FIGS. 1a and 1b are diagrams illustrating a Bayer patterned color image sensor array demonstrating sub-sampling for adjusting resolution of image sensor array of the prior art.

FIG. 2 is a schematic diagram of an image sensor with a sample and hold circuit of the prior art.

FIG. 3 is a schematic diagram of the sample and hold circuit of FIG. 2.

FIG. 4 is a schematic diagram of the sample and hold circuit of FIG. 2 with a source follower to isolate the sample and hold circuit from parasitic capacitances of the Column Bus.

FIG. 6b is a schematic diagram of the storage capacitor reset signal sub circuit of the single column sample, holding, and averaging sub-circuit of an image resolution adjustment circuit of this invention, as shown in FIG. 6a.

FIG. 6c is a schematic diagram of the video amplifier/switched capacitor integrator circuit of an image resolution adjustment circuit of this invention, as shown in FIG. 6a.

FIG. 7 is a timing diagram of a second embodiment of a single column sample, holding, and averaging sub-circuit of an image resolution adjustment circuit of this invention, as shown in FIG. 6a.

FIG. 8 is a schematic diagram a simplification of the first embodiment of a single column sample, holding, and averaging sub-circuit of an image resolution adjustment circuit of this invention, as shown in FIG. 6a.

FIG. 9 is a diagram of the composite relationship of FIGS. 9a-9d.

FIG. 10 is a diagram of the composite relationship of FIGS. 10a-10b.

FIG. 11 is a diagram of the contents of the averaging capacitors of FIGS. 9a-9d for the 2:1 decimation for the image resolution adjustment.

FIG. 12 is a diagram of the composite relationship of FIGS. 12a-12c.

FIG. 13 is a diagram of the contents of the averaging capacitors of FIGS. 9a-9d for the 3:1 decimation for the image resolution adjustment.

FIG. 14 is a diagram of the composite relationship of FIGS. 14a-14c.

FIG. 15 is a diagram of the contents of the averaging capacitors of FIGS. 9a-9d for the n:1 decimation for the image resolution adjustment.

FIG. 16 is a diagram of the composite relationship of FIGS. 16a-16c.

FIG. 17 is a diagram of the composite relationship of FIGS. 17a-17c.

FIG. 20 is a diagram of the composite relationship of FIGS. 20a-20d.

DETAILED DESCRIPTION OF THE INVENTION

The CMOS active pixel sensor array of this invention achieves high spatial resolution in the analog domain and high image quality at low light level by a horizontal (column) pixel averaging and vertical (row) pixel binning approach for Bayer patterned pixel array. Additionally, the CMOS active pixel sensor array of this invention achieves high spatial resolution in the analog domain and high image quality at high light level by a horizontal (column) and vertical (row) pixel averaging approach for Bayer patterned pixel array. The advantages of the CMOS active pixel sensor array of this invention are a simple analog column sample and hold circuit; a reduced pixel output rate for decimated image to achieve low power operation; no additional on-chip memory required; and a scalability to any pixel array decimation ratio.

Figure 5:
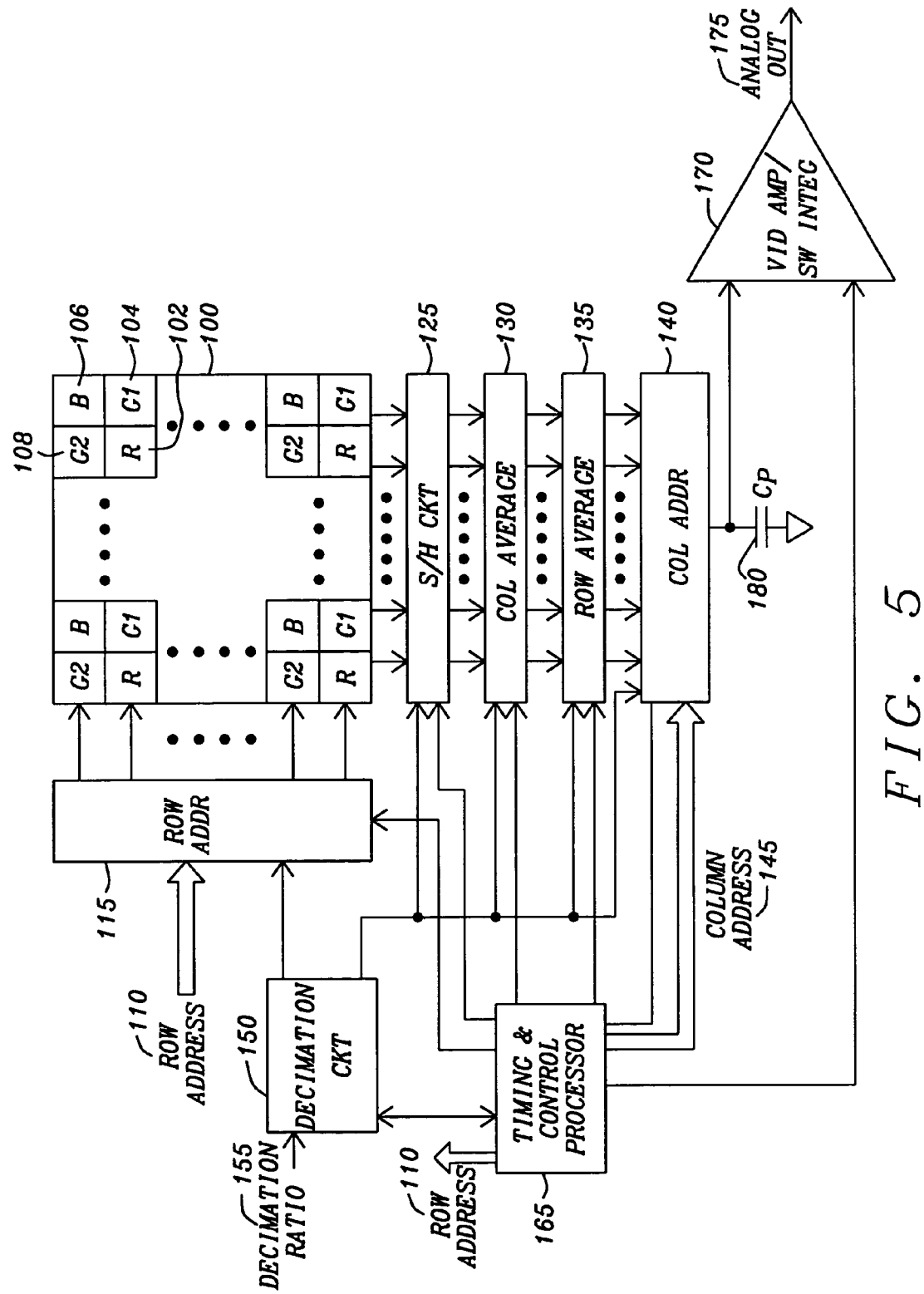
FIG. 5 is block diagram of an image sensor of this invention with an image resolution adjustment circuit.

As shown in FIG. 5, an array of color CMOS APS image sensors 100 is arranged in rows and columns. The array 100 is formed of three types of CMOS APS image sensor pixels by using different color filters. The first type of CMOS APS image sensor is fabricated to sensitive to red light, the second type of CMOS APS image sensor is fabricated to be sensitive to blue light, and the third type of CMOS APS image sensor is fabricated to be sensitive to green light. The CMOS APS image sensors are organized in the Bayer pattern (U.S. Pat. No. 3,971,065). The pattern has a single red sensor 102, a single blue sensor 105, and two green sensors 104 and 108.

A row address decoder 115 receives a row address 110 to select a row of the CMOS active pixel sensors for activation. The light conversion electrical signals resulting from the conversion of the light as shown in FIG. 2 from the selected row of active pixel sensors are transferred to a sample and hold circuit 125 that samples and holds the light conversion electrical signal. A column address decoder 140 receives a column address 145 select one of the sampled and held light conversion electrical signals from a desired active pixel sensor for transfer to the video amplifier/switched capacitor integrator circuit 170 to generate the analog video output signal 175.

For full resolution operation, the sampled and held light conversion signal is transferred to bypass the column averaging circuit 130 and the row averaging circuit 135. To adjust the resolution of the array of active pixels sensors 100 to reduce the resolution, the decimation circuit 150 receives a decimation ratio signal 155. The decimation circuit generates the necessary address partition signals that are required to partition or decimate the addressing of the array of active pixel sensors 100 to create sub-groups of active pixels sensors that will act as super-pixels. The number of super-pixels being a sub-multiple of the number of pixels within the array of active pixels sensors 100. For example digital video cameras that employ images sensors with SXGA image format have 1280×1024 pixel sensor, or approximately 1.3 million pixels or with QXGA image format have 2048×1536 pixels, or approximately 3.2 million pixels. The view finders of these cameras generally use the Common Intermediate Format (CIF). The CIF format is a video format used in videoconferencing systems that easily supports both NTSC and PAL signals. CIF specifies a data rate of 30 frames per second (fps), with each frame containing 288 lines and 352 pixels per line (352×288). A digital camera must decimate or divide the array of active pixels sensors 100 of a SXGA formatted image array by a decimation ratio of 3:1. Similarly, a digital camera must decimate the array of active pixel sensors 100 of a QXGA formatted image array by a decimation ratio of 5:1.

To perform the pixel binning/averaging of the color image, two rows of image information, i.e., R/G1 row and G2/B row must be retained. A sub-group of the pixels are formed into super-pixels. Each super-pixel has a size equal to $(2n)\times(2n)$ for an n:1 decimation ratio. In the operation, the output color patterns, $R^\circ$, $G1^\circ$, $G2^\circ$, and $B^\circ$, are produced by all the information from the Bayer pattern in the super-pixel. In other words, for an n:1 image decimation ratio, image pixels in the $(2n)\times(2n)$ super-pixel window will is combined to a 2×2 Bayer pattern with single $R^\circ$, $G1^\circ$, $G2^\circ$, and $B^\circ$ values.

The decimation signal 145 thus provides a coding to indicate the decimation ratio necessary to divide the array of active pixel sensors into sub-groups of super-pixels for the sub-multiple format. The decimation circuit 150 then provides the necessary address controls such that the row address 110 and the column address 145 not only selects a particular row and column to designate a particular image sensor, but also to select the appropriate neighboring image sensors within the super-pixel. The column averaging circuit 130 receives the sampled and held light conversion electrical signals from the columns of a central row of the addressed row of super-pixels. The sampled and held light conversion electrical signals of the neighboring image sensors are averaged with the central column of the sub-group of image sensors forming the super-pixel. In high intensity light operations, the neighboring rows of the addressed row of super-pixels are selected and the neighboring columns are averaged and transferred to the row averaging circuit 135. The averaged electrical signals of the addressed column of the super-pixels for each row of the addressed row of the super-pixels are averaged to create the high light conversion electric signal for the super-pixel. The column address circuit 140 selects the high light conversion electric signal for a desired addressed column of the super-pixel for transfer to the video amplifier/switched capacitor integrator circuit 170 to generate the analog video output signal 175. The analog video output signal 175 being transferred to external circuitry such as an analog-to-digital converter for-further processing. In low light operations the row averaging circuit 135 is deactivated and the column address circuit 140 transfers the column averaged light conversion electrical signal to the video amplifier/ switched capacitor integrator circuit 170. The video amplifier/switched capacitor integrator circuit 170 integrates the column averaged light electrical signals to bin the physical pixels signals to form the binning on low light conversion electric signal for each super-pixel.

The address, timing, and control processor circuit 165 address, timing, and control processor circuit 165 generates the necessary row address 110, column address 145, timing, and control signals to select and activate the decimation circuit 150, the row address decoder 115, the sample and hold circuit 125, the column averaging circuit 130, the row averaging circuit 135, column address decoder 140 and video amplifier/switched capacitor integrator circuit 170. The address, timing, and control processor circuit 165 generates the row address 110, column address 145 for capturing the light conversion electrical signals from the array of active pixel sensors 100 either passing these signals directly to the generate the video signals or decimating the video signal for reduced resolution of the image from the array of active pixel sensors 100.

Figure 6A:
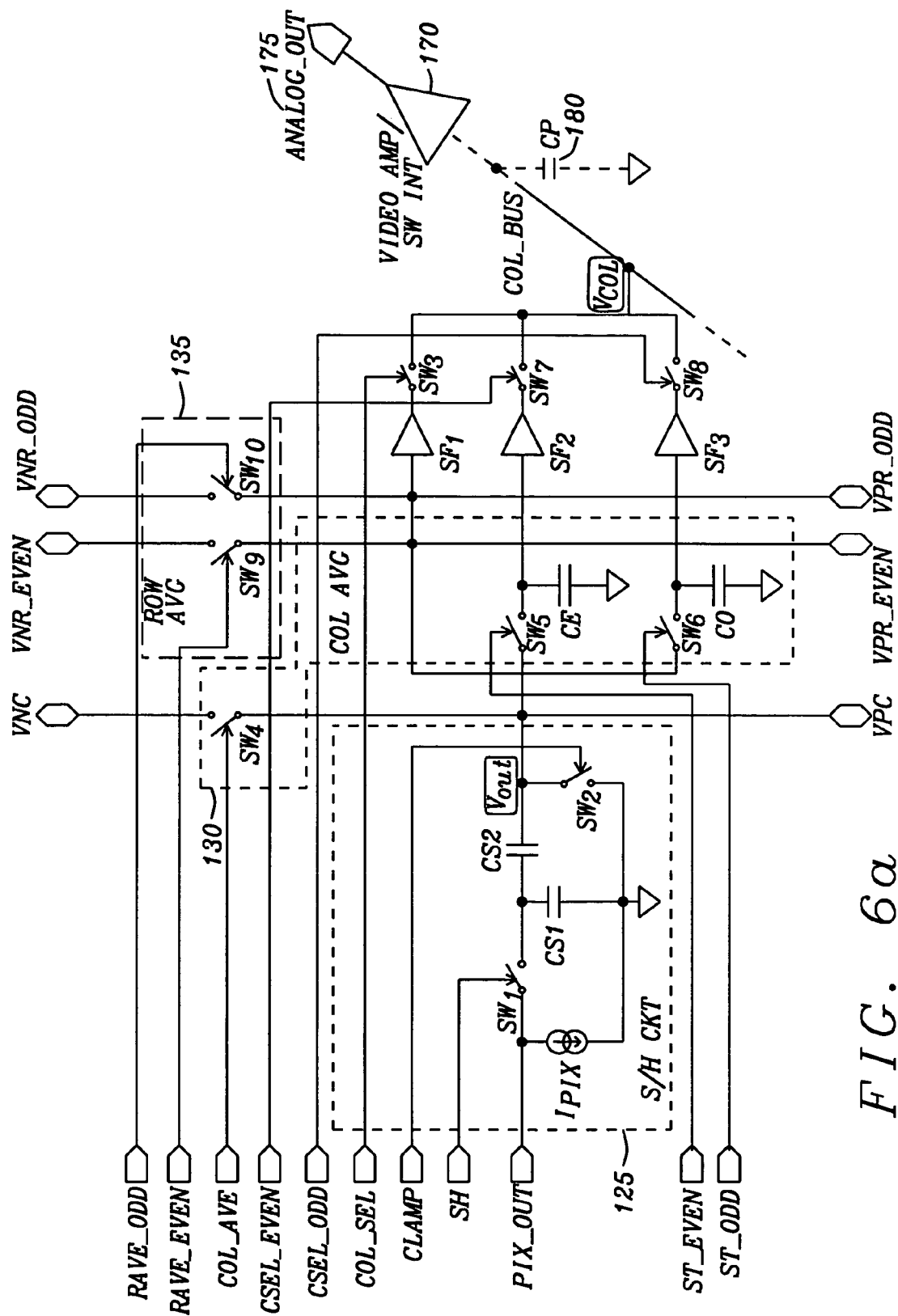
FIG. 6a is a schematic diagram of a first embodiment of a single column sample, holding, and averaging sub-circuit of an image resolution adjustment circuit of this invention.

Refer now to FIG. 6a for a discussion of the structure of the sample and hold circuit 125, the column averaging circuit 130, and the row averaging circuit 135 for one column of the array of active pixel sensors. The output terminal PIX_OUT provides the output current $I_{PIX}$ from an active pixel sensor of a selected row of the array of active pixel sensors 100 of FIG. 5. The structure and operation of sample and hold circuit 125 is fundamentally that of the sample and hold circuit of FIG. 3.

The sample and hold switch $SW_1$ samples the conversion signal and reset voltage level of the output of the pixel of the selected row. The sample and hold switch $SW_1$ is controlled by the sample and hold signal SH. The clamp switch $SW_2$ provides the clamping of the signal level in signal sampling phase and is controlled by the clamping signal CLAMP.

Referring to FIGS. 2, 5, 6 and 7 for an explanation of the operation of the sample and hold circuit 125. The row decoder 115 decodes the row address signal 110 containing a row address ROW_ADDR[N:0] of the desired row (i) of the array. The row select signal ROW_SEL provides the timing to activate the transistor M3 of the active pixel sensor to transfer the conversion signal and reset voltage level to the input terminal PIX_OUT of the sample and hold circuit 125. The pixel reset sampling time PIX_RST resets the pixel after the signal has been sampled. The sample and hold signal SH activates the switch $SW_1$ to transfer the differential voltage of pixel reset and signal conversion level to the serial capacitors of CS1 and CS2. The clamp signal activates the switch $SW_2$ to place the capacitors of CS1 and CS2 in parallel for charging during the signal sampling period. The switch $SW_2$ is the deactivated during the pixel reset sampling time PIX_RST to provide the differential light conversion electrical output signal $V_{OUT}$.

The column averaging circuit 130 combines the light conversion electrical signals from the sample and hold circuits of same color pixels in adjacent columns of the selected row to average the light conversion signals. The number of pixels being averaged is dependant on the image decimation ratio. The column average switch $SW_4$ connects light conversion signal $V_{OUT}$ from the same color pixels of the next color adjacent column of the selected connected to the terminal VNC and is controlled by column averaging signal COL_AVE. The terminal VPC connects to the switch $SW_4$ of the averaging circuit associated with the same color pixel of the previous adjacent column of the selected row.

During the readout time the capacitors of CS1 and CS2 are serially connected to provide the sampled and held light conversion signal for the pixel (differential voltage level of pixel signal and reset level) connected to the sample and hold circuit 125 on the selected row. The column averaging signal COL_AVE connects the serially connected capacitors of CS1 and CS2 of the adjacent same color pixels. The output voltages $V_{OUT}$ from the connected serially connected capacitors of CS1 and CS2, when the column averaging switches $SW_4$ are activated, causes the resulting voltage to be averaged.

Figure 6B:
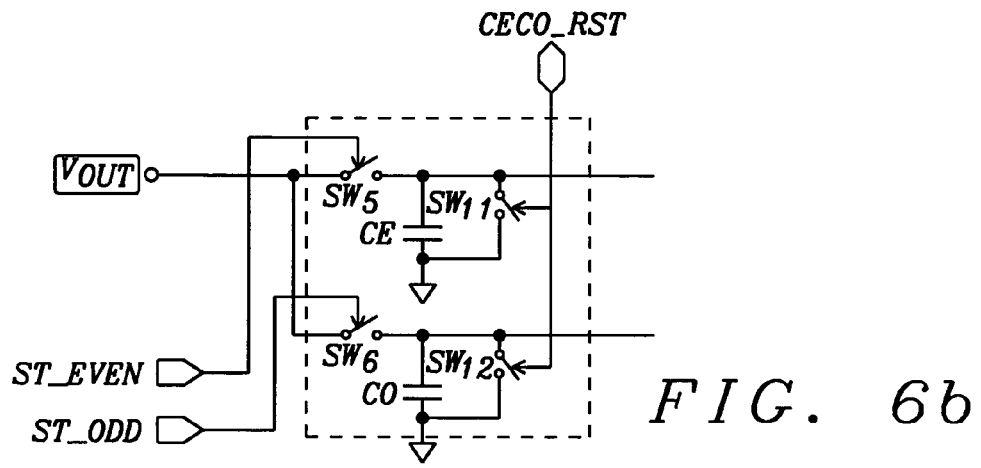

The averaged differential output signal $V_{OUT}$ is applied to the even row signal transfer switch $SW_5$ and odd row signal transfer switch $SW_6$. The even row signal transfer switch $SW_5$ transfers the differential output signal $V_{OUT}$ of even rows (after column averaging) to storage capacitor CE. The store even row signal at the terminal ST_EVEN selects the differential output signal $V_{OUT}$ from the pixel on the column of a selected even row of pixels within the super-pixel being evaluated. The odd row signal transfer switch $SW_6$ transfers the differential output signal $V_{OUT}$ of odd rows (after column averaging) to storage capacitor CO. The store odd row signal at the terminal ST_ODD selects the differential output signal $V_{OUT}$ from the pixel on the column of a selected odd row of pixels within the super-pixel being evaluated. As shown in FIG. 6b, the storage capacitors CE and CO are initialized by having any residual charge transferred to ground through the switches $SW_{11}$ and $SW_{12}$. The storage capacitor reset signal CECO_RST when activated sets the switches $SW_{11}$ and $SW_{12}$ to connect the storage plates of storage capacitors CE and CO to the analog ground reference terminal. When the storage capacitors CE and CO are reset, the storage capacitor reset signal CECO_RST is deactivated.

In a reduced resolution mode, as described above, a row selected at the reduced resolution includes all the rows of the actual physical array of active pixel sensors within each super-pixel. Thus the time for each of the reduced resolution rows of the active pixel sensors must average the columns of each physical row and then combine the physical rows of the super-pixel to bin the results.

In high level light conditions, the row averaging circuit 135 averages the average differential output signal $V_{OUT}$ for the same color pixels of the adjacent rows. The even row average switch $SW_9$ connects the differential output signal $V_{OUT}$ of the currently selected column to the terminal VNR_EVEN of the next adjacent row of same color column averaged pixels to average the two differential output signals $V_{OUT}$ of the two rows. The terminal VPR_EVEN that is connected to the even row average switch $SW_9$ of the previous row of same color column averaged pixels. If the even row average switch $SW_9$ is activated, the column averaged pixels of the previous row are averaged with the selected row and the next row. The even row average control signal RAVE_EVEN is selected by the row address decoder 115 and the decimation circuit 150 of FIG. 5 to select the averaging of the selected rows of the super-pixel during high-light level conditions. The odd row average switch $SW_{10}$ connects the differential output signal $V_{OUT}$ of the currently selected column to the terminal VNR_ODD of the next adjacent row of same color column averaged pixels to average the two differential output signals $V_{OUT}$ of the two rows. The terminal VPR_ODD that is connected to the odd row average switch $SW_{10}$ of the previous row of same color column averaged pixels. If the odd row average switch $SW_{10}$ is activated, the column averaged pixels of the previous row are averaged with the selected row and the next row. The odd row average control signal RAVE_ODD is selected by the row address decoder 115 and the decimation circuit 150 of FIG. 5 to select the averaging of the selected rows of the super-pixel during high-light level conditions.

Figure 6C:
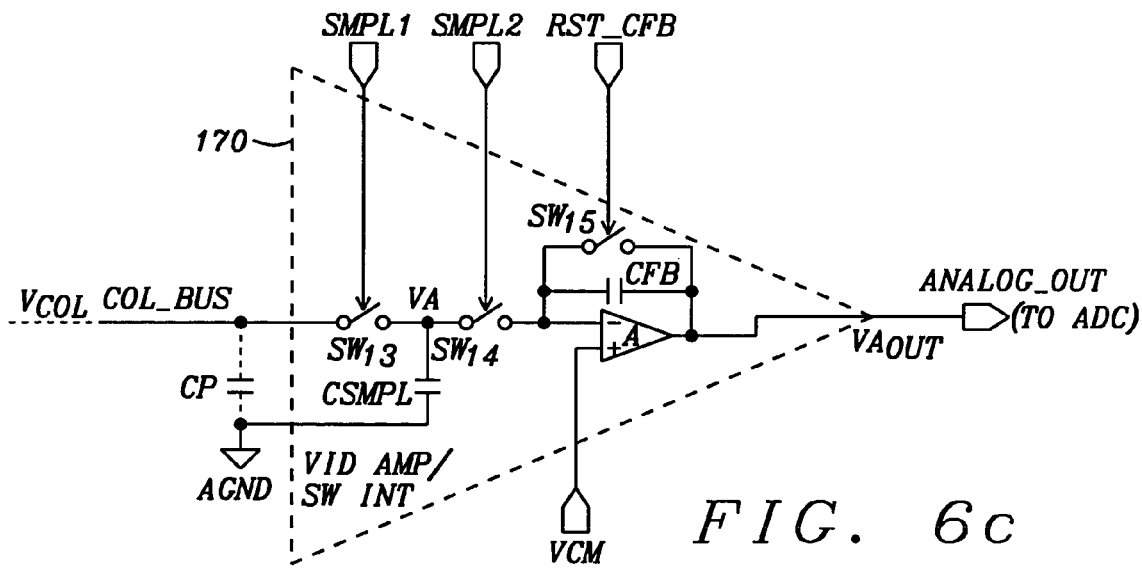

In low light conditions the physically adjacent even rows or physically adjacent odd rows are combined to integrate or bin the magnitude of the differential output signals $V_{OUT}$ of the adjacent same color columns of the super-pixel. FIG. 6c shows a switch capacitor approach for an embodiment of the video amplifier/switched capacitor integrator circuit 170. Other approaches, such as fully differential switch capacitor design, can be implemented and still be in keeping with the intent of this invention.

The column bus parasitic capacitance CP is at the input of the video amplifier/switched capacitor integrator circuit 170. The input signal of the video amplifier/switched capacitor integrator circuit 170 is the column voltage $V_{col}$ and is applied to the sampling switch $SW_{13}$. The first sampling switch control signal SMPL1, when activated, allows the column voltage $V_{col}$ from the selected source follower $SF_1$, $SF_2$, or $SF_3$ to charge the sampling capacitor CSMPL to the signal level $VA_{in}$. The sampling capacitor CSMPL is connected to on one terminal of the second sampling control switch $SW_{14}$ and to the inverting terminal of the operational amplifier A and the top plate of the feedback capacitor CFB on the second terminal. The bottom plate of the feedback capacitor CFB is connected to the output of the operational amplifier A.

The feedback capacitor reset switch $SW_{15}$ is in parallel with the feedback capacitor CFB to remove accumulated charge. The common reference voltage VCM is connected to the noninverting terminals of the operational amplifier A. During the activation of the first sampling switch control signal SMPL1, the feedback capacitor reset switch $SW_{15}$ is activated by the reset control pulse RST_CFB resets (input and output of the OPAMP) to common voltage VCM to remove any charge from the feedback capacitor CFB.

When the first sampling switch control signal SMPL1 and reset control pulse RST_CFB are deactivated, the second sampling control signal SMPL2 second sampling control switch $SW_{14}$ is activated to transfer charge from sampling capacitor CSMPL to the feedback capacitor CFB. The output voltage $VA_{out}$ of operational amplifier A is given by:

$$VA_{OUT} = VCM - \frac{CSMPL}{CFB} \cdot VA_{IN}.$$

The video amplifier/switched capacitor integrator circuit 170 of the shown embodiment gives proper analog gain to the signal. The ratio of the sampling capacitor CSMPL to the feedback capacitor CFB (CSMPL/CFB) determines the analog gain. An embodiment with programmable analog gain can be designed by programming the sampling capacitor CSMPL. The sampling capacitor CSMPL in this instance is has a multiple selectable segment capacitors to adjust the gain.

If the resolution of the array of CMOS active pixel sensors is not adjusted, the differential output signal VOUT of each pixel is readout directly to the source follower $SF_1$. The column select switch $SW_3$, selects the source follower $SF_1$ output in high resolution imaging mode (i.e. no column pixel averaging or row averaging or binning) and is controlled by the column select signal COL_SEL.

If the array of CMOS active pixel sensors is adjusted for a lower resolution, the averaged differential output signal $V_{OUT}$ present on the even averaging capacitor CE is transferred through the source follower $SF_2$. The source follower $SF_2$ isolates the differential output signal $V_{OUT}$ from the effects of the parasitic capacitor 180 of the column bus. The even column select switch $SW_7$ selects the source follower $SF_2$ output for even column averaging signal. The column address decoder 140 activates the switch $SW_7$ with the even column select switch signal CSEL_EVEN. Similarly, the averaged differential output signal $V_{OUT}$ present on the odd averaging capacitor CE is transferred through the source follower $SF_3$. The source follower $SF_3$ isolates the differential output signal $V_{OUT}$ from the effects of the parasitic capacitor 180 of the column bus. The odd column select switch $SW_8$ selects the source follower $SF_3$ output for odd column averaging signal. The column address decoder 140 activates the switch $SW_8$ with the odd column select switch signal CSEL_ODD. The average differential output signal $V_{OUT}$ as transferred through the source follower $SF_1$, source follower $SF_2$, or source follower $SF_3$ is transferred as the column voltage $V_{COL}$ to the column bus COL_BUS to the video amplifier/switched capacitor integrator circuit 170.

Figure 8:
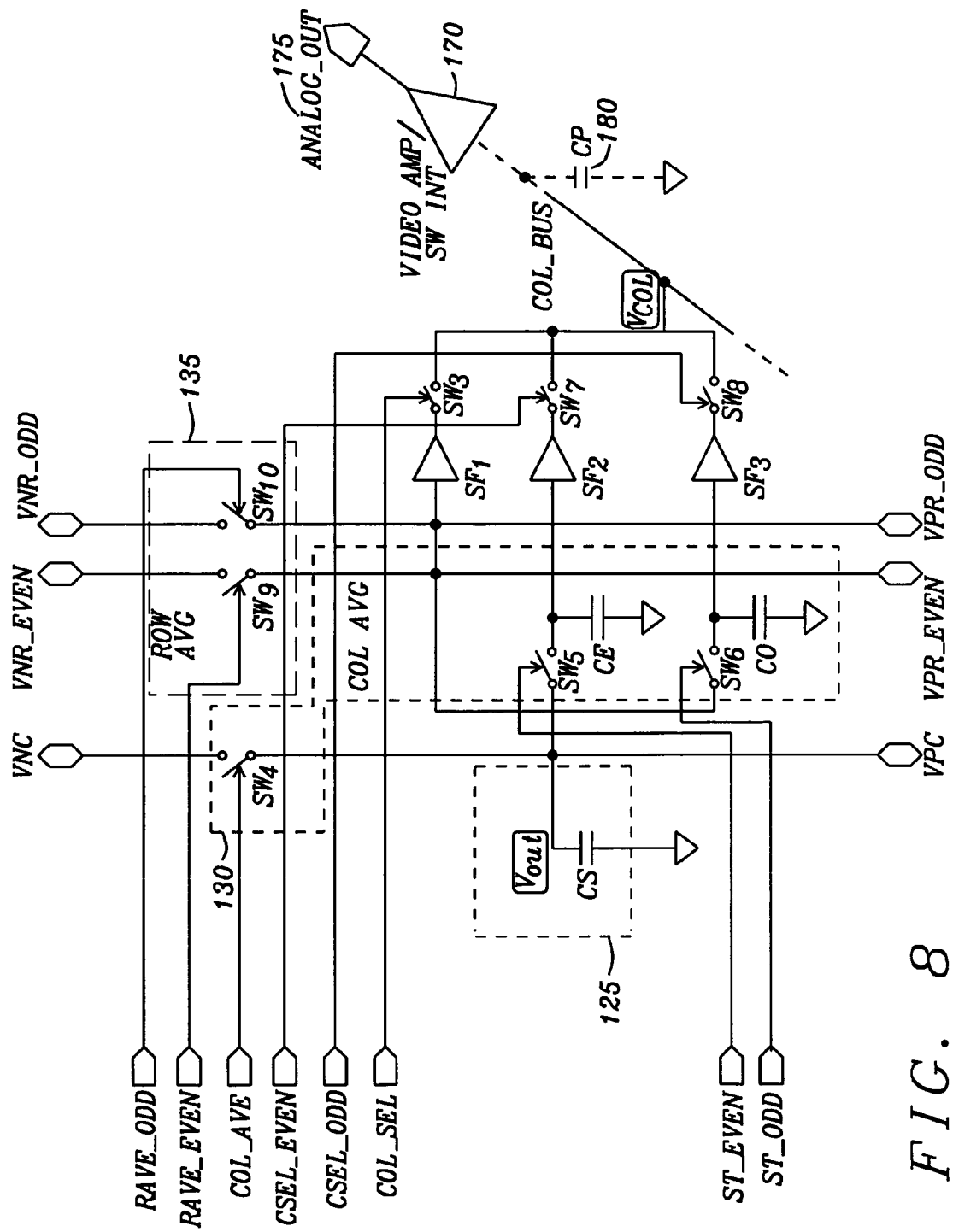
Figure 9A:
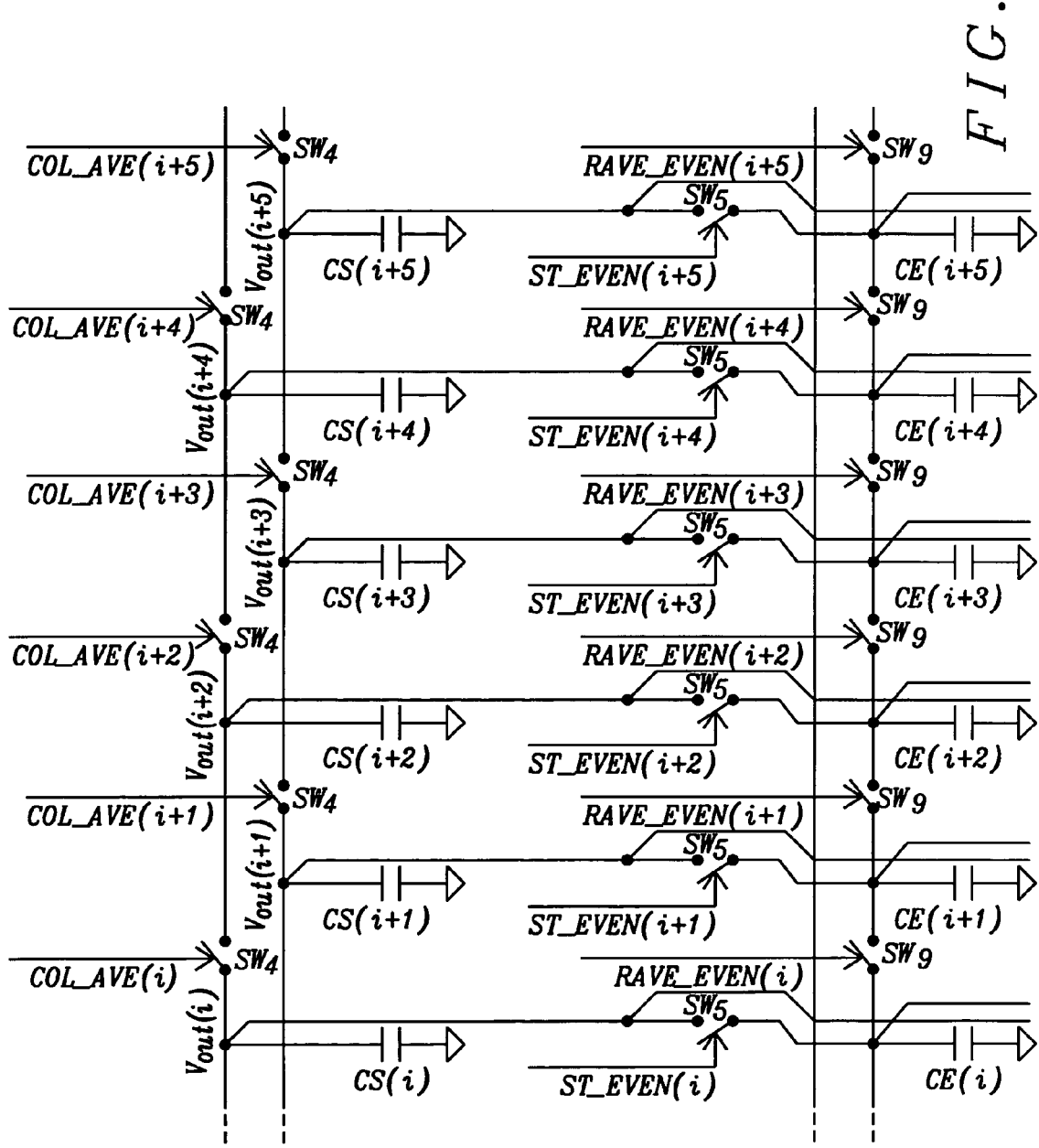
FIGS. 9a-9d are, in composite, a schematic diagram of multiple a single column sample, holding, and averaging sub-circuits forming the image resolution adjustment circuit of this invention.
Figure 9B:
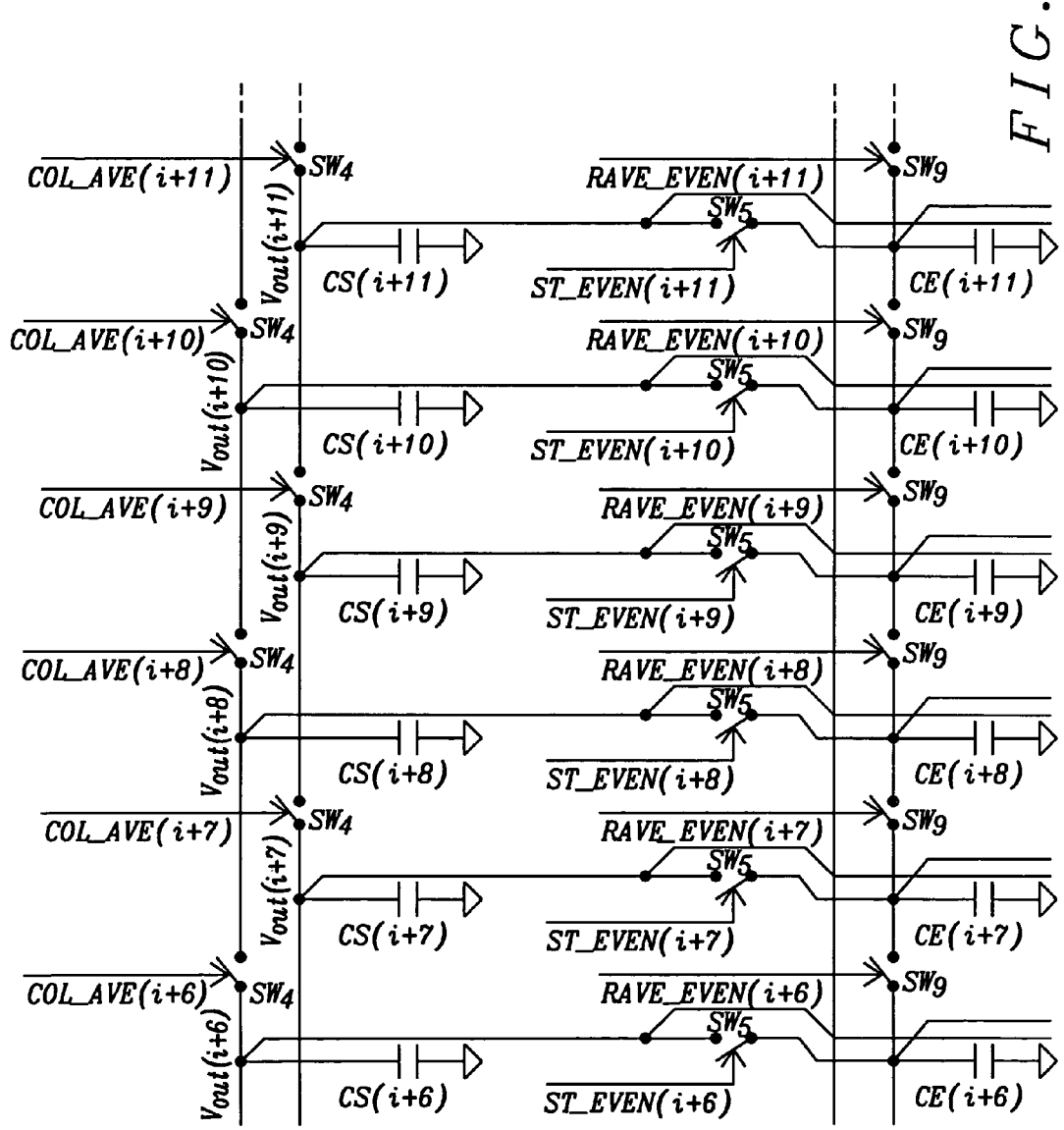
Figure 9C:
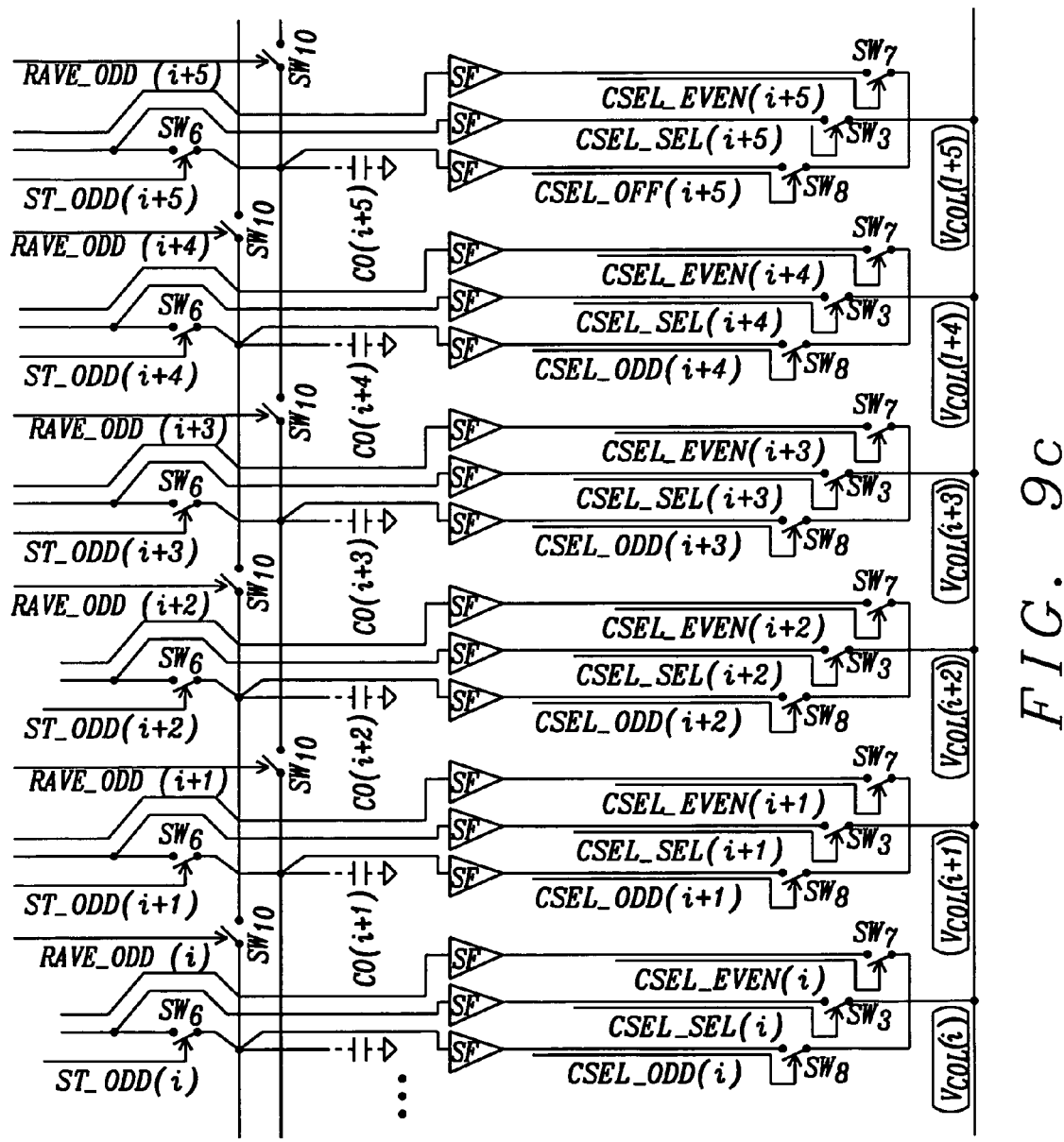
Figure 9D:
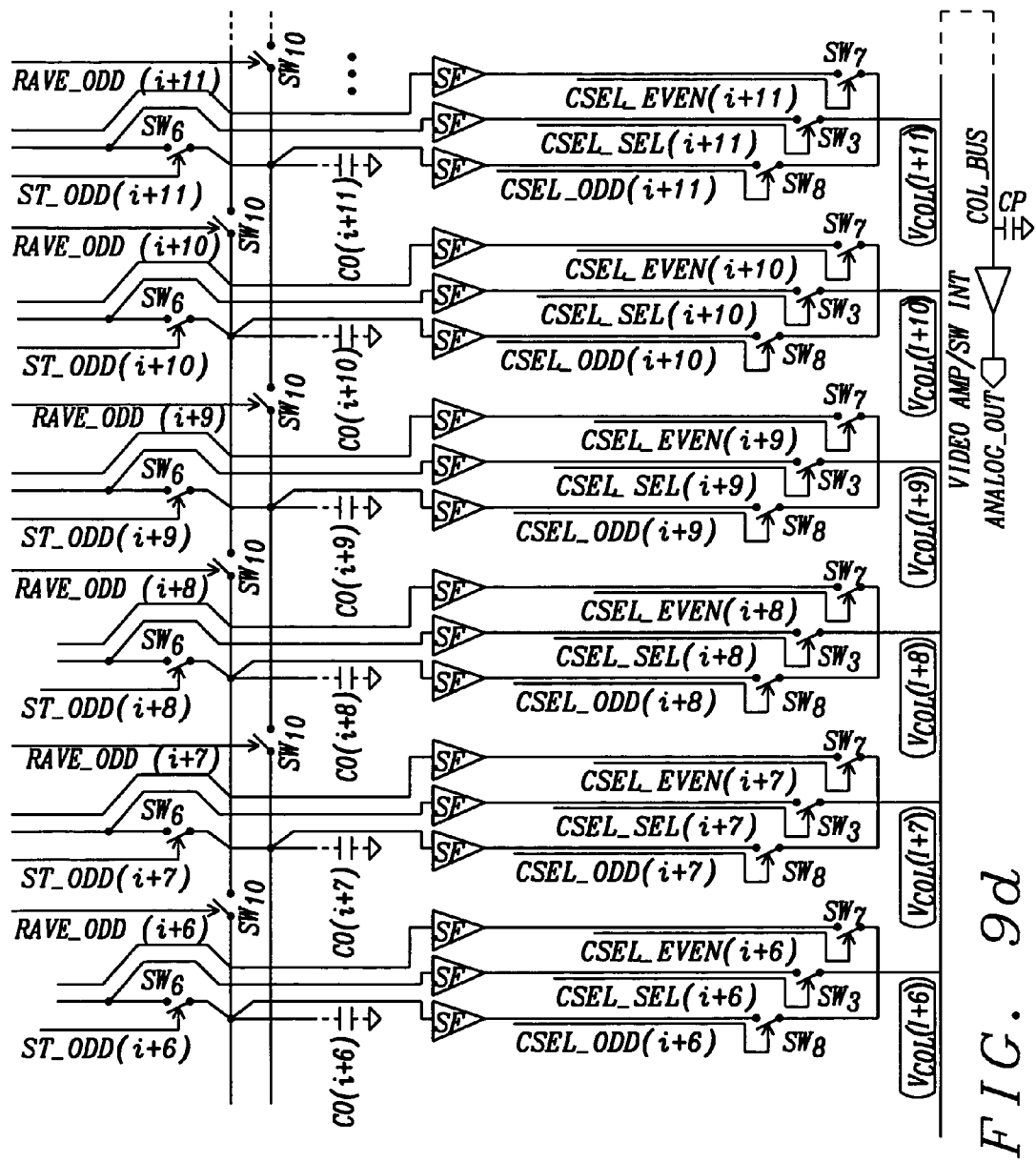

Referring now to FIG. 8, the effective circuit of sample and hold circuit 125 after the pixel sample and hold phase as shown in FIG. 6. In the effective circuit of the sample and hold circuit, the capacitor CS is the serial capacitor of capacitors CS1 and CS2. (i.e., CS=(CS1*CS2)/CS1+CS2). The differential output signal VOUT is dependant upon the operation rows and columns and can be the output of red (R), green-1 (G1), green-2 (G2), or blue (B) pixel for a selected row and column.

FIGS. 9a-9d, in composite, illustrate multiple sections of the column sample and hold 125 column averaging circuit 130, the row averaging circuit 135, and the source followers SF1, SF2, and SF3 that hereinafter are referred to as the Sample and Hold Column Averaging Circuit (SHCAC). Each section is connected to receive the light conversion electrical signal from a CMOS active pixel sensor on a selected row of one column of CMOS active pixel array sensors. FIGS. 9a-9d show, by example the effective column SHCAC block shown of FIG. 8 for twelve columns (from column (i) to column (i+11)). Each of the effective column SHCAC blocks as shown function as described for the sample and hold circuit 125, the column averaging circuit 130, and the row averaging circuit 135 of FIG. 6. For an n:1 ratio image decimation, the individual pixels are combined by the decimation circuit 150 of FIG. 5 into super-pixels having 2n physical columns and 2n physical rows of pixels that define the columns and rows of the super-pixels. Each super-pixel includes n red (R), n green-1 (G1), n green-2 (G2), and n blue (B) pixels. The averaging and binning operations of the pixels in the super-pixel gives the effective red (R), green-1 (G1), green-2 (G2), and blue (B) signals for each Bayer patterned supper-pixel set.

Figure 10A:
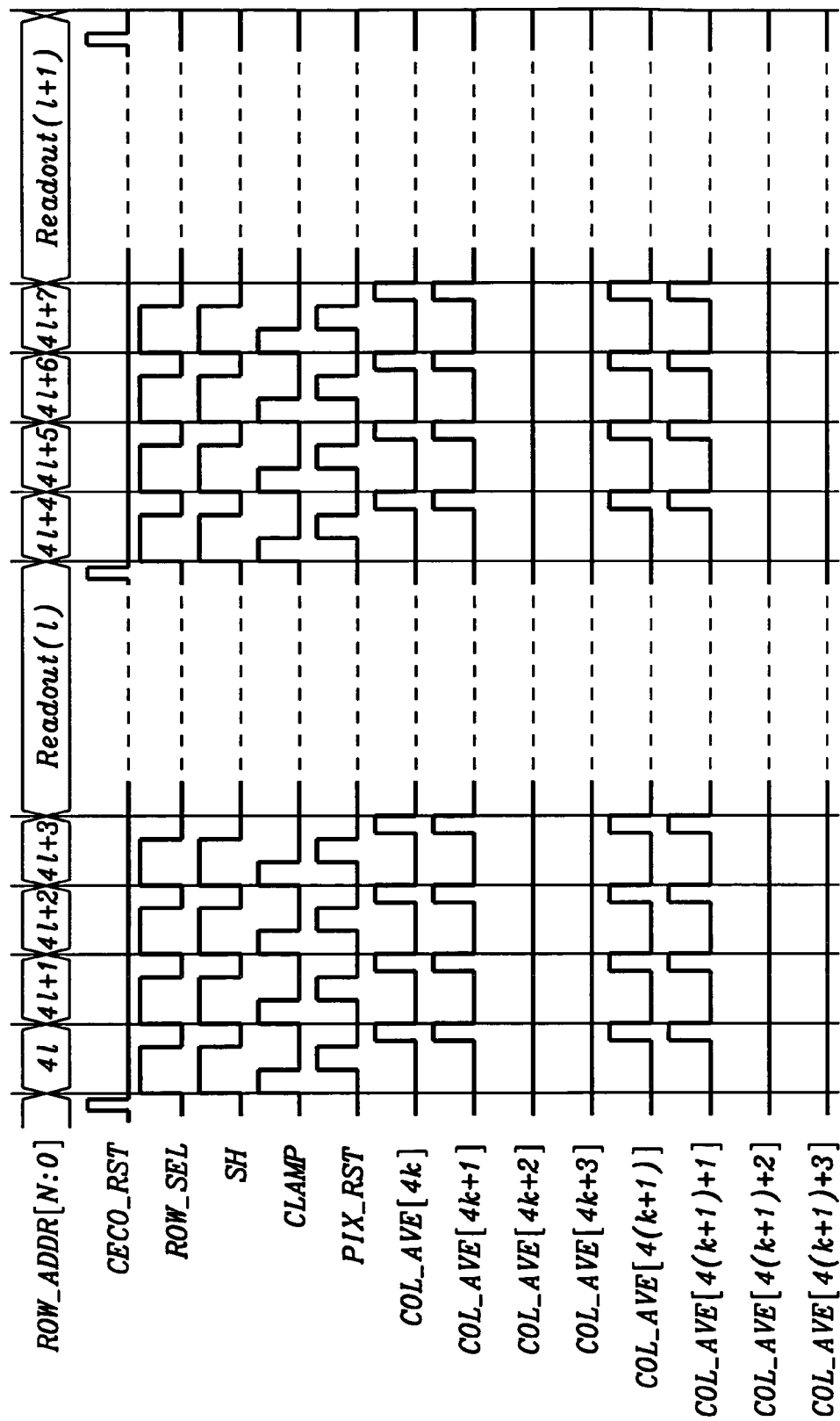
FIGS. 10a-10b are timing diagrams for operation of the image resolution adjustment circuit of this invention of FIGS. 9a-9d showing column averaging for a 2:1 decimation for the image resolution adjustment.
Figure 10B:
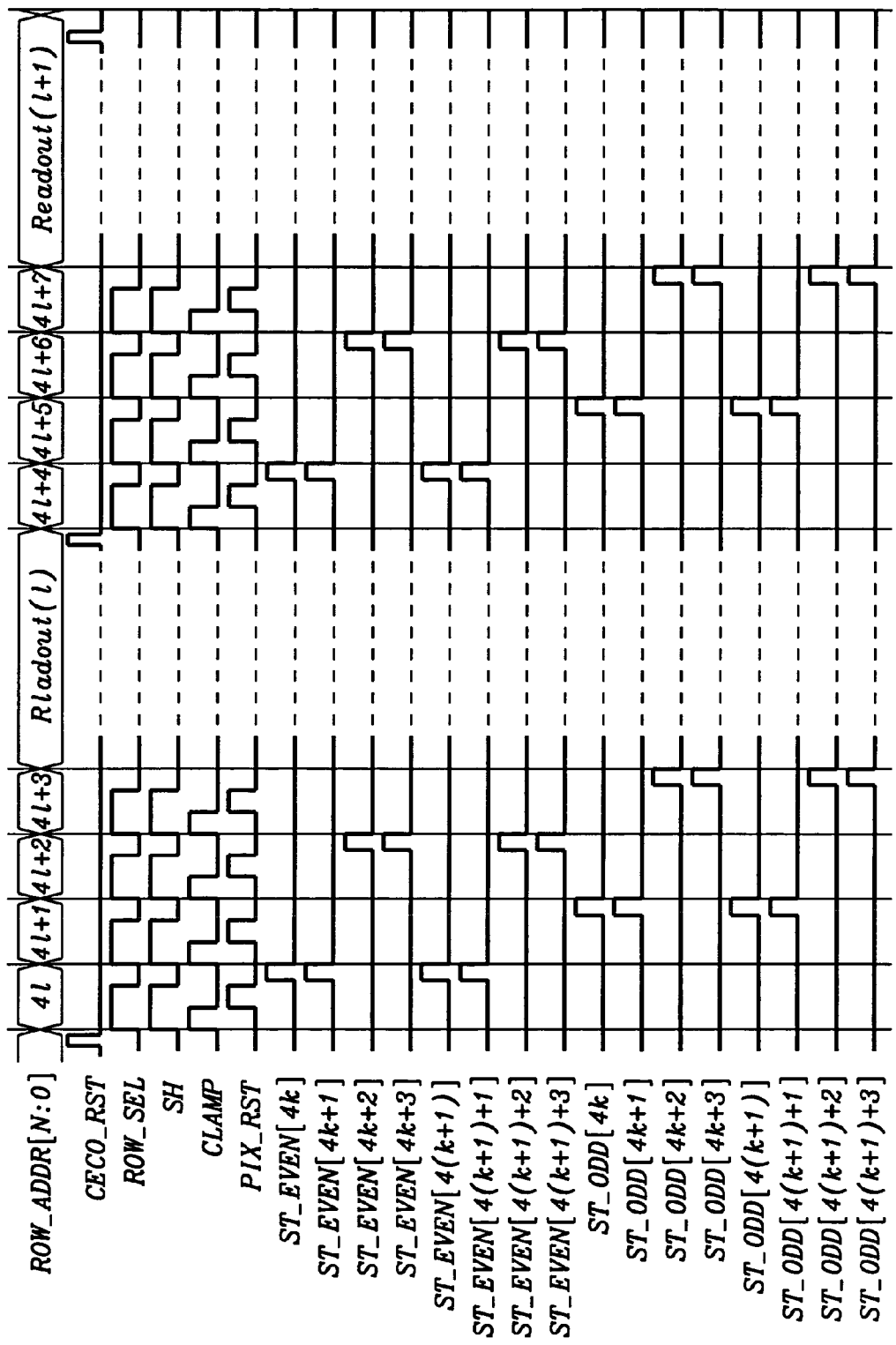

To illustrate the operation of column averaging and row binning or averaging, the operation of the SHCAC of FIGS. 9a-9d will be explained using a decimation ratio of 2:1 in a first example and for a decimation ratio of 3:1 in a second example. For the decimation ratio of 2:1, the column and rows of each super-pixel starts at the physical column and row addresses that are a multiple of the decimation ratio. In a Bayer patterned array of CMOS active pixel sensors, the evaluation to determine the magnitude of the colors of each of the super-pixels requires that twice the decimation ratio (n) of physical rows and columns (2n=4, where n=2). By setting the column counter to i=4k in the section of column SHCAC block shown in FIGS. 9a-9b, physical column i represents the start column of the super-pixel column. At this setting, columns 4k, 4k+1, 4k+2, and 4k+3 cover the range of kth super-pixel column in the column direction of the array of CMOS active pixel sensors. Columns 4(k+1)=4k+4, 4(k+1)+1, 4(k+1)+2 and 4(k+1)+3 cover the range of (k+1)th super-pixel column in the physical column direction. FIGS. 10a and 10b provide the waveforms that demonstrate the analog signal process for the averaging of the physical columns of the super-pixel columns of the lth and (l+1)th super-pixel row of the array of CMOS active pixel sensors. At the 2:1 image decimation ratio, the lth row of super-pixel includes rows 4l, 4l+1, 4l+2, and 4l+3 and the (l+1)th row of super-pixel includes rows 4(l+1)=4l+4, 4l+5, 4l+6, and 4l+7.

As described above, the column averaging operation is controlled by the column averaging switches $SW_4$, even row signal transfer switch $SW_5$, and odd row signal transfer switch $SW_6$ in each column SHCAC circuit. The column averaging switches $SW_4$, even row signal transfer switch $SW_5$, and odd row signal transfer switch $SW_6$ are programmed ON/OFF depending on the image decimation ratio (n). The waveforms in FIGS. 10a and 10b show the activation signals for the column averaging switches $SW_4$, even row signal transfer switch $SW_5$, and odd row signal transfer switch $SW_6$. The row addresses ROW_ADDR[N:0] for the $l^{th}$ row of a super-pixel by addressing the physical row 4+l, 4l+1, 4l+2, and 4l+3 which are then readout during the readout period.

Figure 7:
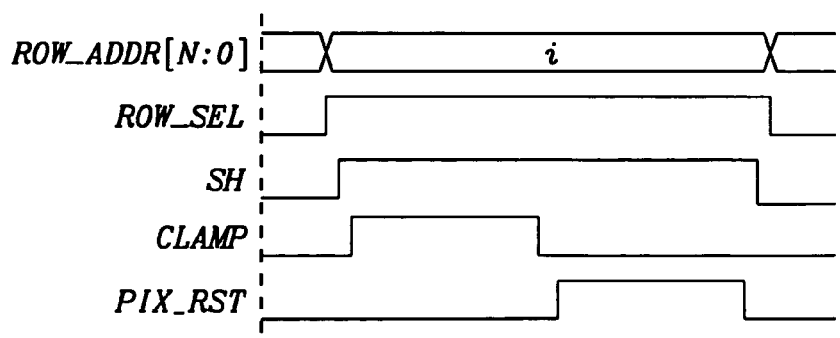

At the beginning of the evaluation of the lth row of the super-pixel, all the even and odd storage capacitors CE(i) and CO(i) are reset, as described in FIG. 6b, by the global reset signal CECO_RST. The reset pulse CECO_RST is given after the readout period of the information of (l-1)th super-pixel row. The row addresses ROW_ADDR[N:0] are set to address the desired physical row of the lth row of the super-pixel. The row select signal ROW_SEL, the sample and hold signal SH, the clamp signal CLAMP, and the pixel reset signal PIX_RST are activated as shown in FIG. 7 to convert the light signal integrated in the pixel to the differential light conversion electrical output signal VOUT(i).

The averaging of the columns of the first super-pixel row 1 begins with the column averaging of the first and second red (R) pixels of the even row 4l by setting the column averaging signal COL_AVE[4k] to activate the column averaging switch SW4 to connect the storage capacitor CS(i) in parallel with the storage capacitor CS(i+2) to average the first and second red (R) pixel signals of pixel [4k, 4l] and pixel[4k+2, 4l]. The store even activation signal ST_EVEN[4k] is set to activate the even row signal transfer switch SW5 to transfer and store the averaging light conversion signal of the first pixel of the lth row of the super-pixel on capacitor CE[4k].

Simultaneously, the column averaging of the first and second green-1 (G1) pixels of the super-pixel of the even row 4l is accomplished by setting the column averaging signal COL_AVE[4k+1] to activate the column averaging switch SW4 to connect the storage capacitor CS(i+1) in parallel with the storage capacitor CS(i+3) to average the first and second green-1 (G1) pixel signals of pixel [4k+1, 4l] and pixel[4k+3, 4l]. The store even activation signal ST_EVEN[4k+1] is set to activate the even row signal transfer switch SW5 to transfer and store the averaging light conversion signal of the second pixel of the lth row of the super-pixel on capacitor CE[4k+1].

The column averaging of the third and fourth red (R) pixels of the even row 4l by setting the column averaging signal COL_AVE[4(k+1)] to activate the column averaging switch SW4 to connect the storage capacitor CS(i+4) in parallel with the storage capacitor CS(i+6) to average the third and fourth red (R) pixel signals of pixel [4(k+1), 4l] and pixel[4(k+1)+2, 4l]. The store even activation signal ST_EVEN[4(k+1)] is set to activate the even row signal transfer switch SW5 to transfer and store the averaging light conversion signal of the third pixel of the lth row of the super-pixel on capacitor CE[4(k+1)].

The column averaging of the third and fourth green-1 (G1) pixels of the super-pixel of the even row 4l is accomplished by setting the column averaging signal COL_AVE[4(k+1)+1] to activate the column averaging switch SW4 to connect the storage capacitor CS(i+5) in parallel with the storage capacitor CS(i+7) to average the first and second green-1 (G1) pixel signals of pixel [4(k+1)+1, 4l] and pixel[4(k+1)+3, 4l]. The store even activation signal ST_EVEN[4(k+1)+1] is set to activate the even row signal transfer switch SW5 to transfer and store the averaging light conversion signal of the second pixel of the lth row of the super-pixel on capacitor CE[4(k+1)+1].

The row select signal ROW_SEL is activated to select the second physical row 4l+1 of the first super-pixel row 1. The sample and hold signal SH, the clamp signal CLAMP, and the pixel reset signal PIX_RST are activated as shown in FIG. 7 to convert the light signal to the differential light conversion electrical output signal VOUT(i) and transfer the differential light conversion electrical output signal VOUT(i) to the storage capacitor CS(i) for each column (i).

The averaging of the first and second green-2 (G2) pixels of the odd row 4l+1 by setting the column averaging signal COL_AVE[4k] to activate the column averaging switch SW4 to connect the storage capacitor CS(i) in parallel with the storage capacitor CS(i+2) to average the first and second green-2 (G2) pixel signals of pixel [4k, 4l+1] and pixel[4k+2, 4l+1]. The store odd activation signal ST_ODD[4k] is set to activate the odd row signal transfer switch SW5 to transfer and store the averaging light conversion signal of the first pixel of the lth row of the super-pixel on capacitor CO[4k].

The column averaging of the first and second blue (B) pixels of the super-pixel of the odd row 4l+1 is accomplished by setting the column averaging signal COL_AVE[4k+1] to activate the column averaging switch SW4 to connect the storage capacitor CS(i+1) in parallel with the storage capacitor CS(i+3) to average the first and second blue (B) pixel signals of pixel [4k+1, 4l+1] and pixel[4k+3, 4l+1]. The store odd activation signal ST_ODD[4k+1] is set to activate the odd row signal transfer switch SW5 to transfer and store the averaging light conversion signal of the second pixel of the lth row of the super-pixel on capacitor CO[4k+1].

The column averaging of the third and fourth green-2 (G2) pixels of the odd row 4l+1 by setting the column averaging signal COL_AVE[4(k+1)] to activate the column averaging switch SW4 to connect the storage capacitor CS(i+4) in parallel with the storage capacitor CS(i+6) to average the third and fourth green-2 (G2) pixel signals of pixel [4(k+1), 4l+1] and pixel[4(k+1)+2, 4l+1]. The store odd activation signal ST_ODD[4(k+1)] is set to activate the odd row signal transfer switch SW5 to transfer and store the averaging light conversion signal of the third pixel of the lth row of the super-pixel on capacitor CO[4(k+1)].

The column averaging of the third and fourth blue (B) pixels of the super-pixel of the odd row 4l+1 is accomplished by setting the column averaging signal COL_AVE[4(k+1)+1] to activate the column averaging switch SW4 to connect the storage capacitor CS(i+5) in parallel with the storage capacitor CS(i+7) to average the first and second green-1 (G1) pixel signals of pixel [4(k+1)+1, 4l] and pixel[4(k+1)+3, 4l]. The store odd activation signal ST_ODD[4(k+1)+1] is set to activate the odd row signal transfer switch SW5 to transfer and store the averaging light conversion signal of the second pixel of the lth row of the super-pixel on capacitor CO[4(k+1)+1].

The even and odd storage capacitors CE(i) and CO(i), CE(i+1) and CO(i+1) CE(i+4) and CO(i+4), CE(i+5) and CO(i+5) store the differential light conversion electrical output signal VOUT for the averaged columns of the first and second rows of the lth row of super-pixels. Likewise, as shown in the following, the even and odd storage capacitors CE(i+2) and CO(i+2), CE(i+3) and CO(i+3), CE(i+6) and CO(i+6), CE(i+7) and CO(i+7) store the differential light conversion electrical output signals VOUT for the averaged columns of the third and fourth rows of the lth row of super-pixels.

The row addresses ROW_ADDR[N:0] are set to address the desired physical row (4l+2) of the lth row of the super-pixel. The row select signal ROW_SEL, the sample and hold signal SH, the clamp signal CLAMP, and the pixel reset signal PIX_RST are activated as shown in FIG. 7 to convert the light signal to the differential light conversion electrical output signal VOUT(i) for each of the columns.

The averaging of the columns of the row of pixels l+2 begins with the column averaging of the first and second red (R) pixels of the even row 4l+2 by setting the column averaging signal COL_AVE[4k+2] to activate the column averaging switch SW4 to connect the storage capacitor CS(i) in parallel with the storage capacitor CS(i+2) to average the first and second red (R) pixel signals of pixel [4k, 4l+2] and pixel[4k+2, 4l+2]. The store even activation signal ST_EVEN[4k+2] is set to activate the even row signal transfer switch SW5 to transfer and store the averaging light conversion signal of the first pixel of the third row of physical pixels of the lth row of the super-pixel on capacitor CE[4k+2].

Simultaneously, the column averaging of the first and second green-1 (G1) pixels of the super-pixel of the even 4l+2 is accomplished by setting the column averaging signal COL_AVE[4k+1] to activate the column averaging switch SW4 to connect the storage capacitor CS(i+1) in parallel with the storage capacitor CS(i+3) to average the first and second green-1 (G1) pixel signals of pixel [4k+1, 4l+2] and pixel[4k+3, 4l+2]. The store even activation signal ST_EVEN[4k+3] is set to activate the even row signal transfer switch SW5 to transfer and store the averaging light conversion signal of the second pixel of the third row of the lth row of the super-pixel on capacitor CE[4k+3].

The column averaging of the third and fourth red (R) pixels of the even 4l+2 by setting the column averaging signal COL_AVE[4(k+1)] to activate the column averaging switch SW4 to connect the storage capacitor CS(i+4) in parallel with the storage capacitor CS(i+6) to average the third and fourth red (R) pixel signals of pixel [4(k+1), 4l+2] and pixel[4(k+1)+2, 4l+2]. The activation signal ST_EVEN[4(k+1)+2] is set to activate the even row signal transfer switch SW5 to transfer and store the averaging light conversion signal of the third pixel of the third row of the lth row of the super-pixel on capacitor CE[4(k+1)+2].

The column averaging of the third and fourth green-1 (G1) pixels of the super-pixel of the even 4l+2 is accomplished by setting the column averaging signal COL_AVE[4(k+1)] to activate the column averaging switch SW4 to connect the storage capacitor CS(i+5) in parallel with the storage capacitor CS(i+7) to average the first and second green-1 (G1) pixel signals of pixel [4(k+1)+1, 4l+2] and pixel[4(k+1)+3, 4l+2]. The store even activation signal ST_EVEN[4(k+1)+3] is set to activate the even row signal transfer switch SW5 to transfer and store the averaging light conversion signal of the second pixel of the lth row of the super-pixel on capacitor CE[4(k+1)+3].

The row addresses ROW_ADDR[N:0] are set to address the fourth physical 4l+3 of the first super-pixel row l. The row select signal ROW_SEL, sample and hold signal SH, the clamp signal CLAMP, and the pixel reset signal PIX_RST are activated as shown in FIG. 7 to convert the light signal to the differential light conversion electrical output signal VOUT(i) and transfer the differential light conversion electrical output signal VOUT(i) to the storage capacitor CS(i) for each column (i) of the physical 4l+3.

The averaging of the first and second green-2 (G2) pixels of the odd row. 4l+3 by setting the column averaging signal COL_AVE[4k] to activate the column averaging switch SW4 to connect the storage capacitor CS(i) in parallel with the storage capacitor CS(i+2) to average the first and second green-2 (G2) pixel signals of pixel [4k, 4l+3] and pixel[4k+2, 4l+3]. The store odd activation signal ST_ODD[4k+2] is set to activate the odd row signal transfer switch SW5 to transfer and store the averaging light conversion signal of the first pixel of the 4l+3 row of the lth row of the super-pixel on capacitor CO[4k+2].

The column averaging of the first and second blue (B) pixels of the super-pixel of the odd 4l+3 is accomplished by setting the column averaging signal COL_AVE[4k+1] to activate the column averaging switch $SW_4$ to connect the storage capacitor CS(i+1) in parallel with the storage capacitor CS(i+3) to average the first and second blue (B) pixel signals of pixel [4k+1, 4l+3] and pixel[4k+3, 4l+3]. The store odd activation signal ST_ODD[4k+3] is set to activate the odd row signal transfer switch $SW_5$ to transfer and store the averaging light conversion signal of the second pixel of the $l^{th}$ row of the super-pixel on capacitor CO[4k+3].

The column averaging of the third and fourth green-2 (G2) pixels of the odd 4l+3 by setting the column averaging signal COL_AVE[4(k+1)] to activate the column averaging switch $SW_4$ to connect the storage capacitor CS(i+4) in parallel with the storage capacitor CS(i+6) to average the third and fourth green-2 (G2) pixel signals of pixel [4(k+1), 4l+3] and pixel [4(k+1)+2, 4l+3]. The store odd activation signal ST_ODD [4(k+1)+2] is set to activate the odd row signal transfer switch $SW_5$ to transfer and store the averaging light conversion signal of the third pixel of the $l^{th}$ row of the super-pixel on capacitor CO[4(k+1)+2].

The column averaging of the third and fourth blue (B) pixels of the super-pixel of the odd 4l+3 is accomplished by setting the column averaging signal COL_AVE[4(k+1)+1] to activate the column averaging switch $SW_4$ to connect the storage capacitor CS(i+5) in parallel with the storage capacitor CS(i+7) to average the first and second green-1 (G1) pixel signals of pixel [4(k+1)+1, 4l+3] and pixel[4(k+1)+3, 4l+3]. The store odd activation signal ST_ODD[4(k+1)+3] is averaging light conversion signal of the second pixel of the $l^{th}$ row of the super-pixel on capacitor CO[4(k+1)+3].

Figure 11:
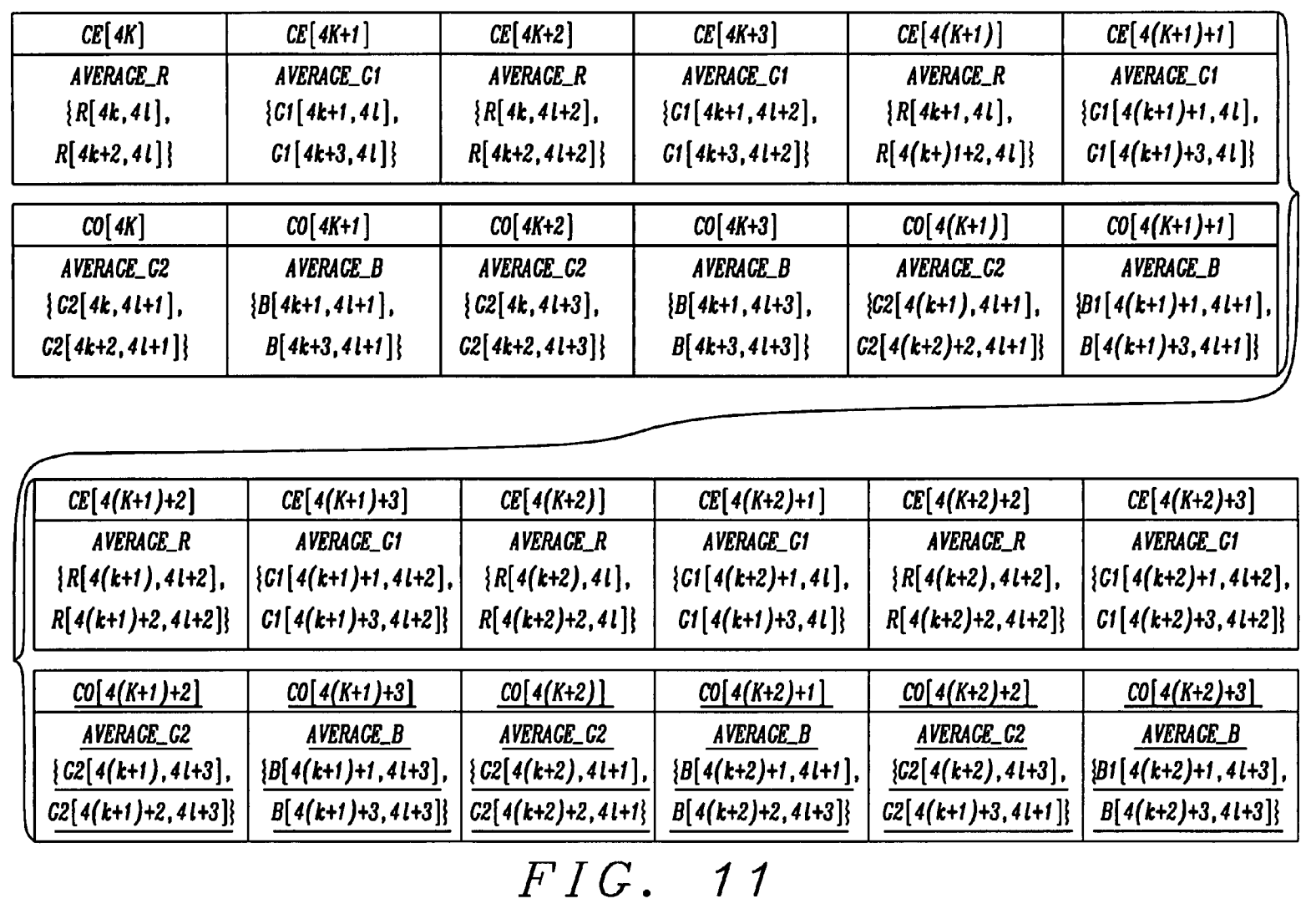

After the completion of the column averaging of the four physical rows of 4l, 4l+1, 4l+2, and 4l+3 described above, the averaged pixel information in column direction has been stored in the capacitors CE(i) and CO(i). FIG. 11 shows the differential light conversion electrical output signals that are averaged and stored on each storage capacitor CE(i) and CO(i) in column SHCAC block. During the readout time Readout(l) of the super-pixel row l, the stored differential light conversion electrical output signals are row averaged or row binned and are readout to external circuitry such as an analog-to-digital converter through the video amplifier/switched capacitor integrator circuit 170 of FIGS. 9c-9d. Details on readout the averaged column differential light conversion electrical output signals to the column bus COL_BUS is described hereinafter.

After read out the signals of $l^{th}$ row of super-pixel, the storage capacitors CE(i) and CO(i) are, as described in FIG. 6b, reset by the reset pulse CECO_RST. Then, the operation on $(l+1)^{th}$ row of super-pixels starts and is identical to that described above for the $(l)^{th}$ row of super-pixels. The $(l+1)^{th}$ row of super-pixels includes the physical rows 4(l+1), 4(l+1)+1, 4(l+1)+2, and 4(l+1)+3 and the physical columns 4k, 4k+1, 4k+2, 4k+3, 4(k+1), 4(k+1)+1, 4(k+1)+2, and 4(k+1)+3. The operation as described above stores the averaged differential light conversion electrical output signals of each of the columns of the selected row on the storage capacitors CE(i) and CO(i). The column averaged differential light conversion electrical output signals are row averaged or row binned and are transferred during the readout time Readout (l+1) to the external circuitry such as an analog-to-digital converter for further processing.

Figure 12A:
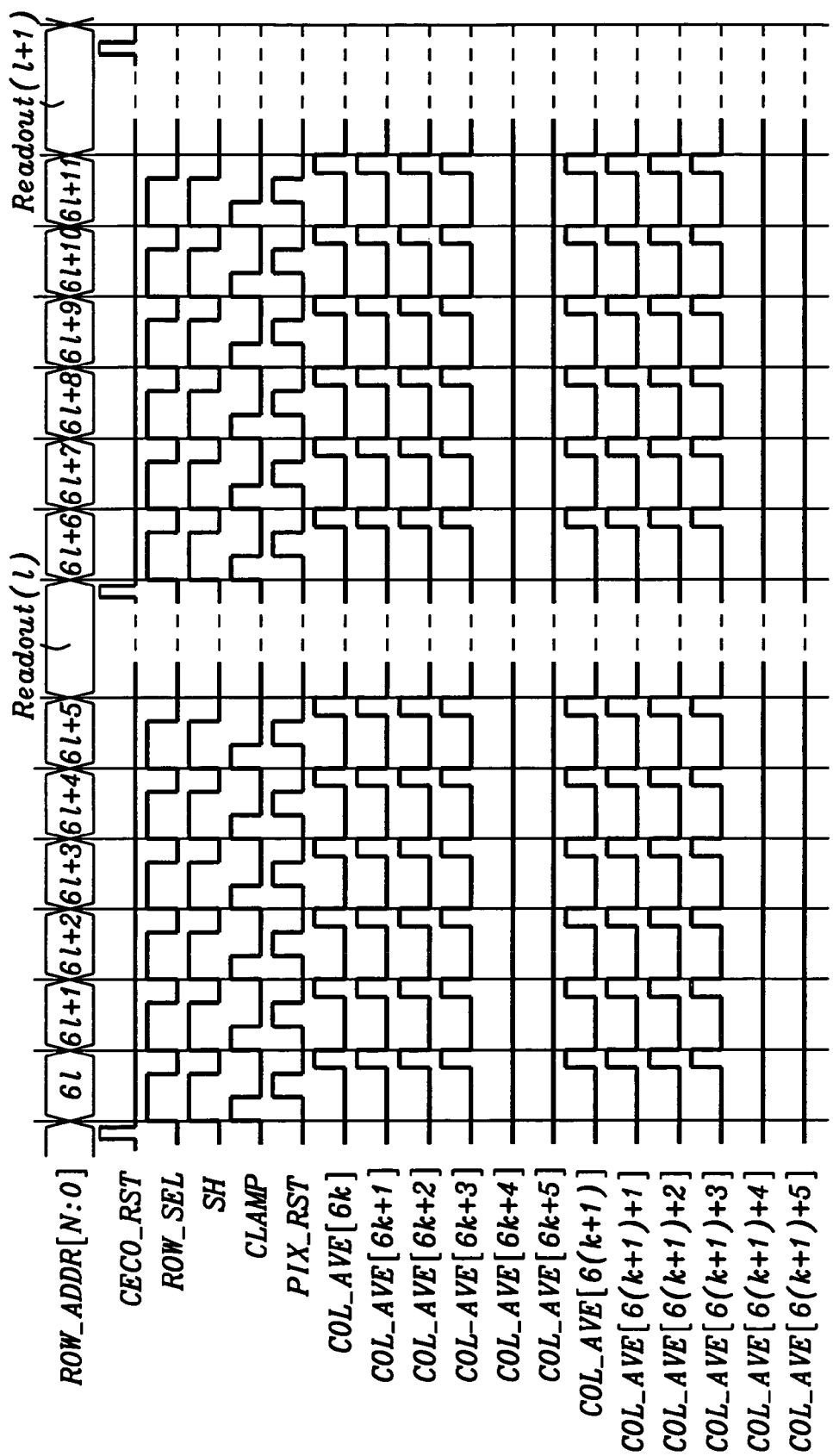
FIGS. 12a-12c are timing diagrams for operation of the image resolution adjustment circuit of this invention of FIGS. 9a-9d showing column averaging for a 3:1 decimation for the image resolution adjustment.
Figure 12B:
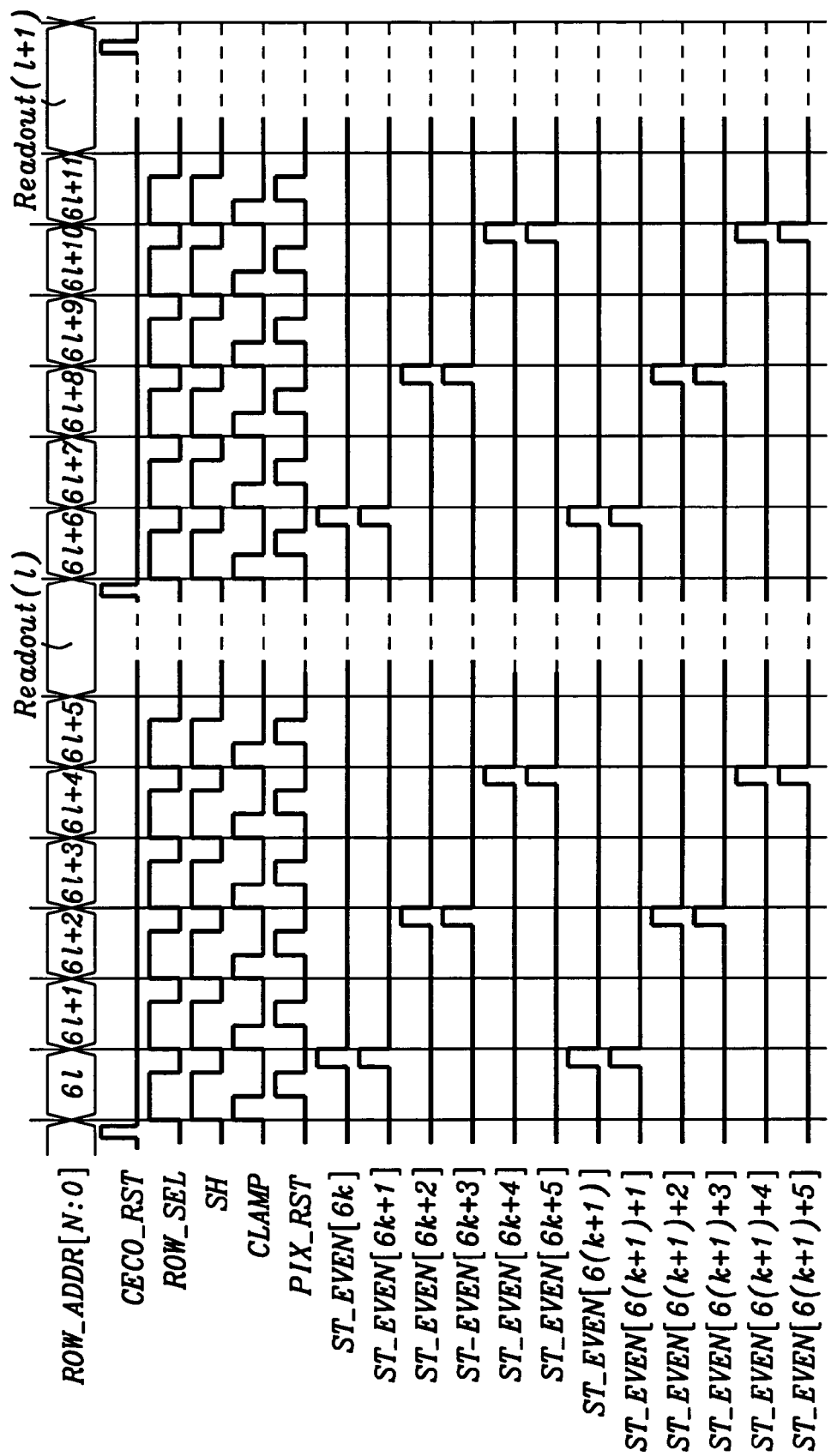
Figure 12C:
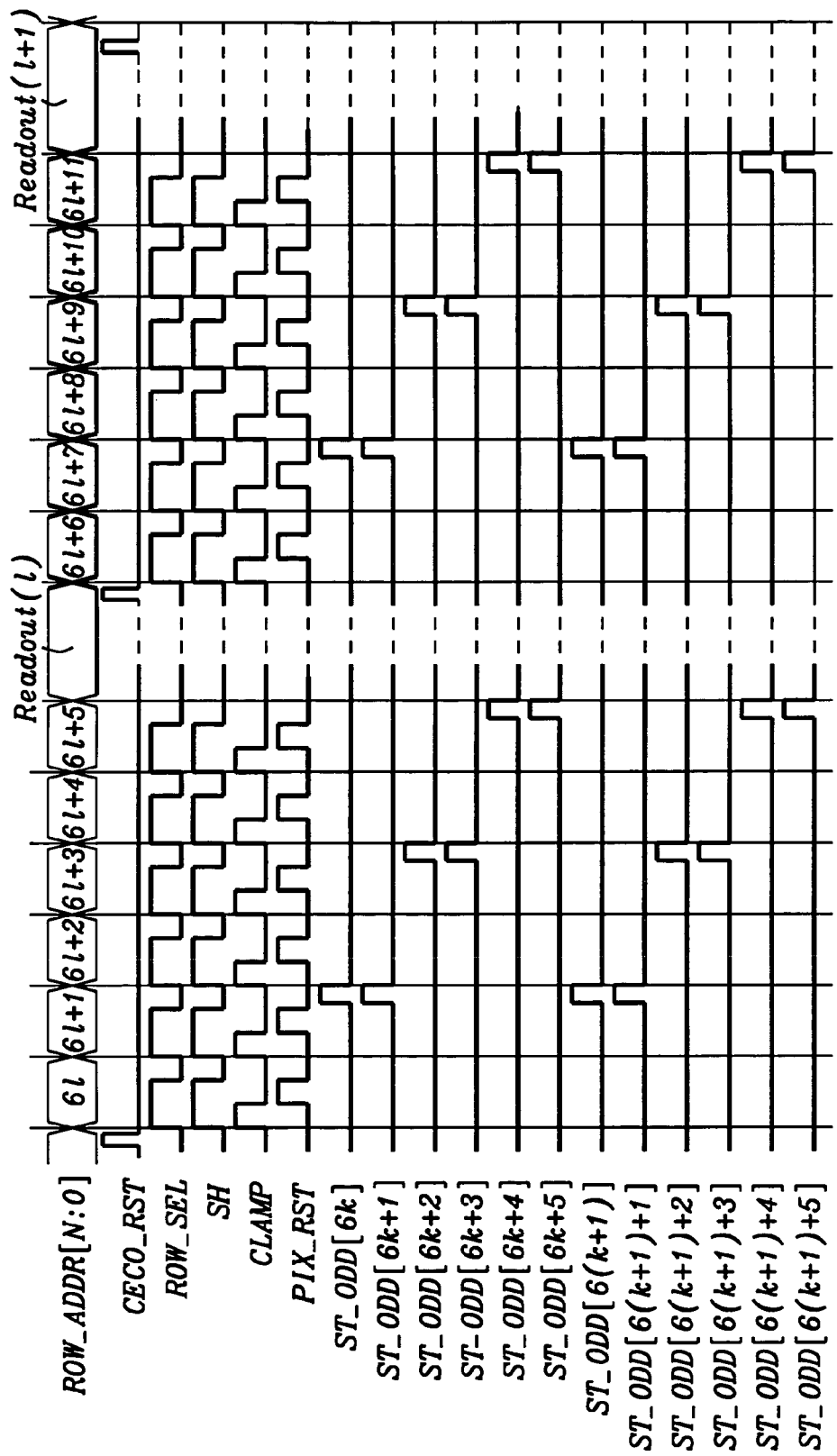

The second example for a decimation ratio of 3:1 is shown in FIGS. 12a, 12b, and 12c. For the decimation ratio of 3:1, the column and rows of each super-pixel starts at the physical column and row addresses that are a multiple of the decimation ratio. In a Bayer patterned array of CMOS active pixel sensors, the evaluation to determine the magnitude of the colors of each of the super-pixels requires that twice the decimation ratio (n) of physical rows and columns (2n=6, where n=3). By setting the column counter to i=6k in the section of column SHCAC block shown in FIGS. 9a-9d, physical column i represents the start column of the super-pixel column. At this setting, columns 6k, 6k+1, 6k+2, 6k+3, 6k+4, and 6k+5 cover the range of $k^{th}$ super-pixel column in the column direction of the array of CMOS active pixel sensors. Columns 6(k+1)=6k+4, 6(k+1)+1, 6(k+1)+2, 6(k+1)+3, 6(k+1)+4, and 6(k+1)+5, cover the range of $(k+1)^{th}$ super-pixel column in the physical column direction. FIGS. 12a, 12b, and 12c provide the waveforms that demonstrate the analog signal process for the averaging of the physical columns of the super-pixel columns the $l^{th}$ and $(l+1)^{th}$ super-pixel row of the array of CMOS active pixel sensors. At the 3:1 image decimation ratio, the $l^{th}$ row of super-pixel includes rows 6l, 6l+1, 6l+2, 6l+3, 6l+4, and 6l+5, and the $(l+1)^{th}$ row of super-pixel includes rows 6(l+1)=6l+6, 6l+7, 6l+8, 6l+9, 6l+10, and 6l+11.

As described above, the column averaging operation is controlled by the column averaging switches $SW_4$, even row signal transfer switch $SW_5$, and odd row signal transfer switch $SW_6$ in each column SHCAC circuit. The column averaging switches $SW_4$, even row signal transfer switch $SW_5$, and odd row signal transfer switch $SW_6$ are programmed ON/OFF depending on the image decimation ratio (n). The waveforms in FIGS. 12a, 12b, and 12c show the activation signals for the column averaging switches $SW_4$, even row signal transfer switch $SW_5$, and odd row signal transfer switch $SW_6$. The row addresses ROW_ADDR[N:0] for the $l^{th}$ row of a super-pixel by addressing the physical row 6l, 6l+1, 6l+2l 6l+3, 6l+4, and 6l+5 which are row averaged or row binnedand are then readout during the readout period Readout(l).

At the beginning of the evaluation of the $l^{th}$ row of the super-pixel, all the even and odd storage capacitors CE(i) and CO(i), are, as described in FIG. 6b, reset by the global reset signal CECO_RST. The reset pulse CECO_RST is given after the readout period of the information of $(l-1)^{th}$ super-pixel row. The row addresses ROW_ADDR[N:0] are set to address the desired first physical row (6l) of the $l^{th}$ row of the super-pixel. The row select signal ROW_SEL, the sample and hold signal SH, the clamp signal CLAMP, and the pixel reset signal PIX_RST are activated as shown in FIG. 7 to convert the light signal to the differential light conversion electrical output signal $V_{OUT}(i)$.

The averaging of the columns of the first super-pixel row l begins with the column averaging of the first, second, and third red (R) pixels of the even row 6l by setting the column averaging signals COL_AVE[6k] and COL_AVE[6k+2] to activate the column averaging switches $SW_4$ to connect the storage capacitor CS(i) in parallel with the storage capacitors CS(i+2) and CS(i+4) to average the first, second, and third red (R) pixel signals of pixel [6k, 6l], pixel[6k+2, 6l], and pixel [6k+4, 6l]. The store even activation signal ST_EVEN[6k] is set to activate the even row signal transfer switch $SW_5$ to transfer and store the averaged light conversion signal of the first pixel of the $l^{th}$ row of the super-pixel on capacitor CE[6k].

Simultaneously, the column averaging of the first, second, and third green-1 (G1) pixels of the super-pixel of the even row 6l is accomplished by setting the column averaging signals COL_AVE[6k+1] and COL_AVE[6k+3] to activate the column averaging switches $SW_4$ to connect the storage capacitor CS(i+1) in parallel with the storage capacitors CS(i+3) and CS(i+5) to average the first, second, and third green-1 (G1) pixel signals of pixel [6k+1, 6l], pixel[6k+3, 6l], and pixel[6k+5, 6l]. The store even activation signal ST_EVEN[6k+1] is set to activate the even row signal transfer switch $SW_5$ to transfer and store the averaged light conversion signal of the second pixel of the $l^{th}$ row of the super-pixel on capacitor CE[6k+1].

The column averaging of the fourth, fifth, and sixth red (R) pixels of the even row 6l by setting the column averaging signals COL_AVE[6(k+1)] and COL_AVE[6(k+1)+2] to activate the column averaging switch $SW_4$ to connect the storage capacitor CS(i+6) in parallel with the storage capacitors CS(i+8) and CS(i+10) to average the fourth, fifth, and sixth red (R) pixel signals of pixel [6(k+1), 6l] and pixel[6(k+1)+2, 6l]. The store even activation signal ST_EVEN[6(k+1)] is set to activate the even row signal transfer switch $SW_5$ to transfer and store the averaging light conversion signal of the third pixel of the $l^{th}$ row of the super-pixel on capacitor CE[6(k+1)].

The column averaging of the fourth, fifth, and sixth green-1 (G1) pixels of the super-pixel of the even row 6l is accomplished by setting the column averaging signals COL_AVE[6(k+1)+1] and COL_AVE[6(k+1)+3] toactivate the column averaging switches $SW_4$ to connect the storage capacitor CS(i+6) in parallel with the storage capacitor CS(i+8) and CS(i+10) to average the fourth, fifth, and sixth green-1 (G1) pixel signals of pixel [6(k+1)+1, 6l] and pixel[6(k+1)+3, 6l]. The store even activation signal ST_EVEN[6(k+1)+1] is set to activate the even row signal transfer switch $SW_5$ to transfer and store the averaging light conversion signal of the second pixel of the $l^{th}$ row of the super-pixel on capacitor CE[6(k+1)+1].

The row addresses ROW_ADDR[N:0] are set to address the second physical row (6l+1) of the $l^{th}$ row of the super-pixel. The row select signal ROW_SEL is activated to select the second physical row 6l+1 of the first super-pixel row l. The sample and hold signal SH, the clamp signal CLAMP, and the pixel reset signal PIX_RST are activated as shown in FIG. 7 to convert the light signal to the differential light conversion electrical output signal $V_{OUT}(i)$ and transfer the differential light conversion electrical output signal $V_{OUT}(i)$ to the storage capacitor CS(i) for each column (i).

The averaging of the first, second, and third green-2 (G2) pixels of the odd row 6l+1 by setting the column averaging signals COL_AVE[6k] and COL_AVE[6k+2] to activate the column averaging switches $SW_4$ to connect the storage capacitor CS(i) in parallel with the storage capacitors CS(i+2) and CS(i+4) to average the first, second, and third green-2 (G2) pixel signals of pixel [6k, 6l+1], pixel[6k+2, 6l+1], and[6k+4, 6l+1]. The store odd activation signal ST_ODD[6k] is set to activate the odd row signal transfer switch $SW_5$ to transfer and store the averaging light conversion signal of the first pixel of the $l^{th}$ row of the super-pixel on capacitor CO[6k].

The column averaging of the first, second, and third blue (B) pixels of the super-pixel of the odd row 6l+1 is accomplished by setting the column averaging signals COL_AVE

[6k+1] and COL_AVE[6k+3] to activate the column averaging switch $SW_4$ to connect the storage capacitor CS(i+1) in parallel with the storage capacitors CS(i+3) and CS(i+5) to average the first, second, and third blue (B) pixel signals of pixel [6k+1, 6l+1], pixel[6k+3, 6l+1], and pixel[6k+5, 6l+1]. The store odd activation signal ST_ODD[6k+1] is set to activate the odd row signal transfer switch $SW_5$ to transfer and store the averaging light conversion signal of the second pixel of the $l^{th}$ row of the super-pixel on capacitor CO[6k+1].

The column averaging of the fourth, fifth, and sixth green-2 (G2) pixels of the odd row 6l+1 by setting the column-averaging signals COL_AVE[6(k+6)] and COL_AVE[6(k+8)] to activate the column averaging switch $SW_4$ to connect the storage capacitor CS(i+6) in parallel with the storage capacitors CS(i+8) and CS(i+10) to average the fourth, fifth, and sixth green-2 (G2) pixel signals of pixel [6(k+1), 6l+1], pixel [6(k+1)+2, 6l+1], and pixel[6(k+1)+4, 6l+1]. The store odd activation signal ST_ODD[6(k+1)] is set to activate the odd row signal transfer switch $SW_5$ to transfer and store the averaging light conversion signal of the third pixel of the $l^{th}$ row of the super-pixel on capacitor CO[6(k+1)].

The column averaging of the fourth, fifth, and sixth blue (B) pixels of the super-pixel of the odd row 6l+1 is accomplished by setting the column averaging signals COL_AVE[6(k+1)+1] and COL_AVE[6(k+1)+3] to activate the column averaging switch $SW_4$ to connect the storage capacitor CS(i+7) in parallel with the storage capacitors CS(i+9) and CS(i+11) to average the fourth, fifth, and sixth blue (B) pixel signals of pixel [6(k+1)+1, 6l], pixel[6(k+1)+3, 6l], and pixel[6(k+1)+5, 6l]. The store odd activation signal ST_ODD[6(k+1)+1] is set to activate the odd row signal transfer switch $SW_5$ to transfer and store the averaging light conversion signal of the second pixel of the $l^{th}$ row of the super-pixel on capacitor CO[6(k+1)+1].

The row addresses ROW_ADDR[N:0] are set to address the desired third physical row (6l+2) of the $l^{th}$ row of the super-pixel. The row select signal ROW_SEL, the sample and hold signal SH, the clamp signal CLAMP, and the pixel reset signal PIX_RST are activated as shown in FIG. 7 to convert the light signal to the differential light conversion electrical output signal $V_{OUT}(i)$.

The averaging of the columns of the third physical row 6l+2 of the super-pixel row 1 begins with the column averaging of the first, second, and third red (R) pixels of the even row 6l+2 by setting the column averaging signals COL_AVE[6k] and COL_AVE[6k+2] to activate the column averaging switches $SW_4$ to connect the storage capacitor CS(i) in parallel with the storage capacitors CS(i+2) and CS(i+4) to average the first, second, and third red (R) pixel signals of pixel [6k, 6l], pixel[6k+2, 6l+2], and pixel[6k+4, 6l+2]. The store even activation signal ST_EVEN[6k+2] is set to activate the even row signal transfer switch $SW_5$ to transfer and store the averaged light conversion signal of the first pixel of the $l^{th}$ row of the super-pixel on capacitor CE[6k+2].

Simultaneously, the column averaging of the first, second, and third green-1 (G1) pixels of the super-pixel of the even row 6l+2 is accomplished by setting the column averaging signals COL_AVE[6k+1] and COL_AVE[6k+3] to activate the column averaging switches $SW_4$ to connect the storage capacitor CS(i+1) in parallel with the storage capacitors CS(i+3) and CS(i+5) to average the first, second, and third green-1 (G1) pixel signals of pixel [6k+1, 6l+2], pixel[6k+3, 6l+2], and pixel[6k+5, 6l]. The store even activation signal ST_EVEN[6k+3] is set to activate the even row signal transfer switch $SW_5$ to transfer and store the averaged light conversion signal of the second pixel of the $l^{th}$ row of the super-pixel on capacitor CE[6k+3].

The column averaging of the fourth, fifth, and sixth red (R) pixels of the even row 6l+2 by setting the column averaging signals COL_AVE[6(k+1)] and COL_AVE[6(k+1)+2] to activate the column averaging switch $SW_4$ to connect the storage capacitor CS(i+6) in parallel with the storage capacitors CS(i+8) and CS(i+10) to average the fourth, fifth, and sixth red (R) pixel signals of pixel [6(k+1), 6l+2] and pixel[6(k+1)+2, 6l+2]. The store even activation signal ST_EVEN[6(k+1)+2] is set to activate the even row signal transfer switch $SW_5$ to transfer and store the averaging light conversion signal of the third pixel of the $l^{th}$ row of the super-pixel on capacitor CE[6(k+1)+2].

The column averaging of the fourth, fifth, and sixth green-1 (G1) pixels of the super-pixel of the even row 6l+2 is accomplished by setting the column averaging signals COL_AVE[6(k+1)+1] and COL_AVE[6(k+1)+3] to activate the column averaging switches $SW_4$ to connect the storage capacitor CS(i+6) in parallel with the storage capacitor CS(i+8) and CS(i+10) to average the fourth, fifth, and sixth green-1 (G1) pixel signals of pixel [6(k+1)+1, 6l+2] and pixel[6(k+1)+3, 6l+2]. The store even activation signal ST_EVEN[6(k+1)+3] is set to activate the even row signal transfer switch $SW_5$ to transfer and store the averaging light conversion signal of the second pixel of the $l^{th}$ row of the super-pixel on capacitor CE[6(k+1)+3].

The row addresses ROW_ADDR[N:0] are set to address the fourth physical row (6l+3) of the $l^{th}$ row of the super-pixel. The row select signal ROW_SEL is activated to select the fourth physical row 6l+3 of the first super-pixel row 1. The sample and hold signal SH, the clamp signal CLAMP, and the pixel reset signal PIX_RST are activated as shown in FIG. 7 to convert the light signal to the differential light conversion electrical output signal $V_{OUT}(i)$ and transfer the differential light conversion electrical output signal $V_{OUT}(i)$ to the storage capacitor CS(i) for each column (i).

The averaging of the first, second, and third green-2 (G2) pixels of the odd row 6l+3 by setting the column averaging signals COL_AVE[6k] and COL_AVE[6k+2] to activate the column averaging switches $SW_4$ to connect the storage capacitor CS(i) in parallel with the storage capacitors CS(i+2) and CS(i+4) to average the first, second, and third green-2 (G2) pixel signals of pixel [6k, 6l+3], pixel[6k+2, 6l+3], and[6k+4, 6l+3]. The store odd activation signal ST_ODD [6k+2] is set to activate the odd row signal transfer switch $SW_5$ to transfer and store the averaging light conversion signal of the first pixel of the $l^{th}$ row of the super-pixel on capacitor CO[6k+2].

The column averaging of the first, second, and third blue (B) pixels of the super-pixel of the odd row 6l+3 is accomplished by setting the column averaging signals COL_AVE [6k+1] and COL_AVE[6k+3] to activate the column averaging switch $SW_4$ to connect the storage capacitor CS(i+1) in parallel with the storage capacitors CS(i+3) and CS(i+5) to average the first, second, and third blue (B) pixel signals of pixel [6k+1, 6l+3], pixel[6k+3, 6l+3], and pixel[6k+5, 6l+3]. The store odd activation signal ST_ODD[6k+3] is set to activate the odd row signal transfer switch $SW_5$ to transfer and store the averaging light conversion signal of the second pixel of the $l^{th}$ row of the super-pixel on capacitor CO[6k+3].

The column averaging of the fourth, fifth, and sixth green-2 (G2) pixels of the odd row 6l+3 by setting the column averaging signals COL_AVE[6(k+6)] and COL_AVE[6(k+8)] to activate the column averaging switch $SW_4$ to connect the storage capacitor CS(i+6) in parallel with the storage capacitors CS(i+8) and CS(i+10) to average the fourth, fifth, and sixth green-2 (G2) pixel signals of pixel [6(k+1), 6l+3], pixel [6(k+1)+2, 6l+3], and pixel[6(k+1)+4, 6l+3]. The store odd activation signal ST_ODD[6(k+1)+2] is set to activate the odd row signal transfer switch $SW_5$ to transfer and store the averaging light conversion signal of the third pixel of the $l^{th}$ row of the super-pixel on capacitor CO[6(k+1)+2].

The column averaging of the fourth, fifth, and sixth blue (B) pixels of the super-pixel of the odd row 6l+3 is accomplished by setting the column averaging signals COL_AVE [6(k+1)+1] and COL_AVE[6(k+1)+3] to activate the column averaging switch $SW_4$ to connect the storage capacitor CS(i+7) in parallel with the storage capacitors CS(i+9) and CS(i+11) to average the fourth, fifth, and sixth blue (B) pixel signals of pixel [6(k+1)+1, 6l+3], pixel[6(k+1)+3, 6l'3], and pixel[6(k+1)+5, 6l+3]. The store odd activation signal ST_ODD[6(k+1)+3] is set to activate the odd row signal transfer switch $SW_5$ to transfer and store the averaging light conversion signal of the second pixel of the $l^{th}$ row of the super-pixel on capacitor CO[6(k+1)+3].

The row addresses ROW_ADDR[N:0] are set to address the desired fifth physical row (6l+4) of the $l^{th}$ row of the super-pixel. The row select signal ROW_SEL, the sample and hold signal SH, the clamp signal CLAMP, and the pixel reset signal PIX_RST are activated as shown in FIG. 7 to-convert the light signal to the differential light conversion electrical output signal $V_{OUT}(i)$.

The averaging of the columns of the fifth physical row 6l+4 of the super-pixel row l begins with the column averaging of the first, second, and third red (R) pixels of the even row 6l+4 by setting the column averaging signals COL_AVE[6k] and COL_AVE[6k+2] to activate the column averaging switches $SW_4$ to connect the storage capacitor CS(i) in parallel with the storage capacitors CS(i+2) and CS(i+4) to average the first, second, and third red (R) pixel signals of pixel [6k, 6l+4], pixel[6k+2, 6l+4], and pixel[6k+4, 6l+4]. The store even activation signal ST_EVEN[6k+6] is set to activate the even row signal transfer switch $SW_5$ to transfer and store the averaged light conversion signal of the first pixel of the $l^{th}$ row of the super-pixel on capacitor CE[6k+4].

Simultaneously, the column averaging of the first, second, and third green-1 (G1) pixels of the super-pixel of the even row 6l+4 is accomplished by setting the column averaging signals COL_AVE[6k+1] and COL_AVE[6k+3] to activate the column averaging switches $SW_4$ to connect the storage capacitor CS(i+1) in parallel with the storage capacitors CS(i+3) and CS(i+5) to average the first, second, and third green-1 (G1) pixel signals of pixel [6k+1, 6l+4], pixel[6k+3, 6l+4], and pixel[6k+5, 6l+4]. The store even activation signal ST_EVEN[6k+5] is set to activate the even row signal transfer switch $SW_5$ to transfer and store the averaged light conversion signal of the second pixel of the $l^{th}$ row of the super-pixel on capacitor CE[6k+5].

The column averaging of the fourth, fifth, and sixth red (R) pixels of the even row 6l+4 by setting the column averaging signals COL_AVE[6(k+1)] and COL_AVE[6(k+1)+2] to activate the column averaging switch $SW_4$ to connect the storage capacitor CS(i+6) in parallel with the storage capacitors CS(i+8) and CS(i+10) to average the fourth, fifth, and sixth red (R) pixel signals of pixel [6(k+1), 6l+4] and pixel[6(k+1)+2, 6l+4]. The store even activation signal ST_EVEN[6(k+1)+4] is set to activate the even row signal transfer switch $SW_5$ to transfer and store the averaging light conversion signal of the third pixel of the lth row of the super-pixel on capacitor CE[6(k+1)+4].

The column averaging of the fourth, fifth, and sixth green-1 (G1) pixels of the super-pixel of the even row 6l+4 is accomplished by setting the column averaging signals COL_AVE [6(k+1)+1] and COL_AVE[6(k+1)+3] to activate the column averaging switches $SW_4$ to connect the storage capacitor CS(i+6) in parallel with the storage capacitor CS(i+8) and CS(i+10) to average the fourth, fifth, and sixth green-1 (G1) pixel signals of pixel [6(k+1)+1, 6l+4] and pixel[6(k+1)+3, 6l+4]. The store even activation signal ST_EVEN[6(k+1)+5] is set to activate the even row signal transfer switch $SW_5$ to transfer and store the averaging light conversion signal of the second pixel of the $l^{th}$ row of the super-pixel on capacitor CE[6(k+1)+5].

The row addresses ROW_ADDR[N:0] are set to address the sixth physical row (6l+5) of the $l^{th}$ row of the super-pixel. The row select signal ROW_SEL is activated to select the sixth physical row 6l+5 of the first super-pixel row l. The sample and hold signal SH, the clamp signal CLAMP, and the pixel reset signal PIX_RST are activated as shown in FIG. 7 to convert the light signal to the differential light conversion electrical output signal $V_{OUT}(i)$ and transfer the differential light conversion electrical output signal $V_{OUT}(i)$ to the storage capacitor CS(i) for each column (i).

The averaging of the first, second, and third green-2 (G2) pixels of the odd row 6l+5 by setting the column averaging signals COL_AVE[6k] and COL_AVE[6k+2] to activate the column averaging switches $SW_4$ to connect the storage capacitor CS(i) in parallel with the storage capacitors CS(i+2) and CS(i+4) to average the first, second, and third green-2 (G2) pixel signals of pixel [6k, 6l+1], pixel[6k+2, 6l+1], and[6k+4, 6l+1]. The store odd activation signals ST_ODD [6k+4] is set to activate the odd row signal transfer switch $SW_5$ to transfer and store the averaging light conversion signal of the first pixel of the $l^{th}$ row of the super-pixel on capacitor CO[6k+4].

The column averaging of the first, second, and third blue (B) pixels of the odd row 6l+5 is accomplished by setting the column averaging signals COL_AVE[6k+1] and COL_AVE [6k+3] to activate the column averaging switch $SW_4$ to connect the storage capacitor CS(i+1) in parallel with the storage capacitors CS(i+3) and CS(i+5) to average the first, second, and third blue (B) pixel signals of pixel [6k+1, 6l+5], pixel [6k+3, 6l+5], and pixel[6k+5, 6l+5]. The store odd activation signal ST_ODD[6k+5] is set to activate the odd row signal transfer switch $SW_5$ to transfer and store the averaging light conversion signal of the second pixel of the $l^{th}$ row of the super-pixel on capacitor CO[6k+5].

The column averaging of the fourth, fifth, and sixth green-2 (G2) pixels of the odd row 6l+5 by setting the column averaging signals COL_AVE[6(k+6)] and COL_AVE[6(k+8)] to activate the column averaging switch $SW_4$ to connect the storage capacitor CS(i+6) in parallel with the storage capacitors CS(i+8) and CS(i+10) to average the fourth, fifth, and sixth green-2 (G2) pixel signals of pixel [6(k+1), 6l+1], pixel [6(k+1)+2, 6l+1], and pixel[6(k+1)+4, 6l+1]. The store odd activation signal ST_ODD[6(k+1)+4] is set to activate the odd row signal transfer switch $SW_5$ to transfer and store the averaging light conversion signal of the third pixel of the $l^{th}$ row of the super-pixel on capacitor CO[6(k+1)+4].

The column averaging of the fourth, fifth, and sixth blue (B) pixels of the super-pixel of the odd row 6l+5 is accomplished by setting the column averaging signals COL_AVE [6(k+1)+1] and COL_AVE[6(k+1)+3] to activate the column averaging switch $SW_4$ to connect the storage capacitor CS(i+7) in parallel with the storage capacitors CS(i+9) and CS(i+11) to average the fourth, fifth, and sixth blue (B) pixel signals of pixel [6(k+1)+1, 6l+5], pixel[6(k+1)+3, 6l+5], and pixel[6(k+1)+5, 6l+5]. The store odd activation signal ST_ODD[6(k+1)+5] is set to activate the odd row signal transfer switch $SW_5$ to transfer and store the averaging light conversion signal of the second pixel of the $l^{th}$ row of the super-pixel on capacitor CO[6(k+1)+5].

After the completion of the column averaging of the six physical rows of 6l, 6l+1, 6l+2, 6l+3, 6l+4, and 6l+5 described above, the averaged pixel information in column direction has been stored in the capacitors CE(i) and CO(i). FIG. 13 shows the differential light conversion electrical output signals that are averaged and stored on each storage capacitor CE(i) and CO(i) in column SHCAC block. During the readout time Readout(l) of the super-pixel row l, the stored differential light conversion electrical output signals are row averaged or row binned and are readout to external circuitry such as an analog-to-digital converter through the video amplifier/switched capacitor integrator circuit 170 of FIG. 9d. Details on readout the averaged column differential light conversion electrical output signals to the column bus COL_BUS is described hereinafter.

After read out the signals of $l^{th}$ row of super-pixel, the storage capacitors CE(i) and CO(i) are, as described in FIG. 6b, reset by the reset pulse CECO_RST. Then, the operation on $(l+1)^{th}$ row of super-pixels starts and is identical to that described above for the $(l)^{th}$ row of super-pixels. The $(l+_1)^{th}$ row of super-pixels includes the physical rows 6(l+1), 6(l+1)+1, 6(l+1)+2, 6(l+1)+3, 6(l+1)+4, and 6(l+1)+5, and the physical columns 6k, 6k+1, 6k+2, 6k+3, 6k+4, 6k+5, 6(k+1), 6(k+1)+1, 6(k+1)+2, 6(k+1)+3, 6(k+1)+5, and 6(k+1)+5. The operation as described above stores the averaged differential light conversion electrical output signals of each of the columns of the selected row on the storage capacitors CE(i) and CO(i). The averaged differential light conversion electrical output signals are row averaged or row binned and are transferred during the readout time Readout(l+1) to the external circuitry such as an analog-to-digital converter for further processing.

Figure 14A:
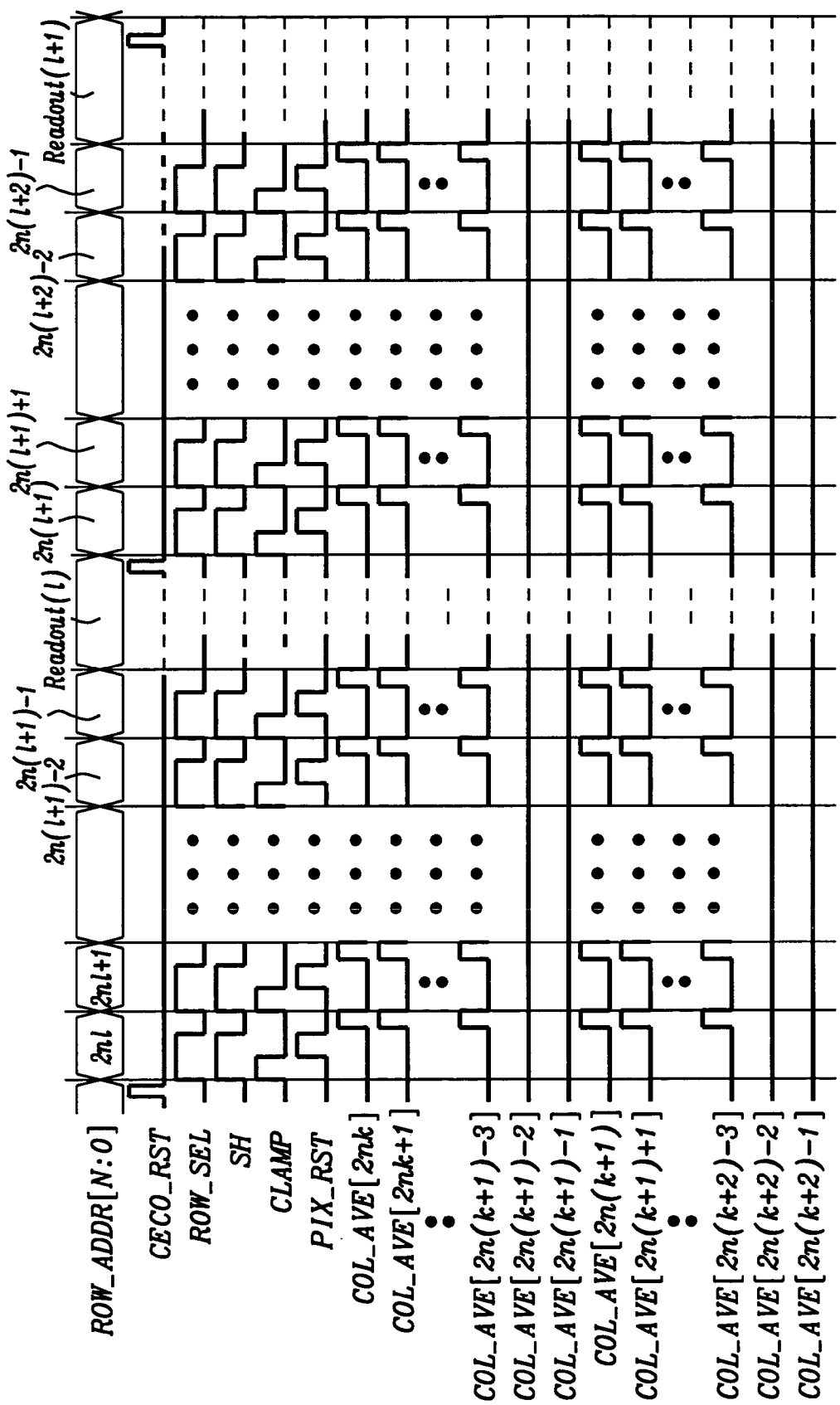
FIGS. 14a-14c are timing diagrams for operation of the image resolution adjustment circuit of this invention of FIGS. 9a-9d showing column averaging for an n:1 decimation for the image resolution adjustment.
Figure 14B:
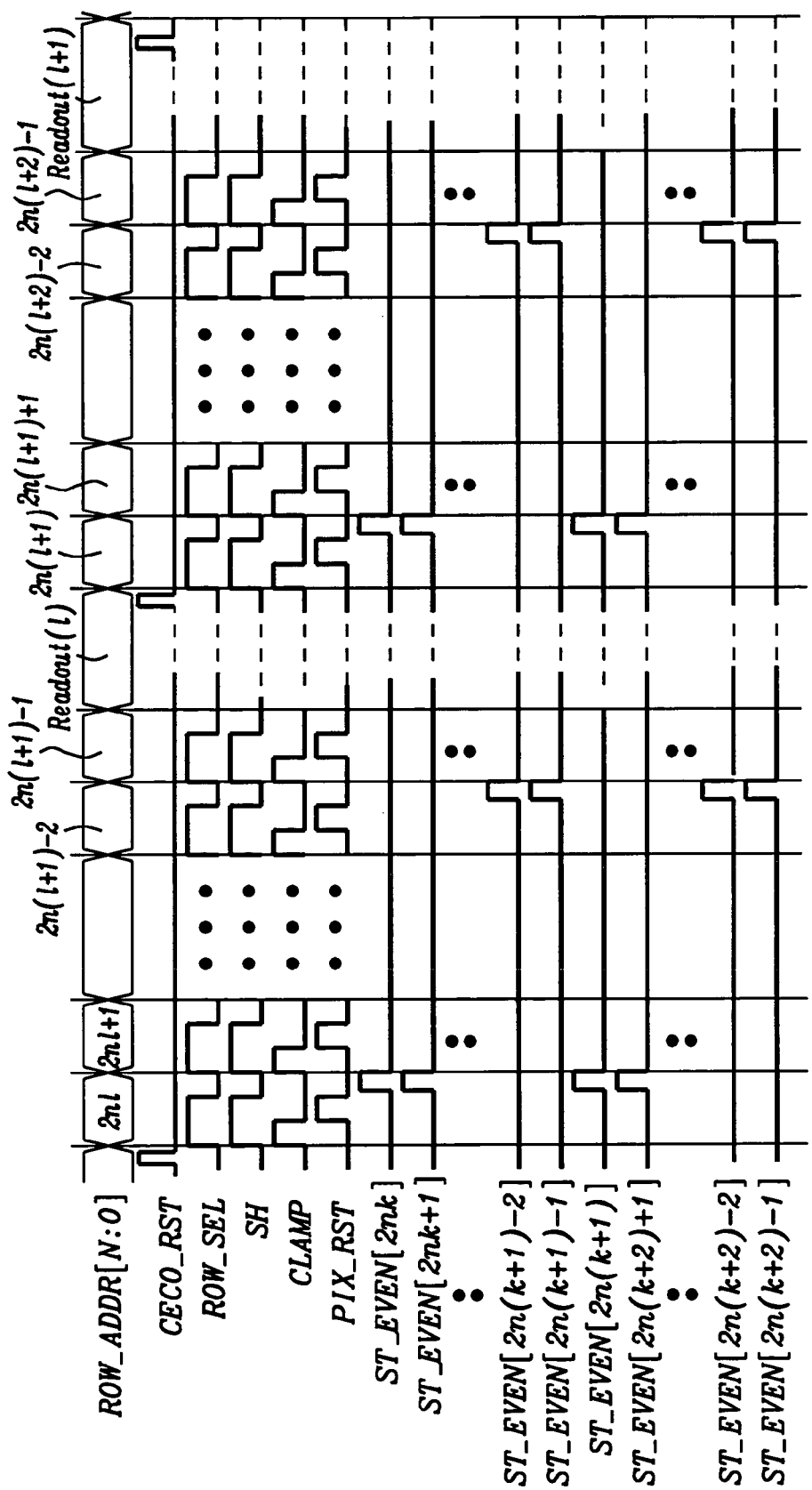
Figure 14C:
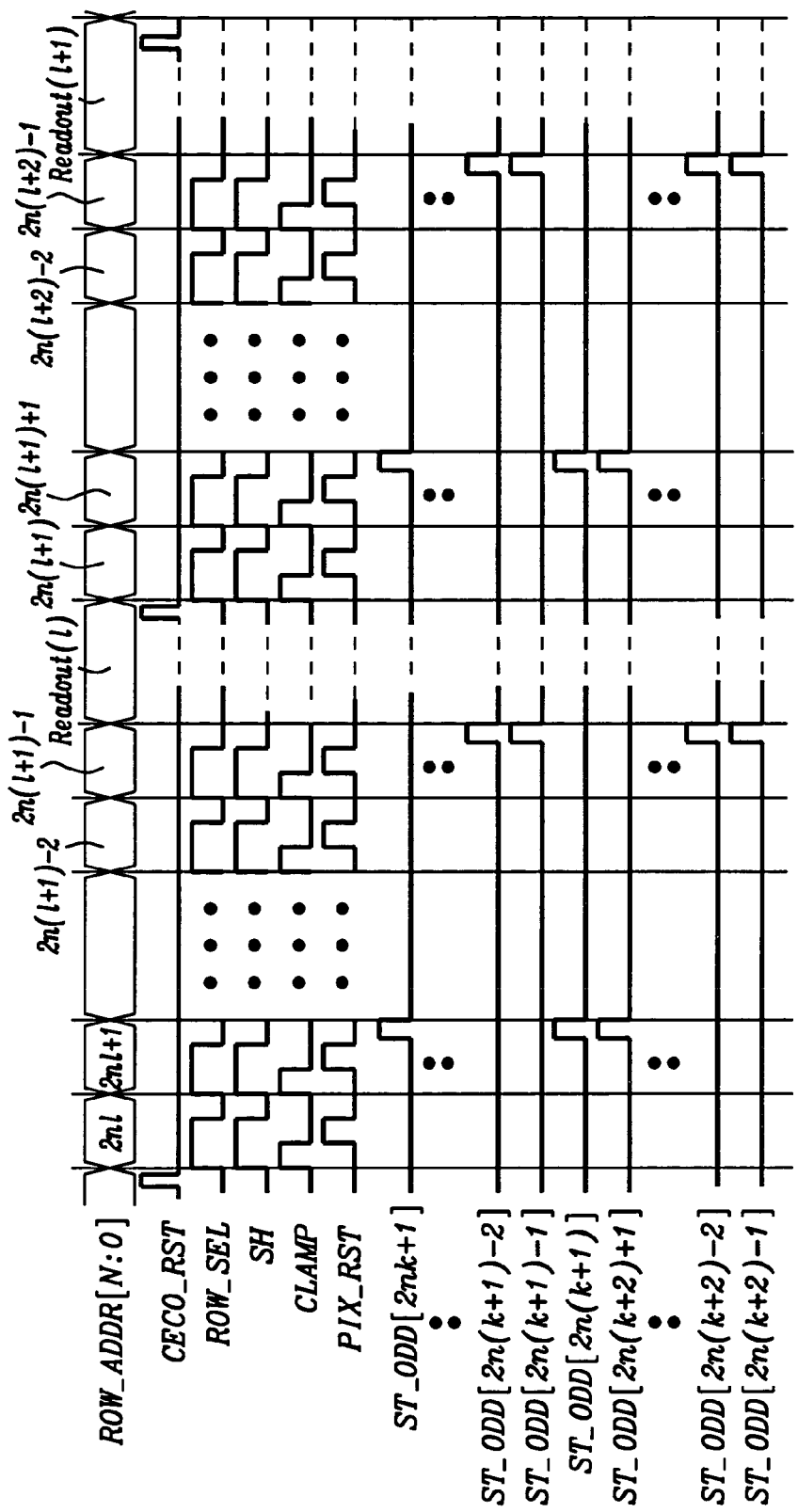

For the general case where the decimation ratio of n:1, the column and rows of each super-pixel starts at the physical column and row addresses that are a multiple of the decimation ratio. As noted above, in a Bayer patterned array of CMOS active pixel sensors, the evaluation to determine the magnitude of the colors of each of the super-pixels requires that twice the decimation ratio (n) of physical rows and columns (2n). By setting the column counter to i=2nk in the section of column SHCAC block shown in FIGS. 9a-9d, physical column i represents the start column of the super-pixel column. At this setting, columns 2nk, 2nk+1, 2nk+2, . . . , 2n(k+1)−2, and 2n(k+1)−1 cover the range of $k^{th}$ super-pixel column in the column direction of the array of CMOS active pixel sensors. Columns 2n(k+1), 2n(k+1)+1, 2n(k+1)+2, . . . , 2n(k+2)−2, and 2n(k+2)−1 cover the range of $(k+1)^{th}$ super-pixel column in the physical column direction. FIGS. 14a-14c provide the waveforms that demonstrate the analog signal process for the averaging of the physical columns of the super-pixel columns of the $l^{th}$ and $(l+1)^{th}$ super-pixel row of the array of CMOS active pixel sensors. At the n:1 image decimation ratio, the $l^{th}$ row of super-pixel includes rows 2nl, 2nl+1, . . . , 2n(l+1)−2, and 2n(l+1)−1 and the $(l+1)^{th}$ row of super-pixel includes rows 2n(l+1), 2n(l+1)+1, . . . , 2n(l+2)−2, and 2n(l+2)−1.

As described above, the column averaging operation is controlled by the column averaging switches $SW_4$, even row signal transfer switch $SW_5$, and odd row signal transfer switch $SW_6$ in each column SHCAC circuit. The column averaging switches $SW_4$, even row signal transfer switch $SW_5$, and odd row signal transfer switch $SW_6$ are programmed ON/OFF depending on the image decimation ratio (n). The waveforms in FIGS. 14a-14c show the activation signals for the column averaging switches $SW_4$, even row signal transfer switch $SW_5$, and odd row signal transfer switch $SW_6$. The row addresses ROW_ADDR[N:0] for the $l^{th}$ row of a super-pixel by addressing the physical row 2n2nl, 2nl+1, . . . , 2n(l+1)−2, and 2n(l+1)−1 which are then are row averaged or row binned and are readout during the readout period Readout(l).

At the beginning of the evaluation of the $l^{th}$ row of the super-pixel, all the even and odd storage capacitors CE(i) and CO(i) are, as described in FIG. 6b, reset by the global reset signal CECO_RST. The reset pulse CECO_RST is given after the readout period of the information of $(l-1)^{th}$ super-pixel row. The row addresses ROW_ADDR[N:0] are set to address the desired physical row of the $l^{th}$ row of the super-pixel. The row select signal ROW_SEL, the sample and hold signal SH, the clamp signal CLAMP, and the pixel reset signal PIX_RST are activated as shown in FIG. 7 to convert the light signal to the differential light conversion electrical output signal $V_{OUT}$ (i).

The averaging of the columns of the first super-pixel row l begins with the column averaging of the first n red (R) pixels of the even row 2nl by setting the column averaging signals $$COL\_AVE[2nk + (2i)] \mid_{i=0}^{n-1}$$

to activate the column averaging switches $SW_4$ to connect the storage capacitors $$CS[2nk + (2i)] \mid_{i=0}^{n-1}$$

in parallel to average the first n red (R) pixel signals of pixels $$[2nk + (2i)] \mid_{i=0}^{n-1}.$$

The store even activation signal ST_EVEN[2nk] is set to activate the even row signal transfer switch $SW_5$ to transfer and store the averaging light conversion signal of the first pixel of the $l^{th}$ row of the super-pixel on capacitor CE[2nk].

Simultaneously, the column averaging of the first n green-1 (G1) pixels of the super-pixel of the even row 2nl is accomplished by setting the column averaging signals $$COL\_AVE[2nk + (2i + 1)] \mid_{i=0}^{n-1}$$

to activate the column averaging switches $SW_4$ to connect the storage capacitor $$CS[2nk + (2i + 1)] \mid_{i=0}^{n-1}$$

in parallel to average the first n green-1 (G1) pixel signals of pixels $$[2nk + (2i)] \mid_{i=0}^{n-1}.$$

The store even activation signal ST_EVEN[2nk+1] is set to activate the even row signal transfer switch $SW_5$ to transfer and store the averaging light conversion signal of the second pixel of the $l^{th}$ row of the super-pixel on capacitor CE[2nk+1].

In a similar fashion, the column averaging of the remaining groups of n red (R) pixels of the even row 2nl is accomplished by setting the column averaging signals $$COL\_AVE[2nk + (2i)] |_{i=0}^{n-1} |_{k=0}^{N-1},$$

where N is the number of super-pixels in the horizontal direction of the active pixel sensor $$\left( N = \frac{TOT\_HorzPixels}{n} \right)$$

to activate the column averaging switches $SW_4$ to connect the storage capacitors $$CS[2nk + (2i)] |_{i=0}^{n-1} |_{k=0}^{N-1}$$

in parallel to average each of the groups of n red (R) pixel signals of pixels $$[2nk + (2i)] |_{i=0}^{n-1} |_{k=0}^{N-1}.$$

The store even activation signal $$ST\_EVEN[[2nk + (2i)] |_{i=0}^{n-1} |_{k=0}^{N-1}]$$

is set to activate each of the respective even row signal transfer switches $SW_5$ to transfer and store the averaging light conversion signal of the third pixel of the $l^{th}$ row of the super-pixel on capacitor $$CE[2nk + (2i)] |_{i=0}^{n-1} |_{k=0}^{N-1}.$$

In a similar fashion, the column averaging of the remaining groups of n green-1 (G) pixels of the even row 2nl is accomplished by setting the column averaging signals $$COL\_AVE[2nk + (2i + 1)] |_{i=0}^{n-1} |_{k=0}^{N-1}$$

to activate the column averaging switches $SW_4$ to connect the storage capacitors $$CS[2nk + (2i + 1)] |_{i=0}^{n-1} |_{k=0}^{N-1}$$

in parallel to average each of the groups of n green-1 (G) pixel signals of pixels $$[2nk + (2i + 1)] |_{i=0}^{n-1} |_{k=0}^{N-1}.$$

The store even activation signal $$ST\_EVEN[[2nk + (2i + 1)] |_{i=0}^{n-1} |_{k=0}^{N-1}]$$

is set to activate each of the respective even row signal transfer switches $SW_5$ to transfer and store the averaging light conversion signal of the third pixel of the $l^{th}$ row of the super-pixel on capacitor $$CE[2nk + (2i + 1)] |_{i=0}^{n-1} |_{k=0}^{N-1}.$$

The row select signal ROW_SEL is activated to select the second physical row 2nl+1 of the first super-pixel row l. The sample and hold signal SH, the clamp signal CLAMP, and the pixel reset signal PIX_RST are activated as shown in FIG. 7 to convert the light signal to the differential light conversion electrical output signal $V_{OUT}(i)$ and transfer the differential light conversion electrical output signal $V_{OUT}(i)$ to the storage capacitor CS(i) for each column (i).

The averaging of the first n green-2 (G2) pixels of the odd row 2nl+1 by setting the column averaging signals $$COL\_AVE[2nk + (2i)] |_{i=0}^{N-1}$$

to activate the column averaging switches $SW_4$ to connect the storage capacitors $$CS[2nk + (2i)] |_{i=0}^{N-1}$$

in parallel to average the first n green-2 (G2) pixel signals of pixels $$[2nk + (2i)] |_{i=0}^{N-1}.$$

The store odd activation signal ST_ODD[2nk] is set to activate the odd row signal transfer switch $SW_5$ to transfer and store the averaging light conversion signal of the first pixel of the $l^{th}$ row of the super-pixel on capacitor CO[2nk].

The column averaging of the first n blue (B) pixels of the super-pixel of the odd row 2nl+1 is accomplished by setting the column averaging signals $$COL\_AVE[2n(k + 1) + (2i)] |_{i=0}^{N-1}$$

to activate the column averaging switches $SW_4$ to connect the storage capacitor $$CS[2n(k+1)+(2i)]\,|_{i=0}^{N-1}$$

parallel with the storage capacitor $$CS[2n(k+1)+(2i)]\,|_{i=0}^{N-1}$$

to average the first n (B) pixel signals of pixels $$[2n(k+1)+(2i)]\,|_{i=0}^{N-1}.$$

The store odd activation signal ST_ODD[2nk+1] is set to activate the odd row signal transfer switch $SW_5$ to transfer and store the averaging light conversion signal of the second pixel of the $l^{th}$ row of the super-pixel on capacitor CO[2nk+1].

In a similar fashion, the column averaging of the remaining groups of n green-2 (G2) pixels of the odd row 2nl+1 is accomplished by setting the column averaging signals $$COL\_AVE[2nk+(2i)]\,|_{i=0}^{n-1}\,|_{k=0}^{N-1}$$

to activate the column averaging switches $SW_4$ to connect the storage capacitors $$CS[2nk+(2i)]\,|_{i=0}^{n-1}\,|_{k=0}^{N-1}$$

in parallel to average each of the groups of n green-2 (G2) pixel signals of pixels $$[2nk+(2i)]\,|_{i=0}^{n-1}\,|_{k=0}^{N-1}.$$

The store odd activation signal $$ST\_ODD[[2nk+(2i)]\,|_{i=0}^{n-1}\,|_{k=0}^{N-1}]$$

is set to activate each of the respective even row signal transfer switches $SW_5$ to transfer and store the averaging light conversion signal of the $$2n+k\,|_{k=0}^{N-1}$$

pixel of the $l^{th}$ row of the super-pixel on capacitor $$CO[2nk+(2i)]\,|_{i=0}^{n-1}\,|_{k=0}^{N-1}.$$

In a similar fashion, the column averaging of the remaining groups of n blue (B) pixels of the super-pixel of the odd row 2nl+1 is accomplished by setting the column averaging signals $$COL\_AVE[2nk+(2i+1)]\,|_{i=0}^{n-1}\,|_{k=0}^{N-1}$$

to activate the column averaging switches $SW_4$ to connect the storage capacitors $$CS[2nk+(2i+1)]\,|_{i=0}^{n-1}\,|_{k=0}^{N-1}$$

in parallel to average each of the groups of n blue (B) pixel signals of pixels $$[2nk+(2i+1)]\,|_{i=0}^{n-1}\,|_{k=0}^{N-1}.$$

The store even activation signal $$ST\_ODD[[2nk+(2i+1)]\,|_{i=0}^{n-1}\,|_{k=0}^{N-1}]$$

is set to activate each of the respective even row signal transfer switches $SW_5$ to transfer and store the averaging light conversion signal of the $$2n+(k+1)\,|_{k=0}^{N-1}$$

pixel of the $l^{th}$ row of the super-pixel on capacitor $$CO[2nk+(2i+1)]\,|_{i=0}^{n-1}\,|_{k=0}^{n-1}.$$

The even and odd storage capacitors $$CE[2nk+(2i)]\,|_{i=0}^{n-1}\,|_{k=0}^{N-1}$$

and $$CO[2nk+(2i)]\,|_{i=0}^{n-1}\,|_{k=0}^{N-1}$$

store the differential light conversion electrical output signal $V_{OUT}$ for the averaged columns of the first and second rows of the $l^{th}$ row of super-pixels. Likewise, as shown in the following, the even and odd storage capacitors CE(i+2) and CO(i+2), CE(i+3) and CO(i+3), CE(i+6) and CO(i+6), CE(i+7) and CO(i+7) store the differential light conversion electrical output signals $V_{OUT}$ for the averaged columns of the third and fourth rows of the $l^{th}$ row of super-pixels.

As described above, the row addresses ROW_ADDR[N:0] are iteratively set to address the remaining even physical rows $$2nl + 2j \,|_{j=1}^{n-1}$$

of the $l^{th}$ row of the super-pixel. At each iteration, the row select signal ROW_SEL, the sample and hold signal SH, the clamp signal CLAMP, and the pixel reset signal PIX_RST are activated as shown in FIG. 7 to convert the light signal to the differential light conversion electrical output signal $V_{OUT}(i)$ for each of the columns.

The averaging of the columns of the row of pixels $$2nl + 2j \,|_{j=1}^{n-1}$$

column averages each group of n red (R) pixels of the even row $$2nl + 2j \,|_{j=1}^{n-1}$$

by setting the column averaging signal $$COL\_AVE[2n(k+m) + (2i)] \,|_{i=0}^{n-2} \,|_{m=0}^{n-2}$$

to activate the column averaging switches $SW_4$ to connect the storage capacitors CS(i)

$$CS[2n(k+m) + (2i)] \,|_{i=0}^{n-1} \,|_{m=0}^{n-1}$$

in parallel average each group of n red (R) pixel signals of pixels $$[[2n(k+m) + (2i)] \,|_{i=0}^{n-1} \,|_{m=0}^{n-1}, 2nl + 2j \,|_{j=1}^{n-1}].$$

Upon the averaging of each group, the store even activation signal $$ST\_EVEN[2n(k+m) + (2i)] \,|_{i=0}^{n-1} \,|_{m=0}^{n-1}$$

for that group is set to activate the even row signal transfer switches $SW_5$ to transfer and store the averaging light conversion signal of the first pixel of the each row of physical pixels of the $l^{th}$ row of the super-pixel on the capacitors $$CE[2n(k+m) + (2i)] \,|_{i=0}^{n-1} \,|_{m=0}^{n-1}.$$

Simultaneously, The averaging of the columns of the row of pixels $$2nl + 2j \,|_{j=1}^{n-1}$$

column averages each group of n green-1 (G1) pixels of the even row $$2nl + 2j \,|_{j=1}^{n-1}$$

by setting the column averaging signal $$COL\_AVE[2n(k+m) + (2i+1)] \,|_{i=0}^{n-2} \,|_{m=0}^{n-2}$$

to activate the column averaging switches $SW_4$ to connect the storage capacitors $$CS(i)CS[2n(k+m) + (2i+1)] \,|_{i=0}^{n-1} \,|_{m=0}^{n-1}$$

in parallel average each group of n green-1 (G1) pixel signals of pixels $$[[2n(k+m) + (2i+1)] \,|_{i=0}^{n-1} \,|_{m=0}^{n-1}, 2nl + 2j \,|_{j=1}^{n-1}].$$

Upon the averaging of each group, the store even activation signal $$ST\_EVEN[2n(k+m) + (2i+1)] \,|_{i=0}^{n-1} \,|_{m=0}^{n-1}$$

for that group is set to activate the even row signal transfer switches $SW_5$ to transfer and store the averaging light conversion signal of the first pixel of the each row of physical pixels of the $l^{th}$ row of the super-pixel on the capacitors $$CE[2n(k+m) + (2i+1)] \,|_{i=0}^{n-1} \,|_{m=0}^{n-1}.$$

Additionally, as described above, the row addresses ROW_ADDR[N:0] are iteratively set to address the remaining odd physical rows $$2nl + (2j+1) \,|_{j=1}^{n-1}$$

of the $l^{th}$ row of the super-pixel. At each iteration, the row select signal ROW_SEL, the sample and hold signal SH, the clamp signal CLAMP, and the pixel reset signal PIX_RST are activated as shown in FIG. 7 to convert the light signal to the differential light conversion electrical output signal $V_{OUT}(i)$ for each of the columns.

The averaging of the columns of the odd rows of pixels $$2nl + (2j+1)\,|_{j=1}^{n-1}$$

column averages each group of n green-2 (G2) pixels of the odd row $$2nl + (2j+1)\,|_{j=1}^{n-1}$$

by setting the column averaging signal $$COL\_AVE[2n(k+m)+(2i+1)]\,|_{i=0}^{n-2}\,|_{m=0}^{n-2}$$

to activate the column averaging switches $SW_4$ to connect the storage capacitors $$CS(i)CS[2n(k+m)+(2i+1)]\,|_{i=0}^{n-1}\,|_{m=0}^{n-1}$$

in parallel average each group of n green-2 (G2) pixel signals of pixels $$[[2n(k+m)+(2i+1)]\,|_{i=0}^{n-1}\,|_{m=0}^{n-1}, 2nl+2j\,|_{j=1}^{n-1}].$$

Upon the averaging of each group, the store odd activation signal $$ST\_ODD[2n(k+m)+(2i)]\,|_{i=0}^{n-1}\,|_{m=0}^{n-1}$$

for that group is set to activate the odd row signal transfer switches $SW_5$ to transfer and store the averaging light conversion signal of the first pixel of the each row of physical pixels of the $l^{th}$ row of the super-pixel on the capacitors $$CO[2n(k+m)+(2i)]\,|_{i=0}^{n-1}\,|_{m=0}^{n-1}.$$

Simultaneously, the averaging of the columns of the odd rows of pixels $$2nl + (2j+1)\,|_{j=1}^{n-1}$$

column averages each group of n blue (B) pixels of the odd row $$2nl + (2j+1)\,|_{j=1}^{n-1}$$

by setting the column averaging signal $$COL\_AVE[2n(k+m)+(2i+1)]\,|_{i=0}^{n-2}\,|_{m=0}^{n-2}$$

to activate the column averaging switches $SW_4$ to connect the storage capacitors $$CS(i)CS[2n(k+m)+(2i+1)]\,|_{i=0}^{n-1}\,|_{m=0}^{n-1}$$

in parallel average each group of n blue (B) pixel signals of pixels $$[[2n(k+m)+(2i+1)]\,|_{i=0}^{n-1}\,|_{m=0}^{n-1}, 2nl+2j\,|_{j=1}^{n-1}].$$

Upon the averaging of each group, the store odd activation signal $$ST\_ODD[2n(k+m)+(2i+1)]\,|_{i=0}^{n-1}\,|_{m=0}^{n-1}$$

for that group is set to activate the odd row signal transfer switches $SW_5$ to transfer and store the averaging light conversion signal of the first pixel of the each row of physical pixels of the $l^{th}$ row of the super-pixel on the capacitors $$CO[2n(k+m)+(2i)]\,|_{i=0}^{n-1}\,|_{m=0}^{n-1}.$$

After the completion of the column averaging of the n physical rows $$2nl + (2j)\,|_{j=0}^{n-1} \text{ and } 2nl + (2j+1)\,|_{j=0}^{n-1}$$

described above, the averaged pixel information in column direction has been stored in the capacitors $$CO[2n(k+m)+(2i)]\,|_{i=0}^{n-1}\,|_{m=0}^{n-1}$$

and $$CE[2nk+(2i+1)]\,|_{i=0}^{n-1}\,|_{k=0}^{N-1}.$$

FIG. 15 shows the differential light conversion electrical output signals that are averaged and stored on each storage capacitor $$CO[2n(k+m)+(2i)]\,|_{i=0}^{n-1}\,|_{m=0}^{n-1}$$

and $$CE[2nk+(2i+1)]\mid_{i=0}^{n-1}\mid_{k=0}^{N-1}$$

in column SHCAC block. During the readout time Readout(l) of the super-pixel row l, the stored differential light conversion electrical output signals are row averaged or row binned and are readout to external circuitry such as an analog-to-digital converter through the video amplifier/switched capacitor integrator circuit 170 of FIGS. 9c-9d. Details on readout the averaged column differential light conversion electrical output signals to the column bus COL_BUS is described hereinafter.

After read out the signals of $l^{th}$ row of super-pixel, the storage capacitors $$CO[2n(k+m)+(2i)]\mid_{i=0}^{n-1}\mid_{m=0}^{n-1}$$

and $$CE[2nk+(2i+1)]\mid_{i=0}^{n-1}\mid_{k=0}^{N-1}$$

are, as described in FIG. 6b, reset by the reset pulse CECO_RST. Then, the operation on $(l+1)^{th}$ row of super-pixels starts and is identical to that described above for the $(l)^{th}$ row of super-pixels. The $(l+1)^{th}$ row of super-pixels includes the physical rows $$2nl+(2j)\mid_{j=0}^{n-1} \text{ and } 2nl+(2j+1)\mid_{j=0}^{n-1}$$

and the physical columns $$[2n(k+m)+(2i)]\mid_{i=0}^{n-1}\mid_{m=0}^{n-1}$$

and $$[[2n(k+m)+(2i+1)]\mid_{i=0}^{n-1}\mid_{m=0}^{n-1}, 2nl+2j\mid_{j=1}^{n-1}].$$

The operation as described above stores the averaged differential light conversion electrical output signals of each of the columns of the selected row on the storage capacitors $$CE[2n(k+m)+(2i)]\mid_{i=0}^{n-1}\mid_{m=0}^{n-1}$$

and $$CO[2n(k+m)+(2i)]\mid_{i=0}^{n-1}\mid_{m=0}^{n-1}.$$

The averaged differential light conversion electrical output signals are row averaged or row binned and are transferred during the readout time Readout(l+1) to the external circuitry such as an analog-to-digital converter for further processing.

The remaining rows (l+2), . . . , (l+x), where x is the number of super-pixel rows of the array of CMOS active pixel sensors, are evaluated iteratively in pairs of rows as described above. The column average for each physical row being available on each of the storage capacitors for readout. Depending upon the light intensity, the physical rows may be averaged within a super-pixel row in high intensity light operation or may be integrated for binning in low intensity operation. The decision to operate the SHCAC of FIG. 9a-9d between row averaging and row binning is made by an algorithm implemented in the address, timing, and control processor circuit 165 of FIG. 5 based on the averaging signal level. The row averaging and row binning is explained below.

At high light levels, the output voltage of single bright pixel signal is high enough to meet the full signal swing. However, for decimated image with low resolution (used as viewfinder or video stream), it is still desired to have high spatial resolution. Pixel averaging readout operation is used in this condition.

The row averaging circuit 135 of FIG. 6 and 8 consists of the row averaging selection switches $Sw_9$ and $SW_{10}$ that are respectively controlled by the terminals RAVE_EVEN and RAVE_ODD. In each column, as shown in FIGS. 9a-9d, the row averaging circuit connects the storage capacitors CE(i) and CO(i) to the storage capacitors CE(i+1) and CO(i+1) of the same color adjacent column averaging circuits. Thus, when the row averaging selection switches $Sw_9$ and $SW_{10}$ are activated the physical rows of each super-pixel are connected to average the magnitude of the column averaged differential light conversion electrical output signals for the super-pixel to enhance image spatial resolution only.

Figure 16A:
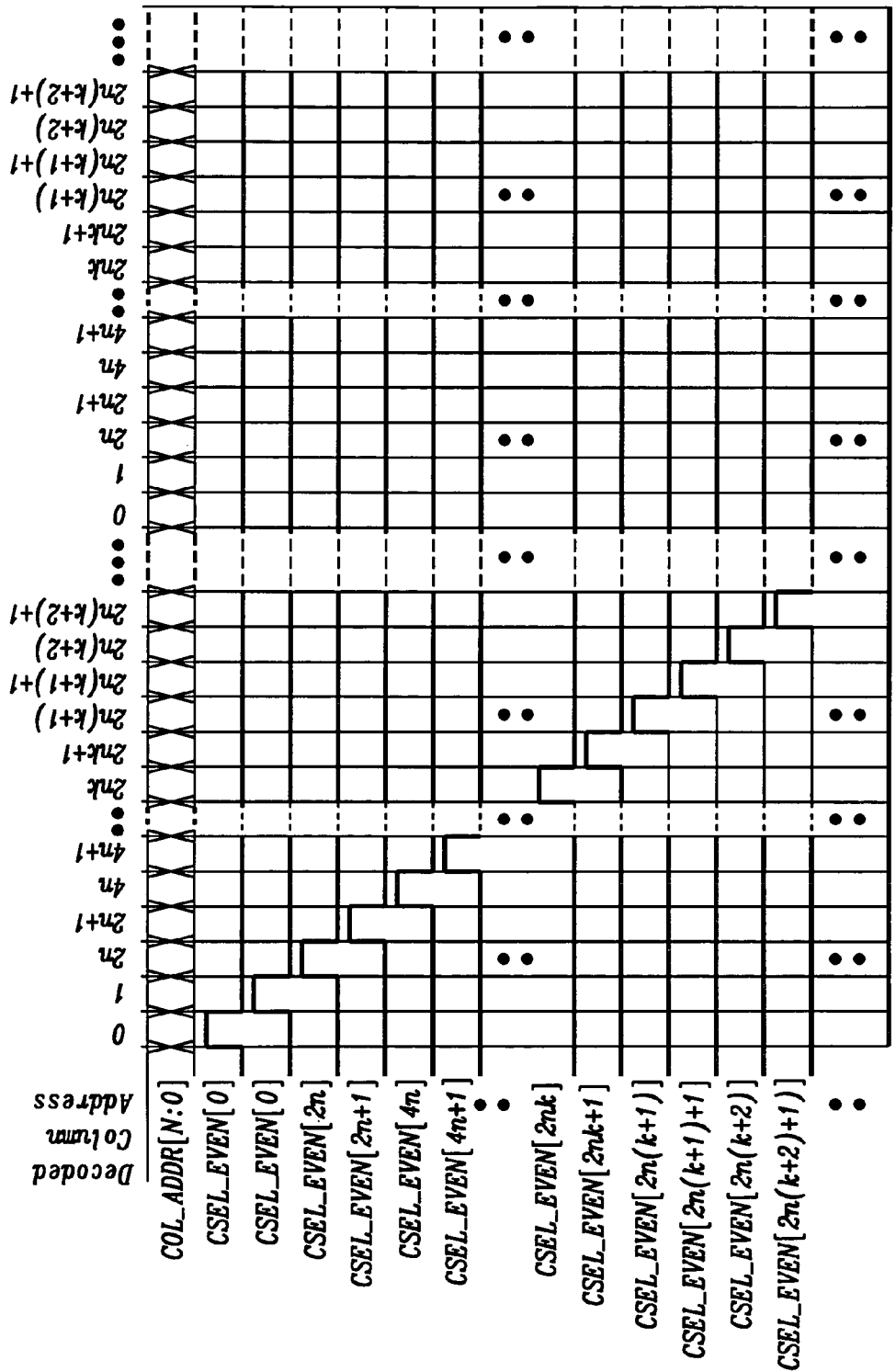
FIG. 16a-16c are, in composite, a timing diagram for operation of the image resolution adjustment circuit of this invention of FIGS. 9a-9d showing the image resolution adjustment for providing vertical row averaging for an n:1 decimation for the image resolution adjustment.
Figure 16B:
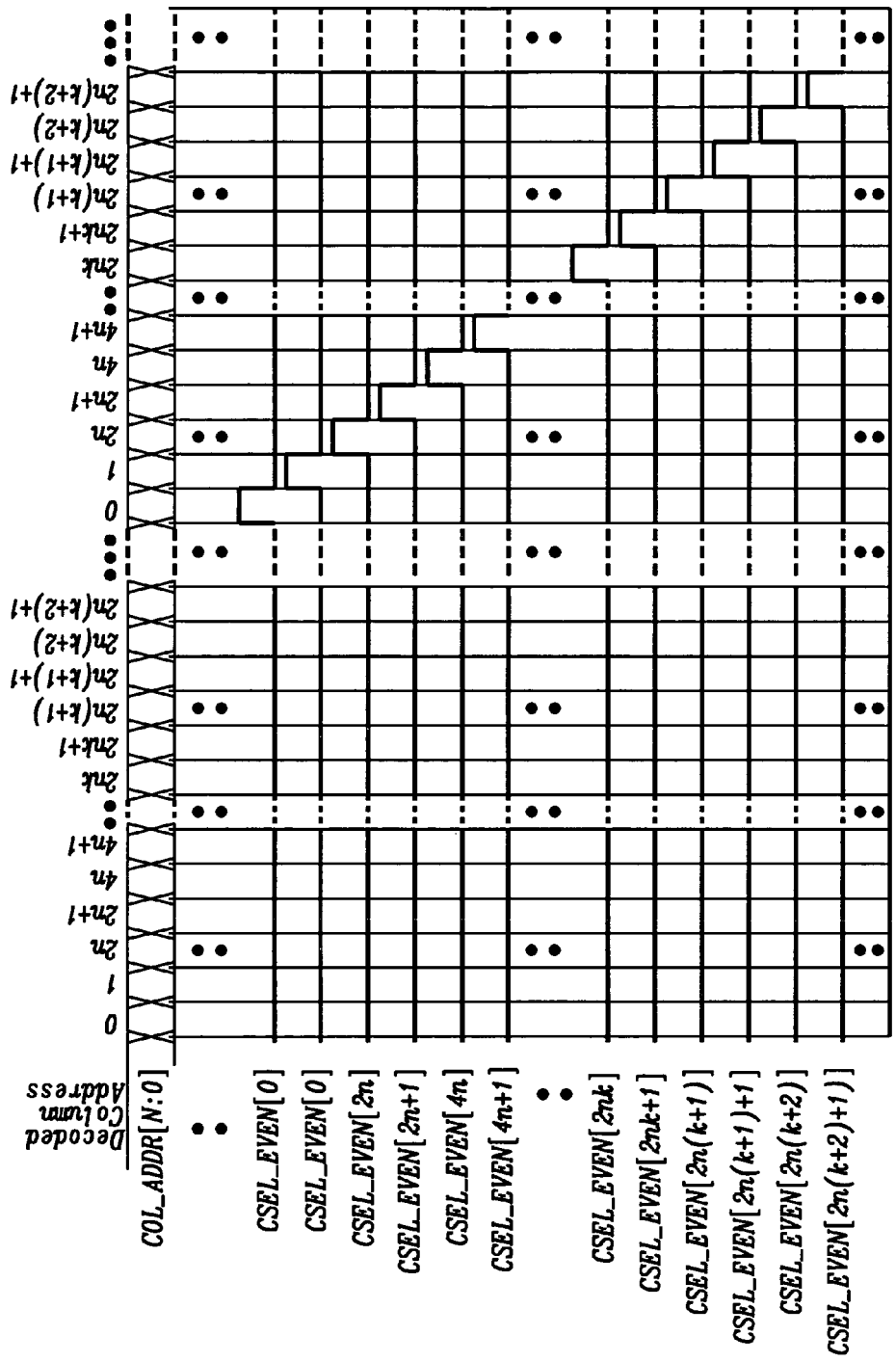
Figure 16C:
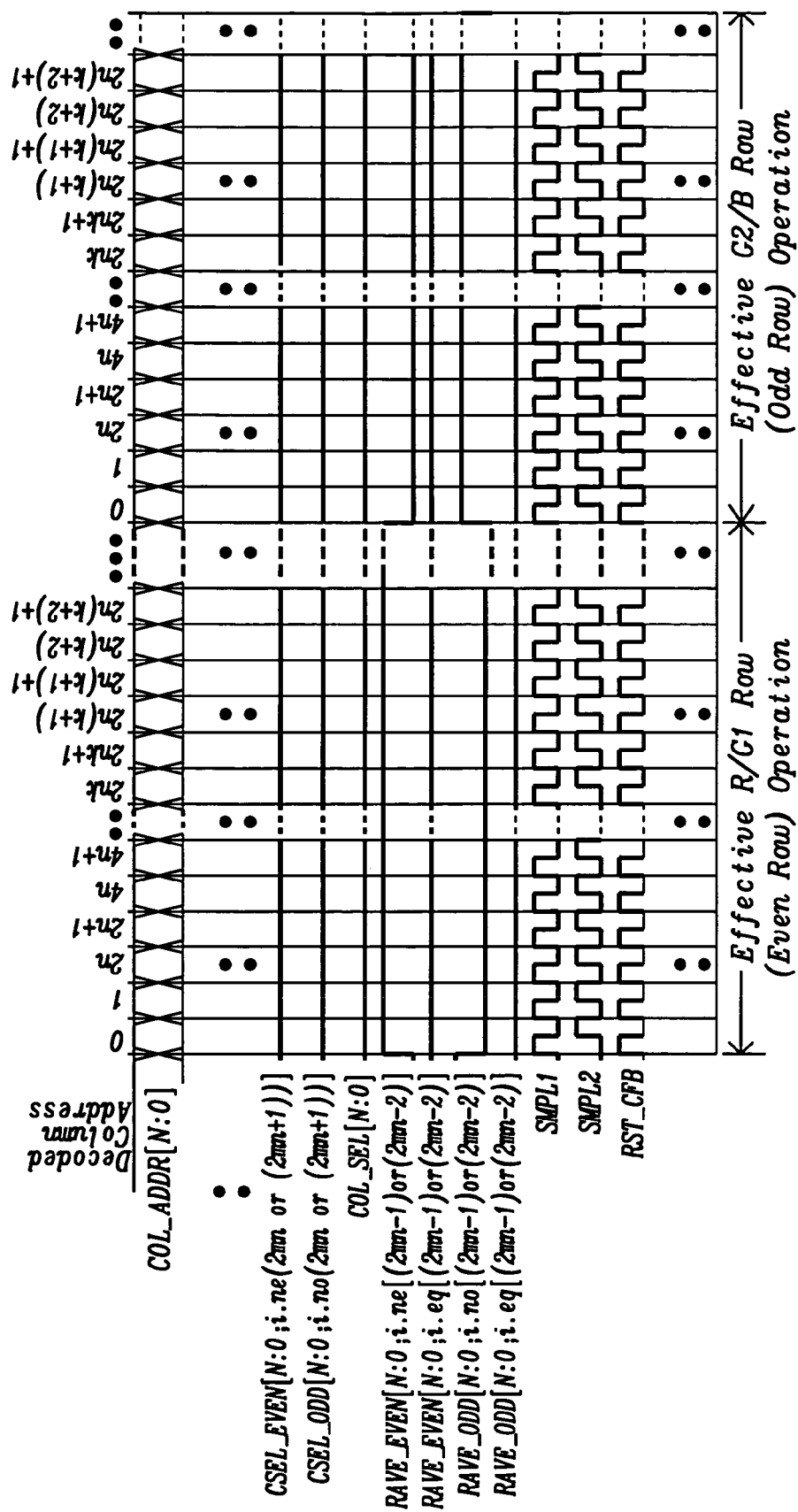

Referring to FIGS. 16a-16c, the even row averaging switches $Sw_9$ are activated by the even row activation signals $$RAVE\_EVEN[N:0; i.ne.\{(2mn).or.(2mn+1)\}]\mid_{m=0}^{N-1}$$

to connect the storage capacitors CE(i) of the physicals rows of each row of the super-pixels together to average the column averaged pixels of each physical row of the super-pixels. The even row activation signals $$RAVE\_EVEN[N:0; i.eq.\{(2mn).or.(2mn+1)\}]\mid_{m=0}^{N-1}$$

are not activated to segregate the physical rows of adjacent super-pixels from each other.

The column address decoder 140 decodes the column addresses 145 of FIG. 5 and sets the even column select signals $$CSEL\_EVEN[2n(k+m)+(r)]\mid_{r=0}^{1}\mid_{m=0}^{n-1}$$

sequentially activates the first two switches $SW_5$ of each super-pixel to transfer the red (R) and green-1 (G1) row averaged signals of the to the video amplifier/switched capacitor integrator circuit 170 for transfer to the external circuitry.

At the completion of the transfer of the even row red (R) and green-1 (G1) averaged signals, the row averaging switches $SW_{10}$ are activated by the odd row activation signals $$RAVE\_ODD[N:0; i.ne.\{(2mn).or.(2mn+1)\}]\mid_{m=0}^{N-1}$$

to connect the storage capacitors CO(i) of the physicals rows of each row of the super-pixels together to average the column averaged pixels of each physical row of the super-pixels. The odd row activation signals $$RAVE\_ODD[N:0; i.eq.\{(2mn).or.(2mn+1)\}]\mid_{m=0}^{N-1}$$

are not activated to segregate the physical rows of adjacent super-pixels from each other.

The column address decoder 140 decodes the column addresses 145 of FIG. 5 and sets the odd column select signals $$CSEL\_ODD[2n(k+m)+(r)]\mid_{r=0}^{1}\mid_{m=0}^{n-1}$$

sequentially activates the first two switches $SW_5$ of each super-pixel to transfer the row averaged signals of the green-2 (G2) and blue (B) to the video amplifier/switched capacitor integrator circuit 170 for transfer to the external circuitry.

Refer back to FIG. 6c for the discussion of the structure and operation of the video amplifier/switched capacitance integration circuit 170 of this invention. As described above, the analog gain G of the video amplifier/switched capacitor integrator circuit 170 is the ratio of the sampling capacitor CSMPL to the feedback capacitor CFB (CSMPL/CFB). The first sampling switch control signal SMPL1, second sampling control switch SMPL2, and reset control pulse RST_CFB are activated during each period that the column address 145 has selected a column address of the active pixel sensor to provide a switched capacitor amplification of the column output signal $V_{COL}$ to generate the analog output signal $V_{OUT}$.

In the high light level conditions, the effective output voltage of the analog signal 175 at the output of the video amplifier/switched capacitor integration circuit 170 for each of the column averaged and row averaged pixels is given by the equations:

$$R^O(k,l) = \frac{1}{n \times n} * G * \left(\frac{n*CS}{n*CS+CST}\right) \sum_{i=0}^{n-1}\sum_{j=0}^{n-1}[R(2\times n\times k+2\times i, 2\times n\times l+2\times j)]$$

$$G1^O(k,l) = \frac{1}{n \times n} * G * \left(\frac{n*CS}{n*CS+CST}\right)$$

$$\sum_{i=0}^{n-1}\sum_{j=0}^{n-1}[G1(2\times n\times k+2\times i+1, 2\times n\times l+2\times j)]$$

$$G2^O(k,l) = \frac{1}{n \times n} * G * \left(\frac{n*CS}{n*CS+CST}\right)$$

$$\sum_{i=0}^{n-1}\sum_{j=0}^{n-1}[G2(2\times n\times k+2\times i, 2\times n\times l+2\times j+1)]$$

-continued $$B^O(k,l) = \frac{1}{n \times n} * G * \left(\frac{n*CS}{n*CS+CST}\right)$$

$$\sum_{i=0}^{n-1}\sum_{j=0}^{n-1}[B(2\times n\times k+2\times i+1, 2\times n\times l+2\times j+1)]$$

where:
n is the decimation ratio of the sub-sampling of the array.
CS is the effective value of the sample and hold capacitor CS(i).
CST is the value of the storage capacitor CE(i) or CE(i)
G is the gain of the video amplifier/switched capacitor integrator circuit 170.
i is the counting variable for the neighboring pixels in a row dimension of the sub sampled array 15.
j is the counting variable for the neighboring pixels for a column dimension of the sub sampled array 15.
k is the counting variable for a row dimension of the sub sampled array 15.
l is the counting variable for the column dimension of the sub sampled array 15.
$R^o$ is the red pixel of the sub sampled array 15.
$G1^o$ is the first green pixel of the sub sampled array 15.
$G2^o$ is the second green pixel of the sub sampled array 15.
$B^o$ is the blue pixel of the sub sampled array 15.

At low light levels, although the row averaging of the column averaged pixels provides the high spatial resolution need for the low resolution such as the viewfinder or video stream, the overall signal level is low that makes the signal-to-noise ratio (SNR) very low. To achieve the high spatial resolution and high SNR, all the even rows of the column averaged pixels of each super-pixel are integrated or added together and all the odd rows of the column averaged pixels of each super-pixel are integrated or added together to provide a row binning of the pixels the video amplifier/switched capacitance integration circuit 170 of FIGS. 5, 6a, 6c, and 8.

Figure 17A:
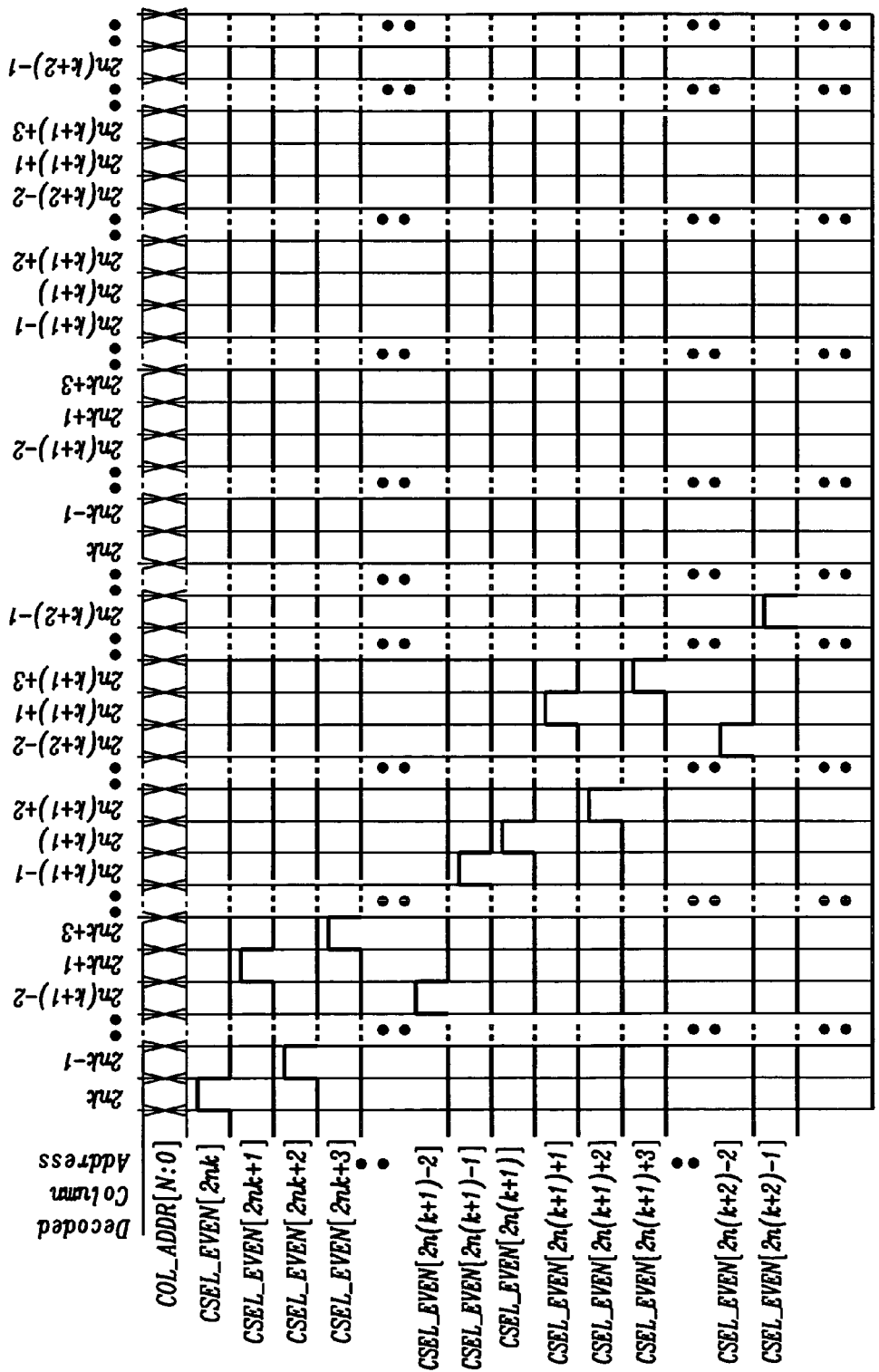
FIGS. 17a-17c are, in composite, timing diagrams for operation of the image resolution adjustment circuit of this invention of FIGS. 9a-9d showing vertical row binning for an n:1 decimation for the image resolution adjustment.
Figure 17B:
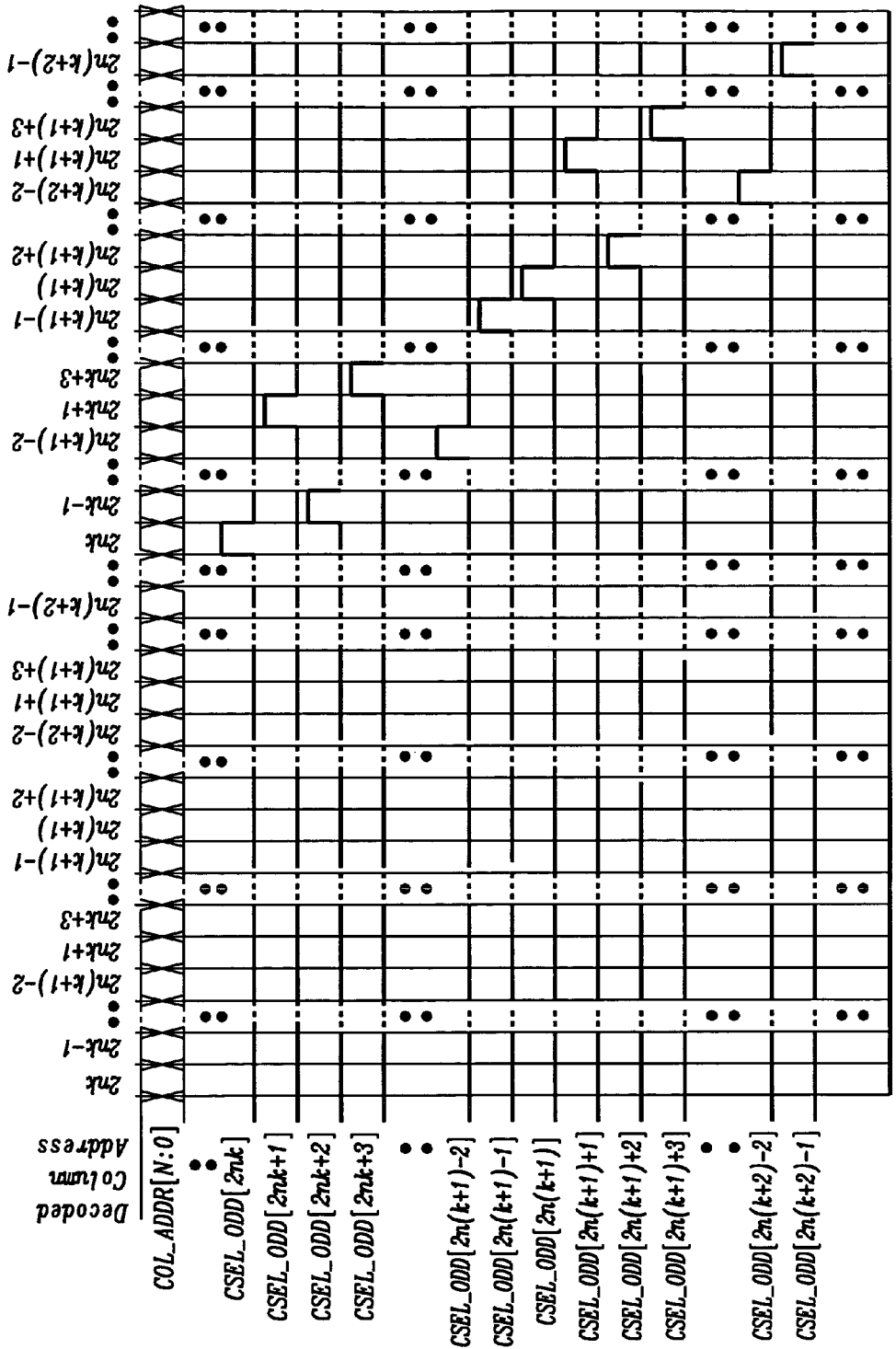
Figure 17C:
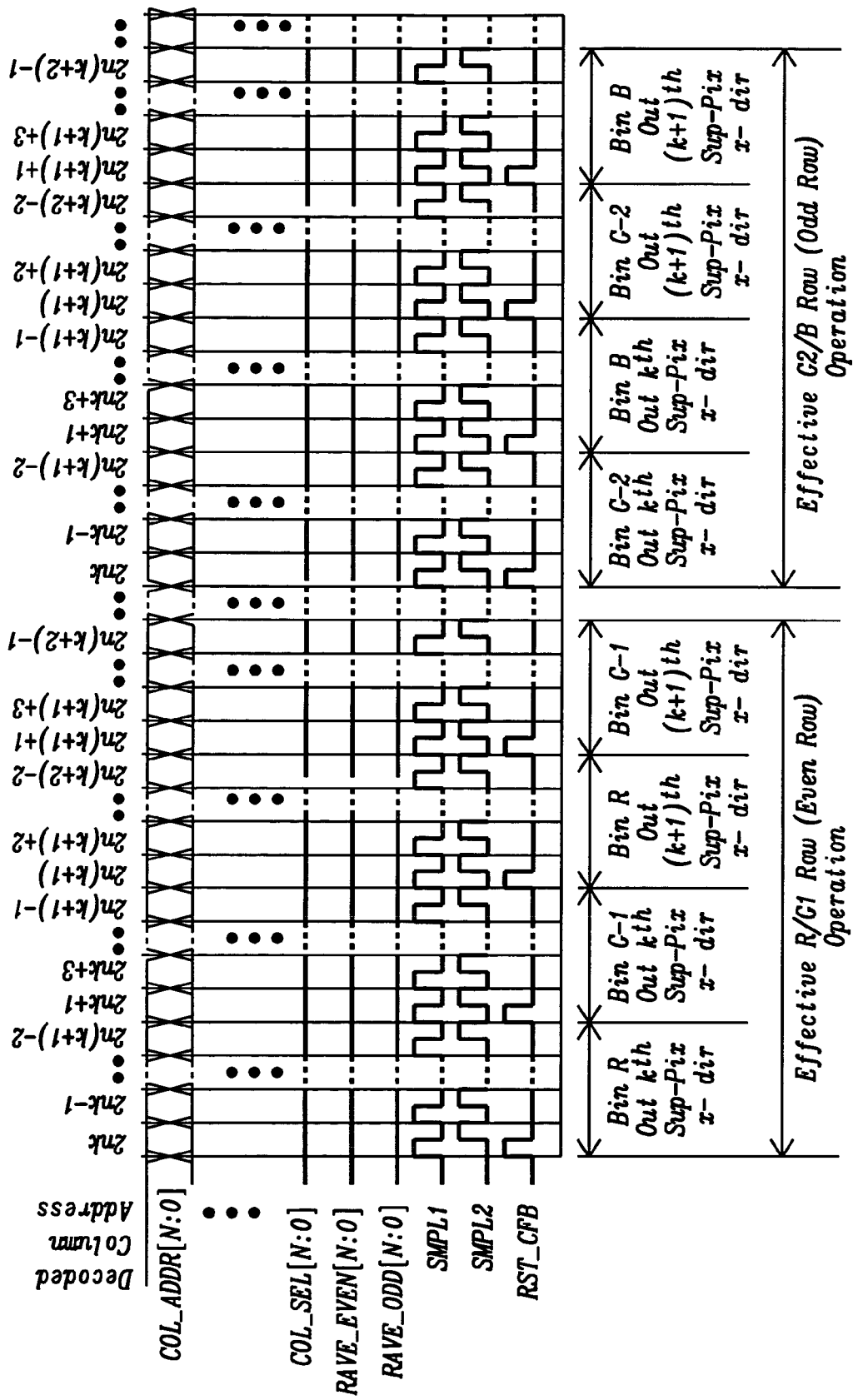

FIGS. 17a-17b illustrate the timing of the even and odd column select signals that activate the switches $SW_7$ and $SW_8$ necessary to perform the binning integration in the video amplifier/switched capacitance integration circuit 170 of FIGS. 9a-9d. Referring to FIG. 5, the column address decoder 140 receives the column address 145. The column addresses 140, as shown in FIGS. 17a-17b, are sequentially activated to select each same color even and odd storage capacitor CE(i) and CO(i) for each super-pixel. The column address decoder 140 sequentially activates the even column select lines $$CSEL\_EVEN[2n(k+m)+(r)]\mid_{r=0}^{n-1}\mid_{m=0}^{n-1}.$$

The switches $SW_7$ are activated to connect the storage capacitors $$CE[2n(k+m)+(r)]\mid_{r=0}^{1}\mid_{m=0}^{n-1}$$

to transfer the column averaged the column averaged differential light conversion electrical output signals to the video amplifier/switched capacitor integrator 170. The video amplifier/switched capacitance integration circuit 170 integrated each of the column averaged differential light conversion electrical output signals for each physical row of a super-pixel to create a row binned differential light conversion electrical output signal of the analog output signal 175 that is transferred to external circuit such as an analog-to-digital converter for further processing. The even column select lines $$\text{CSEL\_EVEN}[2n(k+m)+(r)] \mid_{r=0}^{n-1} \mid_{m=0}^{n-1}$$

are activated to generate the differential light conversion electrical signals for the red (R) and green-1 (G1) super-pixels.

Upon completion of the odd row of the super-pixel, The column address decoder 140 sequentially activates the odd column select lines $$\text{CSEL\_ODD}[2n(k+m)+(r)] \mid_{r=0}^{n-1} \mid_{m=0}^{n-1}.$$

The switches SW$_5$ are activated to connect the storage capacitors $$CO[2n(k+m)+(r)] \mid_{r=0}^{1} \mid_{m=0}^{n-1}$$

to transfer the column averaged the column averaged differential light conversion electrical output signals to the video amplifier/switched capacitor integrator 170.

Refer back to FIG. 6c for the discussion of the structure and operation of the video amplifier/switched capacitance integration circuit 170 of this invention. The first sampling switch control signal SMPL1, second sampling control switch SMPL2, and reset control pulse RST_CFB are activated during each period that the column address 145 has selected a column address of the active pixel sensor to provide a switched capacitor amplification of the column output signal V$_{COL}$ to generate the analog output signal V$_{OUT}$. For vertical pixel binning readout, the feedback capacitor has been reset at the beginning of n samples readout. In this case, the charge transfer from CSAML to CFB of the n readout [e.g. column 2nk to 2n (k+1)−2] has been binned (added) at CFB. The output signal V$_{OUT}$ of the video amplifier/switched capacitor integrator circuit 170 is given by the equation:

$$V_{OUT} = V_{CM} - \frac{CSMPL}{CFB} \cdot \sum_{i=0}^{n-1} VA_{IN}(2nk+2i).$$

The video amplifier/switched capacitance integration circuit 170 integrates each of the column averaged differential light conversion electrical output signals for each physical row of a super-pixel to create a row binned differential light conversion electrical output signal of the analog output signal 175 that is transferred to external circuit such as an analog-to-digital converter for further processing. The odd column select lines $$\text{CSEL\_ODD}[2n(k+m)+(r)] \mid_{r=0}^{n-1} \mid_{m=0}^{n-1}$$

are activated to generate the differential light conversion electrical signals for the green-2 (G2) and blue (B) super-pixels.

As noted above, the even and odd row averaging activation signals RAVE_EVEN[N:0] and RAVE_ODD[N:0] are not activated. The video amplifier/switched integration circuit 170 provides the binning function for providing sufficient spatial resolution and better SNR at low light level not achievable by the row averaging circuit 135 of FIGS. 5, 6, and 8.

In the low light level conditions, the effective output voltage of the analog signal 175 at the output of the video amplifier/switched capacitor integration circuit 170 for each of the column averaged and row binned pixels is given by the equations:

$$R^O(k,l) = \frac{1}{n} * G * \left(\frac{n*CS}{n*CS+CST}\right) \sum_{i=0}^{n-1}\sum_{j=0}^{n-1} [R(2\times n \times k + 2\times i, 2\times n \times l + 2 \times j)]$$

$$G1^O(k,l) = \frac{1}{n} * G * \left(\frac{n*CS}{n*CS+CST}\right)$$

$$\sum_{i=0}^{n-1}\sum_{j=0}^{n-1} [G1(2\times n \times k + 2\times i + 1, 2\times n \times l + 2 \times j)]$$

$$G2^O(k,l) = \frac{1}{n} * G * \left(\frac{n*CS}{n*CS+CST}\right)$$

$$\sum_{i=0}^{n-1}\sum_{j=0}^{n-1} [G2(2\times n \times k + 2\times i, 2\times n \times l + 2 \times j + 1)]$$

$$B^O(k,l) = \frac{1}{n} * G * \left(\frac{n*CS}{n*CS+CST}\right)$$

$$\sum_{i=0}^{n-1}\sum_{j=0}^{n-1} [B(2\times n \times k + 2\times i + 1, 2\times n \times l + 2 \times j + 1)]$$

where:
- n is the decimation ratio of the sub-sampling of the array.
- CS is the effective value of the sample and hold capacitor CS(i).
- CST is the value of the storage capacitor CE(i) or CE(i)
- G is the gain of the video amplifier/switched capacitor integrator circuit 170. The analog gain G of the video amplifier/switched capacitor integrator circuit 170 is the ratio of the sampling capacitor CSMPL to the feedback capacitor CFB (CSMPL/CFB).
- i is the counting variable for the neighboring pixels in a row dimension of the sub sampled array 15.
- j is the counting variable for the neighboring pixels for a column dimension of the sub sampled array 15.
- k is the counting variable for a row dimension of the sub sampled array 15.
- l is the counting variable for the column dimension of the sub sampled array 15.
- R$^o$ is the red pixel of the sub sampled array 15.
- G1$^o$ is the first green pixel of the sub sampled array 15.
- G2$^o$ is the second green pixel of the sub sampled array 15.
- B$^o$ is the blue pixel of the sub sampled array 15.

Figure 18:
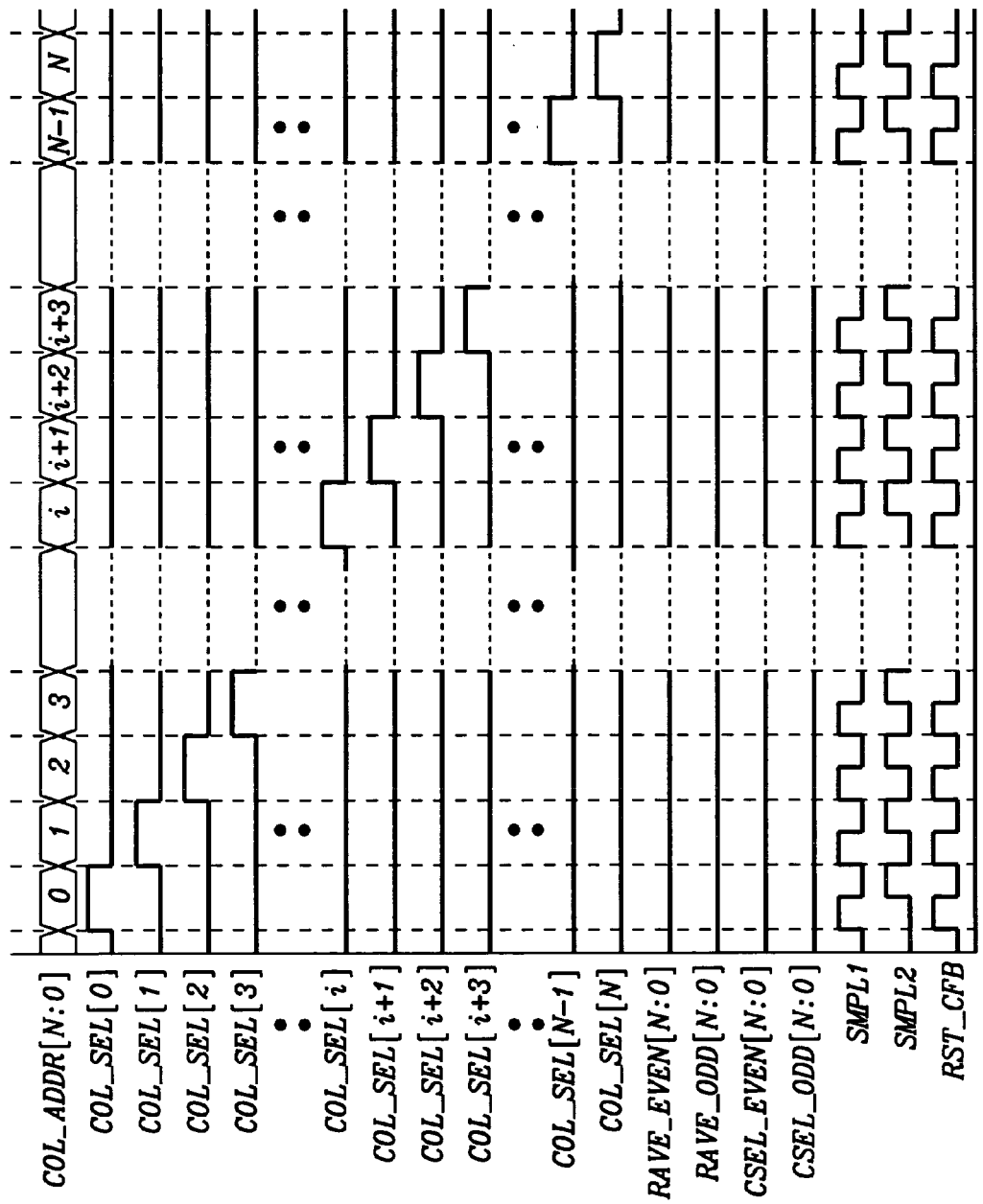
FIG. 18 is a timing diagram for operation of the image resolution adjustment circuit of this invention of FIGS. 9a-9d showing the image resolution adjustment for providing the full frame resolution of the image sensor.

When the CMOS active pixel array is to function at full resolution, the row addresses 110 of FIGS. 5 are set to sequentially address each row of the CMOS active pixel array. Each pixel is reset and the light conversion is initiated. The sample and hold circuit 125 of FIGS. 5, 6, and 8 captures the light conversion electrical signal V$_{out}$ and the light conversion electrical signal through the source follower SF$_1$ for each column of the addressed row. The light conversion electrical signal is then selectively transferred through the column select switch SW₃ to the column bus 180 to the video amplifier/switched capacitor integrator 170. In this operation the switched capacitor integrator is inoperative and the video signal is amplified and transferred as the analog signal to external circuitry Refer now to FIG. 18 the column select signals COL_SEL[0], ..., COL_SEL[i], ..., COL_SEL[N] are sequentially activated to set the switches SW₃ to transfer the light conversion electrical signals $V_{OUT}$ to the video amplifier/switched capacitor integrator circuit 170 of FIG. 9d as the analog signal 175 to external circuitry (analog-to-digital converter) for further processing. Each row is sequentially selected and the column selection as described is repeated for each row.

Figure 19:
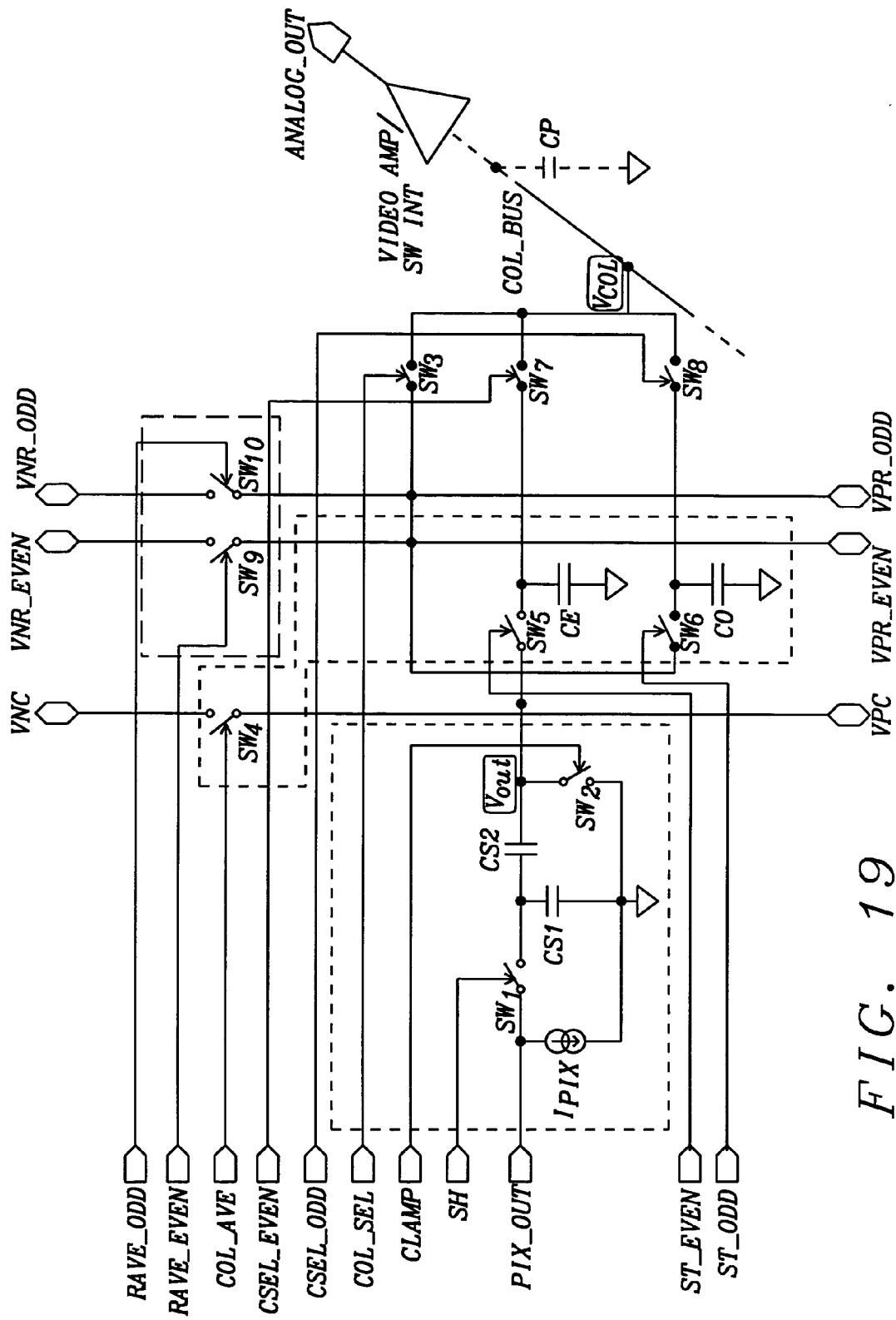
FIG. 19 is a schematic diagram of a second embodiment of a single column sample, holding, and averaging sub-circuit of an image resolution adjustment circuit of this invention.
Figure 20A:
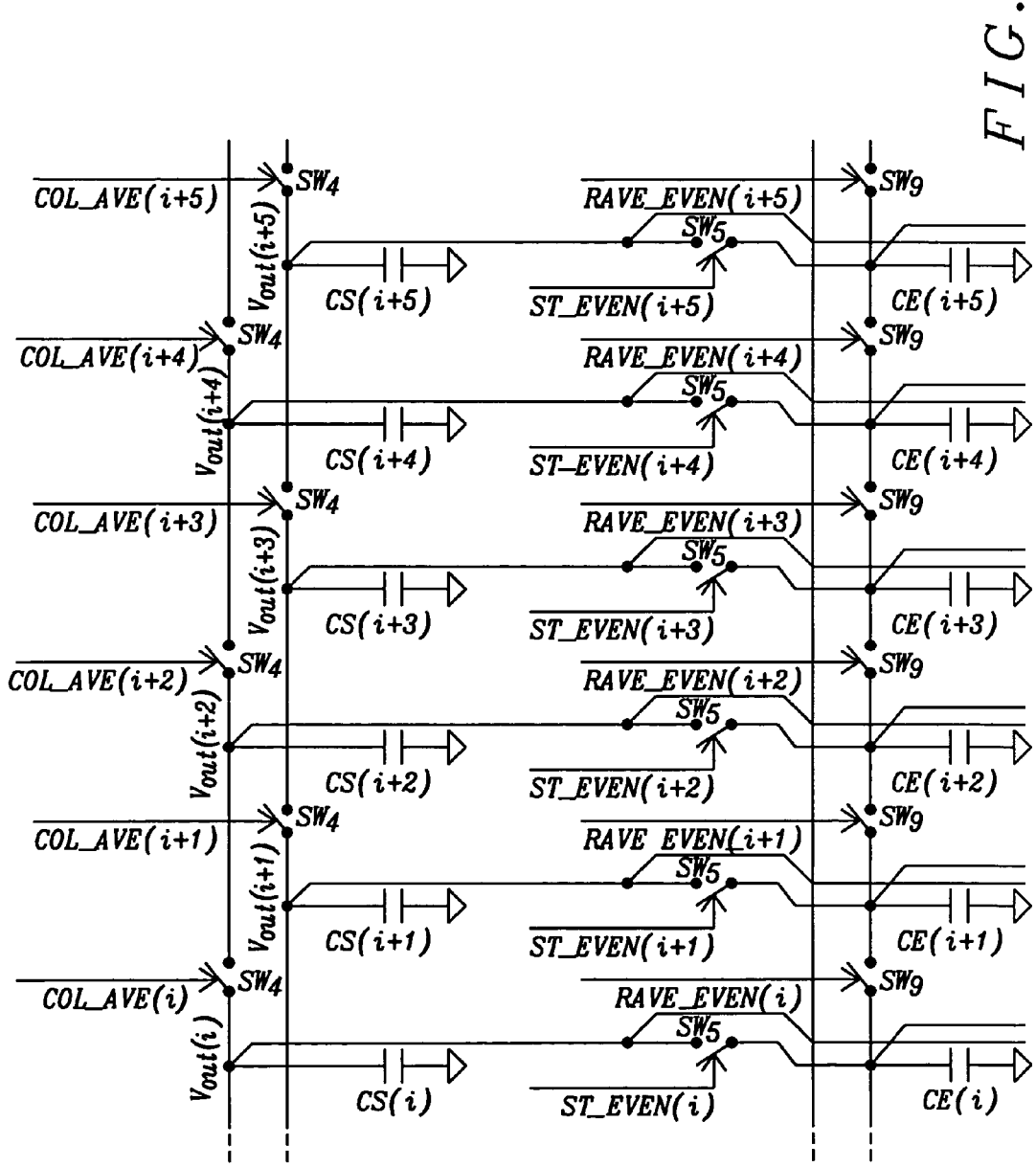
FIGS. 20a-20d are, in composite, a schematic diagram of multiple a single column sample, holding, and averaging sub-circuits forming the image resolution adjustment circuit of this invention.
Figure 20B:
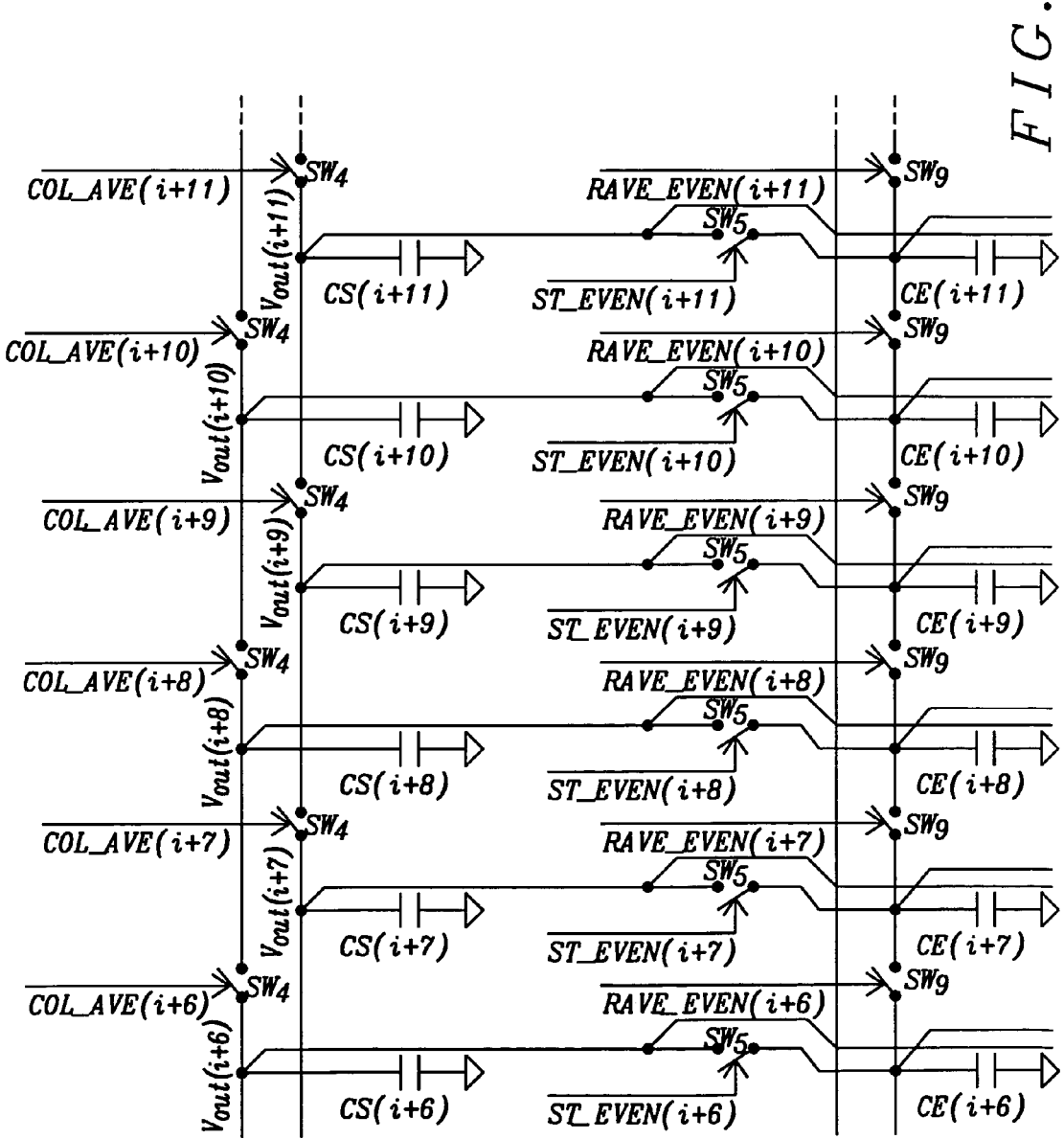
Figure 20C:
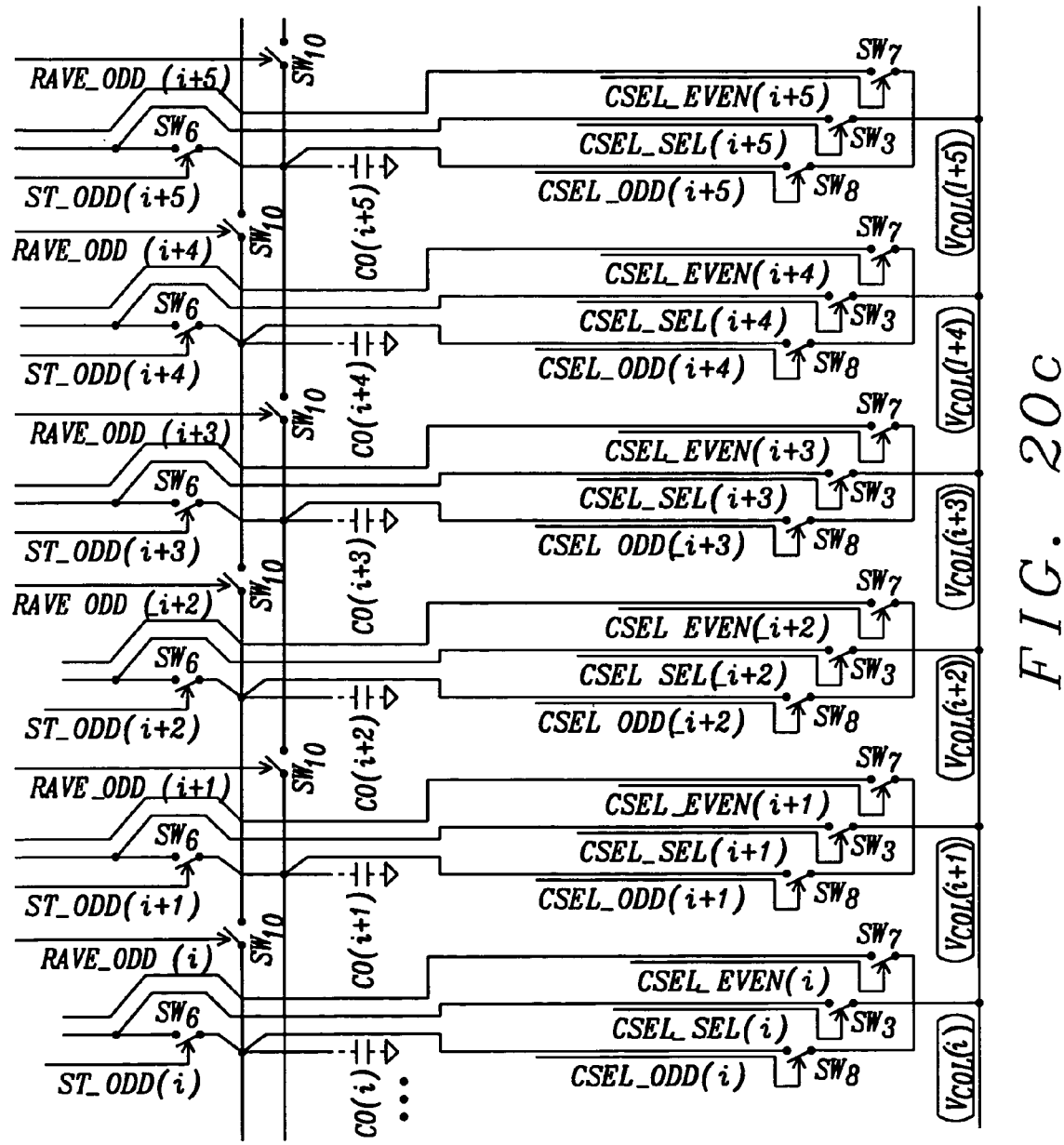
Figure 20D:
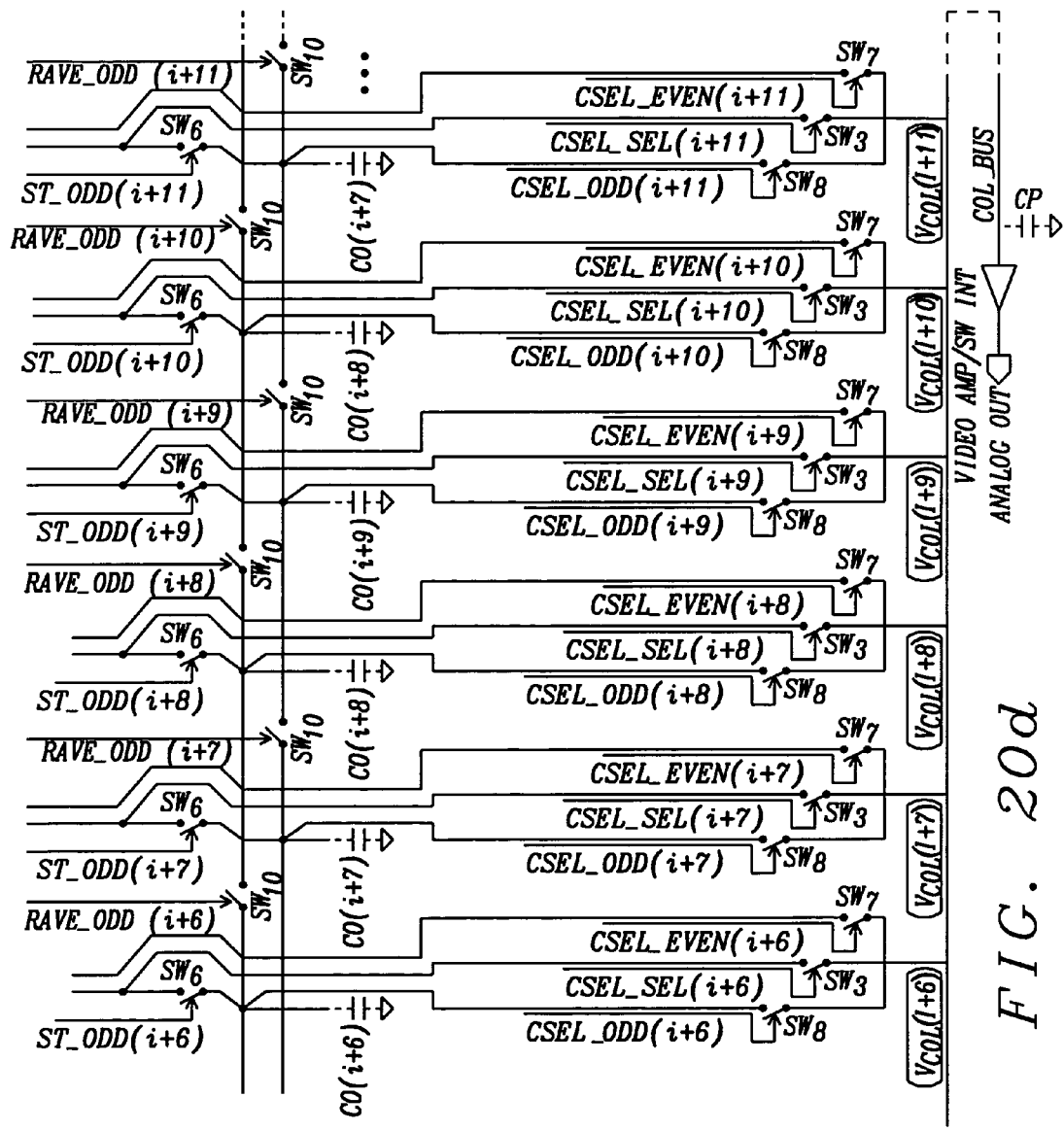

FIG. 19 illustrates a second embodiment of the sample and hold column averaging circuit of this invention. The SHCAC circuit is essentially identical to the structure and function of the first embodiment of FIG. 6a, except the source followers SF of FIG. 6a are eliminated thus creating a passive column averaging, row averaging/binning circuit of this invention. The SHCAC circuit with the source followers SF eliminated has very low column fixed pattern noise. Alternately, the elimination of the source followers SF causes the signal dilution from the charge sharing between effective sampling capacitor CS and the large parasitic capacitor CP of the column bus COL_BUS. The output voltage $V_{COL}$ at the column bus COL_BUS is determined by the equation:

$$V_{COL} = \frac{\left(\frac{CS1 \cdot CS2}{CS1 + CS2}\right)}{\left(\frac{CS1 \cdot CS2}{CS1 + CS2}\right) + CP} \cdot V_{OUT}$$

Where:
$V_{COL}$ is the voltage level representing the light level impinging upon the pixel being sensed.
CS1 is the capacitance value of the series capacitor CS1.
CS2 is the capacitance value of the series capacitor CS2.
CP is the capacitance value of the parasitic capacitor CP.

For large arrays of CMOS active pixel sensors, the large parasitic capacitance CP of the column bus COL_BUS (due to long routed wiring and a large number of switches) is the main contributor to the dilution of the output voltage VCOL to the video amplifier/switched capacitor integrator 170.

For resolution adjustment of the array of CMOS active pixel sensors, the image decimation by using column averaging, row averaging/binning approach can also be implemented into the passive column readout and will reduce the signal dilution effect since a high column output voltage VOUT is expected.

FIGS. 20a-20d, in composite, form the schematic of passive column SHCAC of this invention. The reset switches for the storage capacitors CE and CO are not illustrated and are as shown in FIG. 6b. As described above, the reset switches are controlled by the global control switch reset signal CECO_RST.

The operation of the passive SHCAC is identical to that described above for the first embodiment incorporating the source followers SF. In order to get highest effective gain, for the passive SHCAC, the capacitance of storage capacitor CE(i) or CE(i) is optimized. Based on the theoretical analysis, the optimized size of the storage capacitor CE(i) or CE(i) is the square root of the product of effective sampling capacitor CS(i) and line parasitic capacitor CP.

The input voltage $V_{COL}$ at the input of the video amplifier/switched capacitor integrator 170 in full resolution image readout for each of the output pixels R°, G1°, G2°, and B° is given by:

$$R^O(i,j) = \frac{CS}{CS+CP} * R(i,j) = \frac{1}{1+\alpha} R(i,j)$$

$$G1^O(i,j) = \frac{CS}{CS+CP} * G1(i,j) = \frac{1}{1+\alpha} G1(i,j)$$

$$G2^O(i,j) = \frac{CS}{CS+CP} * G2(i,j) = \frac{1}{1+\alpha} G2(i,j)$$

$$B^O(i,j) = \frac{CS}{CS+CP} * B(i,j) = \frac{1}{1+\alpha} B(i,j)$$

where:
n is the decimation ratio of the sub-sampling of the array.
i is the counting variable for the neighboring pixels in a row dimension of the sub sampled array 15.
j is the counting variable for the neighboring pixels for a column dimension of the sub sampled array 15.
α is the ratio of the parasitic capacitance CP to the effective capacitance value CS of the sample and hold capacitances C1 and C2.
R° is the red pixel of the sub sampled array 15.
G1° is the first green pixel of the sub sampled array 15.
G2° is the second green pixel of the sub sampled array 15.
B° is the blue pixel of the sub sampled array 15.

The capacitance value of the storage capacitor CE(i) or CE(i) is assigned according to the equation:

$$CST = \sqrt{CS*CP}$$

where:
CST is the value of the storage capacitor CE(i) or CE(i)

The values of the input voltage $V_{COL}$ at the input of the video amplifier/switched capacitor integrator 170 for each of the output pixels R°, G1°, G2°, and B° in a column and row averaging operation is given by:

$$R^\circ(k,l) = \frac{1}{\left(1+\frac{\sqrt{\alpha}}{n}\right)^2} \sum_{i=0}^{n-1} \sum_{j=0}^{n-1} [R(2 \times n \times k + 2 \times i, 2 \times n \times l + 2 \times j)]$$

$$G1^\circ(k,l) = \frac{1}{\left(1+\frac{\sqrt{\alpha}}{n}\right)^2} \sum_{i=0}^{n-1} \sum_{j=0}^{n-1} [G1(2 \times n \times k + 2 \times i + 1, 2 \times n \times l + 2 \times j)]$$

$$G2^\circ(k,l) = \frac{1}{\left(1+\frac{\sqrt{\alpha}}{n}\right)^2} \sum_{i=0}^{n-1} \sum_{j=0}^{n-1} [G2(2 \times n \times k + 2 \times i, 2 \times n \times l + 2 \times j + 1)]$$

$$B^\circ(k,l) = \frac{1}{\left(1+\frac{\sqrt{\alpha}}{n}\right)^2} \sum_{i=0}^{n-1} \sum_{j=0}^{n-1} [B(2 \times n \times k + 2 \times i + 1, 2 \times n \times l + 2 \times j + 1)]$$

where:
n is the decimation ratio of the sub-sampling of the array.
α is the ratio of the parasitic capacitance CP to the effective capacitance value CS of the sample and hold capacitances C1 and C2.
i is the counting variable for the neighboring pixels in a row dimension of the sub sampled array 15.

j is the counting variable for the neighboring pixels for a column dimension of the sub sampled array 15.

k is the counting variable for a row dimension of the sub sampled array 15.

l is the counting variable for the column dimension of the sub sampled array 15.

$R^o$ is the red pixel of the sub sampled array 15.

$G1^o$ is the first green pixel of the sub sampled array 15.

$G2^o$ is the second green pixel of the sub sampled array 15.

$B^o$ is the blue pixel of the sub sampled array 15.

As can be seen, by comparing the full resolution result with the averaged result of a super-pixel, the resultant input voltage $V_{COL}$ has been enhanced because of less voltage dilution.

The vertical pixel binning readout of passive SHCAC, is as described above for the active SHCAC. The output signal $V_{OUT}$ of the video amplifier/switched capacitor integrator circuit 170 is given by the equation:

$$V_{OUT} = V_{CM} - \frac{CSMPL}{CFB} \cdot \sum_{i=0}^{n-1} VA_{IN}(2nk + 2i).$$

The amplifier input voltage $VA_{IN}$ being essentially the input voltage $V_{COL}$ at the input of the video amplifier/switched capacitor integrator 170.

While the above embodiments refers to an array of CMOS active pixels with resolution adjustment circuitry having the primary color (Red, Green, and Blue) detectors arranged in a Bayer Pattern, it is in keeping with the intent of this invention that other sensor arrays and array patterns may be employed. The structure of the column averaging process connects columns having the same sense attributes for the sensing. The row averaging likewise connects the same sense attributes of adjacent rows for averaging the same sense attributes for sensing. Similarly, the row binning will integrate the rows of the same sense attributes for the binning process. For instance, the CMOS active pixels sensors may have the four channel subtractive colors of Cyan, Magenta, Yellow, and Black. It is envisioned that the basic primary colors and the subtractive primary colors maybe combined on a single CMOS active pixel sensor array for improved color purity. The resolution adjustment would require column averaging and row averaging or binning of same color adjacent colors within a super-pixel. The structure of the sample and hold circuitry, the column averaging circuitry, the row averaging circuitry, and the video amplifier/switched capacitor integration circuitry would be identical. The main difference is the connectivity of the control switching and the timing and control of the switching to perform the column averaging and row averaging or row binning.

While this invention has been particularly shown and described with reference to the preferred embodiments thereof, it will be understood by those skilled in the art that various changes in form and details may be made without departing from the spirit and scope of the invention.

The invention claimed is:

1. A sensor resolution adjustment apparatus in communication with an array of sensors, wherein said array of sensors is organized in arrangements having a first dimension and a second dimension and has a plurality of sensor types arranged in a pattern to detect a phenomena and convert said phenomena to a conversion electrical signal, whereby each sensor type detects unique attributes of said phenomena, said sensor resolution adjustment apparatus adjusting sensor resolution for reception of the phenomena and comprising:

a sensor array decimation circuit in communication with said array of sensors to partition said array of sensors into a plurality of sub-groups of said array of sensors and generate partition control signals identifying addresses of said sub-groups;

a first dimensional averaging circuit in communication with said array of sensors to receive said conversion electrical signals and in communication with said sensor array decimation circuit to receive said partition control signals, from said partition control signals averaging said conversion electrical signals from sensors detecting common attributes from the first dimension of each of said plurality of said sub-groups of said array of sensors to generate first dimensional averaged electrical signals of said first dimension of said plurality of said sub-group of said array of sensors;

a second dimensional binning circuit:
in communication with said first dimensional averaging circuit to receive said first dimensional averaged electrical signals of each sub-group of sensors that detect said common attributes arranged on said first dimension within each sub-group of the array of sensors, and in communication with said sensor array decimation circuit to receive said partition control signals and from said partition control signals integrating said first dimensional averaged electrical signals for sensors having said common attributes on the second dimension of each of said plurality of said sub-groups of said array of sensors to selectively generate second dimensional binning electrical signals for said second dimension of said plurality of said sub-group of sensors having common attributes of said array of sensors; and a second dimensional averaging circuit
in communication with said first dimensional averaging circuit to receive said first dimensional averaged electrical signals of each sub-group of sensors that detect said common attributes arranged on said first dimension within each sub-group of the array of sensors, and in communication with said sensor array decimation circuit to receive said partition control signals and from said partition control signals to integrate said first dimensional averaged electrical signals for sensors having said common attributes on a second dimension of each of said plurality of said sub-groups of said array of sensors to selectively generate second dimensional averaged electrical signals of said second dimension of said plurality of said sub-group of sensors having common attributes of said array of sensors.

2. The sensor resolution adjustment apparatus of claim 1 further comprising:

an addressing, timing, and control processor circuit in communication with the sensor array decimation circuit, the first dimensional averaging circuit, the second dimensional binning circuit, and the second dimensional averaging circuit to generate addressing, timing, control, and select signals to coordinate generation of the conversion electrical signals from the plurality of sub-groups of the array of sensors, averaging of the conversion electrical signals from selected sensors within said sub-group to generate the first dimensional averaged electrical signals, selectively binning of the first dimensional averaged electrical signals from selected sensors within said sub-group to generate the second dimensional binning electrical signals, selectively averaging of the first dimensional averaged electrical signal to selectively generate the second dimensional averaged electrical signals.

3. The sensor resolution adjustment apparatus of claim 2 wherein said addressing, timing, and control processor circuit receives an average phenomena intensity signal, such that if said average phenomena intensity signals indicates a low intensity phenomena environment, said addressing, timing, and control processor circuit selects said second dimensional binning circuit for generating said second dimensional binning electrical signals.

4. The sensor resolution adjustment apparatus of claim 3 wherein if said average phenomena intensity signals indicates a high intensity phenomena environment, said addressing, timing, and control processor circuit selects said second dimensional averaging circuit for generating said second dimensional averaging electrical signals.

5. The sensor resolution adjustment apparatus of claim 2 further comprising a sample and hold circuit connected to the array of sensors to sample and hold the conversion electrical signals from selected sensors for transfer to said first dimensional averaging circuit and in communication with said addressing, timing, and control processor circuit to receive said timing, control, and select signals for sampling and holding said conversion electrical signals.

6. The sensor resolution adjustment apparatus of claim 5 wherein said signal integrator further comprises an amplifier connected to selectively receive one of a group of electrical signals comprising the conversion electrical signals, the second dimensional averaging electrical signals, and the second dimensional binned electrical signals to amplify and condition said selected electrical signals for external processing.

7. The sensor resolution adjustment apparatus of claim 2 wherein the second dimensional binning circuit comprises:
a signal integrator that additively combines said first dimensional averaged electrical signals for sensors having said common attributes on the second dimension of each of said plurality of said sub-groups of said array of sensors to selectively generate said second dimensional binning electrical signals for said second dimension of said plurality of said sub-group of sensors having common attributes of said array of sensors.

8. The sensor resolution adjustment apparatus of claim 7 wherein said signal integrator comprises:
a sampling capacitor in communication with said first dimensional averaging circuit to receive and sample said first dimensional averaged electrical signals;
an operational amplifier in communication with said sampling capacitor to receive and amplify the sample of said first dimensional averaged electrical signals;
a feedback capacitor connected to transfer an accumulation signal integrating said first dimensional averaged electrical signals for sensors having said common attributes on the second dimension of each of said plurality of said sub-groups of said array of sensors from an output of said operational amplifier to input of said operational amplifier such that said accumulation signal and a current first dimensional averaged signal of one rank of said second dimension of said sensors having said common attributes on the second dimension of each of said plurality of said sub-groups of said array of sensors are additively combined to generate said second dimensional binning electrical signal.

9. The sensor resolution adjustment apparatus of claim 8 further comprising:
a first sampling switch in communication between said sampling capacitor and said first dimensional averaging circuit to control said sampling of said first dimension averaged electrical signals;
a second sampling switch in communication between said sampling capacitor and said operational amplifier to control additively combining of said first dimensional electrical signals and the accumulation signal; and
a feedback capacitor reset switch in communication between a top and a bottom plate of the feedback capacitor to remove said second dimensional binning electrical signals at completion of said additive combining said first dimensional averaged electrical signals for sensors having said common attributes on the second dimension of each of said plurality of said sub-groups of said array of sensors.

10. The sensor resolution adjustment apparatus of claim 2 wherein the second dimensional averaging circuit comprises:
a plurality of second dimensional averaging switches, each second dimensional averaging switch connected to the first dimensional averaging circuit to receive first dimensional averaged electrical signals for sensors with said common attributes on the second dimension of each of said plurality of sub-groups of said array of sensors to average the first dimensional averaged electrical signals to create the second dimensional averaged electrical signals, each of said plurality of second dimensional averaging switches in communication with said addressing, timing, and control processor circuit to receive said addressing, timing, control, and select signals to selectively connect said first dimensional averaging circuits of sensors having said common attributes on the second dimension of each of said plurality of sub-groups of said array of sensors.

11. The sensor resolution adjustment apparatus of claim 10 wherein the first dimensional averaging circuit further comprises:
a second plurality of averaging capacitors, each averaging capacitor connected to receive the conversion electrical signal from the sensors of an associated sensor of the array of sensors on the first dimension; and
a second plurality of averaging switches connected to receive the conversion electrical signals from an adjacent sensor on said second dimension to selectively transfer said electrical signal from said adjacent sensor to a selected second averaging capacitor to average the electrical signals from an attached sensor and the adjacent sensors, each of said second plurality of averaging switches in communication with said addressing, timing, and control processor circuit to receive said timing, control, and select signals to selectively connect said second averaging capacitors to average the conversion electrical signals of said associated sensors of the array of sensors on the second dimension.

12. The sensor resolution adjustment apparatus of claim 2 wherein the first dimensional averaging circuit comprises:
a first plurality of averaging capacitors, each averaging capacitor connected to receive the conversion electrical signal from the sensors of an associated sensor of the array of sensors on the first dimension; and
a first plurality of averaging switches connected to receive the electrical signal from an adjacent sensor on said first dimension to selectively transfer said electrical signal from said adjacent sensor to a first selected averaging capacitor to average the electrical signals from an attached sensor and the adjacent sensors, each of said first plurality of averaging switches in communication with said addressing, timing, and control processor circuit to receive said timing, control, and select signals to selectively connect one said averaging capacitors to average the conversion electrical signals of said associated sensors of the array of sensors on the first dimension.

13. The sensor resolution adjustment apparatus of claim 1 of wherein the first dimension of the array of sensors is a column of said sensors and the second dimension of the array of sensors is a row of said sensors.

14. The sensor resolution adjustment apparatus of claim 1 wherein said sensors are active pixels sensors, said phenomena is light impinging upon said array of sensors, converting said light to the conversion electrical signal, and said pattern is a Bayer pattern.

15. The sensor resolution adjustment apparatus of claim 1 further comprising:
a plurality of source follower circuits, each source follower connected to receive one of said conversion electrical signals, said first dimensional averaged electrical signals, and said second dimensional averaged electrical signals to isolate said received one of said conversion electrical signals, said first dimensional averaged electrical signals, and said second dimensional averaged electrical signals from effects of a parasitic capacitor present at an output bus of said sensor resolution adjustment circuit.

16. A photo-sensor image resolution adjustment apparatus in communication with an array of image photo-sensors, wherein said array of image photo-sensors is organized in columns and rows and has a plurality of sensor types arranged in a pattern to detect light and convert said light to a light conversion electrical signal, whereby each sensor type detects unique colors of said light, said photo-sensor image resolution adjustment apparatus adjusting sensor resolution for reception of the light and comprising:
a photo-sensor array decimation circuit in communication with said array of image photo-sensors to partition said array of image photo-sensors into a plurality of sub-groups of said array of image photo-sensors and generate partition control signals identifying addresses of said sub-groups;
a column averaging circuit in communication with said array of image photo-sensors to receive said light conversion electrical signals and in communication with said photo-sensor array decimation circuit to receive said partition control signals, from said partition control signals averaging said light conversion electrical signals from photo-sensors detecting common colors from the columns of each of said plurality of said sub-groups of said array of image photo-sensors to generate column averaged electrical signals of said columns of said plurality of said sub-group of said array of image photo-sensors;
a row binning circuit:
in communication with said column averaging circuit to receive said column averaged electrical signals of each sub-group of photo-sensors that detect said common colors arranged on said columns within each sub-group of the array of image photo-sensors, and
in communication with said photo-sensor array decimation circuit to receive said partition control signals and from said partition control signals to integrate said column averaged electrical signals for sensors having said common colors on the rows of each of said plurality of said sub-groups of said array of image photo-sensors to selectively generate row binning electrical signals of said rows of said plurality of said sub-group of photo-sensors having common colors of said array of image photo-sensors; and
a row averaging circuit:
in communication with said column averaging circuit to receive said column averaged electrical signals of each sub-group of photo-sensors that detect said common colors arranged on said columns within each sub-group of the array of image photo-sensors, and
in communication with said photo-sensor array decimation circuit to receive said partition control signals and from said partition control signals to average said column averaged electrical signals for sensors having said common colors on rows of each of said plurality of said sub-groups of said array of image photo-sensors to create row averaged electrical signals of said rows of said plurality of said sub-group of photo-sensors having common colors of said array of image photo-sensors.

17. The photo-sensor image resolution adjustment apparatus of claim 16 further comprising:
an addressing, timing, and control processor circuit in communication with the photo-sensor array decimation circuit, the column averaging circuit, and the row binning circuit, and the row averaging circuit to provide addressing, timing, control, and select signals to coordinate generation of the light conversion electrical signals from the plurality of sub-groups of the array of image photo-sensors, averaging of the light conversion electrical signals from selected sensors within said sub-group to generate the column averaged electrical signals, selectively binning of the column averaged electrical signals from selected photo-sensors within said sub-group to generate the row binning electrical signals, selectively averaging of the column averaged electrical signals to selectively generate the row averaged electrical signals.

18. The photo-sensor image resolution adjustment apparatus of claim 17 wherein said addressing, timing, and control processor circuit receives an averaging light intensity signal, such that if said averaging light intensity signals indicates a low intensity light environment, said addressing, timing, and control processor circuit selects said row binning circuit for generating said row binning electrical signals.

19. The photo-sensor image resolution adjustment apparatus of claim 18 wherein, if said averaging light intensity signals indicates a high intensity light environment, said addressing, timing, and control processor circuit selects said row averaging circuit for generating said row averaging electrical signals.

20. The photo-sensor image resolution adjustment apparatus of claim 17 further comprising a sample and hold circuit connected to the array of image photo-sensors to sample and hold the light conversion electrical signals from selected photo-sensors for transfer to said column averaging circuit and in communication with said addressing, timing, and control processor circuit to receive said timing, control, and select signals for sampling and holding said light conversion electrical signals.

21. The photo-sensor image resolution adjustment apparatus of claim 17 wherein the row averaging circuit comprises:
a plurality of row averaging switches, each row averaging switch connected to the column averaging circuit to receive column averaged electrical signals for sensors with said common colors on the rows of each of said plurality of sub-groups of said array of image photo-sensors to average the column averaged light conversion electrical signals to create the row averaged electrical signals, each of said plurality of row averaging switches in communication with said addressing, timing, and control processor circuit to receive said addressing, timing, control, and select signals to selectively connect said column averaging circuits of sensors having said common colors on the rows of each of said plurality of sub-groups of said array of image photo-sensors.

22. The photo-sensor image resolution adjustment apparatus of claim 17 wherein the column averaging circuit comprises:
  a first plurality of averaging capacitors, each averaging capacitor connected to receive the light conversion electrical signal from the photo-sensors of a photo-sensor having a common color of the array of image photo-sensors on the columns; and
  a first plurality of averaging switches connected to receive the electrical signal from an adjacent photo-sensor on said columns to selectively transfer said electrical signal from said adjacent photo-sensor to a first selected averaging capacitor to average the conversion electrical signals from an attached photo-sensor and the adjacent photo-sensors, each of said first plurality of averaging switches in communication with said addressing, timing, and control processor circuit to receive said timing, control, and select signals to selectively connect one said averaging capacitors to average the light conversion electrical signals of said adjacent photo-sensors of the array of image photo-sensors on the columns.

23. The photo-sensor image resolution adjustment apparatus of claim 22 wherein the column averaging circuit further comprises:
  a second plurality of averaging capacitors, each averaging capacitor connected to receive the light conversion electrical signal from the photo-sensors of a photo-sensor having the common color of the array of image photo-sensors on the columns; and
  a second plurality of averaging switches connected to receive the light conversion electrical signals from the adjacent photo-sensor on said rows to selectively transfer said electrical signal from said adjacent photo-sensor to a selected second averaging capacitor to average the electrical signals from an attached sensor and the adjacent photo-sensors, each of said second plurality of averaging switches in communication with said addressing, timing, and control processor circuit to receive said timing, control, and select signals to selectively connect said second averaging capacitors to average the light conversion electrical signals of said adjacent photo-sensors of the array of image photo-sensors on the rows.

24. The photo-sensor image resolution adjustment apparatus of claim 16 wherein the row binning circuit comprises:
  a signal integrator that additively combines said row averaged electrical signals for photo-sensors having said common colors on the rows of each of said plurality of said sub-groups of said array of photo-sensors to selectively generate said row binning electrical signals for said rows of said plurality of said sub-group of photo-sensors having common colors of said array of photo-sensors.

25. The photo-sensor image resolution adjustment apparatus of claim 24 wherein said signal integrator comprises:
  a sampling capacitor in communication with said column averaging circuit to receive and sample said column averaged electrical signals;
  an operational amplifier in communication with said sampling capacitor to receive and amplify the sampling of said column averaged electrical signals;
  a feedback capacitor connected to transfer a row accumulation signal integrating said column averaged electrical signals for photo-sensors having said common colors on the rows of each of said plurality of said sub-groups of said array of sensors from an output of said operational amplifier to input of said operational amplifier such that said row accumulation signal and a current column averaged signal of one row of said rows of said photo-sensors having said common attributes on the rows of each of said plurality of said sub-groups of said array of photo-sensors are additively combined to generate said row binning electrical signal.

26. The photo-sensor image resolution adjustment apparatus of claim 25 wherein the signal integrator further comprises:
  a first sampling switch in communication between said sampling capacitor and said column averaging circuit to control said sampling of said column averaged electrical signals;
  a second sampling switch in communication between said sampling capacitor and said operational amplifier to control additively combining of said column averaged electrical signals and the row accumulation signal; and
  a feedback capacitor reset switch in communication between a top and a bottom plate of the feedback capacitor to remove said row binning electrical signals at completion of said additive combining said column averaged electrical signals for photo-sensors having said common on the columns of each of said plurality of said sub-groups of said array of photo-sensors.

27. The photo-sensor image resolution adjustment apparatus of claim 16 wherein said photo-sensors are active pixels sensors and said light is impinging upon said array of active pixel sensors to convert the light to the light conversion electrical signal.

28. The photo-sensor image resolution adjustment apparatus of claim 16 wherein the row binning circuit further comprises an amplifier connected to selectively receive one of a group of electrical signals comprising the light conversion electrical signals, the row averaging electrical signals, and the row binning electrical signals to amplify and condition said selected electrical signals for external processing.

29. The photo-sensor image resolution adjustment apparatus of claim 16 further comprising:
  a plurality of source follower circuits, each source follower connected to receive one of said light conversion electrical signals, said column averaged electrical signals, and said row averaged electrical signals to isolate said light conversion electrical signals, said column averaged electrical signals, and said row averaged electrical signals from effects of a parasitic capacitor present at an output bus of said photo-sensor image resolution adjustment circuit.

30. An image photo-sensing device comprising:
  an array of image photo-sensors organized in columns and rows and having a plurality of sensor types arranged in a pattern to detect light and convert said light to a light conversion electrical signal, whereby each sensor type detects unique colors of said light; and
  a photo-sensor image resolution adjustment apparatus in communication with the array of image photo-sensors for adjusting sensor resolution for reception of the light of said array of photo-sensors, said photo-sensor image resolution adjustment apparatus comprising:

a photo-sensor array decimation circuit in communication with said array of image photo-sensors to partition said array of image photo-sensors into a plurality of sub-groups of said array of image photo-sensors and generate partition control signals identifying addresses of said subgroups;

a column averaging circuit in communication with said array of image photo-sensors to receive said light conversion electrical signals and in communication with said photo-sensor array decimation circuit to receive said partition control signals, from said partition control signals averaging said light conversion electrical signals from photo-sensors detecting common colors from the columns of each of said plurality of said sub-groups of said array of image photo-sensors to generate column averaged electrical signals of said columns of said plurality of said sub-group of said array of image photo-sensors, a row binning circuit:
   in communication with said column averaging circuit to receive said column averaged electrical signals of each sub-group of photo-sensors that detect said common colors arranged on said columns within each sub-group of the array of image photo-sensors, and
   in communication with said photo-sensor array decimation circuit to receive said partition control signals and from said partition control signals to integrate said column averaged electrical signals for sensors having said common colors on the rows of each of said plurality of said sub-groups of said array of image photo-sensors to selectively generate row binning electrical signals of said rows of said plurality of said sub-group of photo-sensors having common colors of said array of image photo-sensors; and a row averaging circuit:
   in communication with said column averaging circuit to receive said column averaged electrical signals of each sub-group of photo-sensors that detect said common colors arranged on said columns within each sub-group of the array of image photo-sensors, and
   in communication with said photo-sensor array decimation circuit to receive said partition control signals and from said partition control signals to average said column averaged electrical signals for sensors having said common colors on rows of each of said plurality of said sub-groups of said array of image photo-sensors to create row averaged electrical signals of said rows of said plurality of said sub-group of photo-sensors having common colors of said array of image photo-sensors.

31. The image photo-sensing device of claim 30 wherein the photo-sensor image resolution adjustment apparatus further comprises:
   an addressing, timing, and control processor circuit in communication with the photo-sensor array decimation circuit, the column averaging circuit, the row binning circuit, and the row averaging circuit to provide addressing, timing, control, and select signals to coordinate generation of the light conversion electrical signals from the plurality of sub-groups of the array of image photo-sensors, averaging of the light conversion electrical signals from selected sensors within said sub-group to generate the column averaged electrical signals, selectively binning of the column averaged electrical signals from selected photo-sensors within said sub-group to generate the row binning electrical signals, selectively averaging of the column averaged electrical signals selectively generate the row averaged electrical signals.

32. The image photo-sensing device of claim 31 wherein said addressing, timing, and control processor circuit receives an averaging light intensity signal, such that if said averaging light intensity signals indicates a low intensity light environment, said addressing, timing, and control processor circuit selects said row binning circuit for generating said row binning electrical signals.

33. The image photo-sensing device of claim 32 wherein, if said averaging light intensity signals indicates a high intensity light environment, said addressing, timing, and control processor circuit selects said row averaging circuit for generating said row averaging electrical signals.

34. The image photo-sensing device of claim 33 wherein the row binning circuit comprises:
   a signal integrator that additively combines said row averaged electrical signals for photo-sensors having said common colors on the rows of each of said plurality of said sub-groups of said array of photo-sensors to selectively generate said row binning electrical signals for said rows of said plurality of said sub-group of photo-sensors having common colors of said array of photo-sensors.

35. The image photo-sensing device of claim 34 wherein said signal integrator comprises:
   a sampling capacitor in communication with said column averaging circuit to receive and sample said column averaged electrical signals;
   an operational amplifier in communication with said sampling capacitor to receive and amplify the sampling of said column averaged electrical signals;
   a feedback capacitor connected to transfer a row accumulation signal integrating said column averaged electrical signals for photo-sensors having said common colors on the rows of each of said plurality of said sub-groups of said array of sensors from an output of said operational amplifier to input of said operational amplifier such that said row accumulation signal and a current column averaged signal of one row of said rows of said photo-sensors having said common attributes on the rows of each of said plurality of said sub-groups of said array of photo-sensors are additively combined to generate said row binning electrical signal.

36. The image photo-sensing device of claim 35 wherein the signal integrator further comprises:
   a first sampling switch in communication between said sampling capacitor and said column averaging circuit to control said sampling of said column electrical signals;
   a second sampling switch in communication between said sampling capacitor and said operational amplifier to control additively combining of said column averaged electrical signals and the row accumulation signal; and
   a feedback capacitor reset switch in communication between a top and a bottom plate of the feedback capacitor to remove said row binning electrical signals at completion of said additive combining said column averaged electrical signals for photo-sensors having said common on the columns of each of said plurality of said sub-groups of said array of photo-sensors.

37. The image photo-sensing device of claim 31 wherein the photo-sensor image resolution adjustment apparatus further comprises a sample and hold circuit connected to the array of image photo-sensors to sample and hold the light conversion electrical signals from selected photo-sensors for transfer to said column averaging circuit and in communication with said addressing, timing, and control processor circuit to receive said timing, control, and select signals for sampling and holding said light conversion electrical signals.

38. The image photo-sensing device of claim 31 wherein the row averaging circuit comprises:
a plurality of row averaging switches, each row averaging switch connected to the column averaging circuit to receive column averaged electrical signals for sensors with said common colors on the rows of each of said plurality of sub-groups of said array of image photo-sensors to average the column averaged light conversion electrical signals to create the row averaged electrical signals, each of said plurality of row averaging switches in-communication with said addressing, timing, and control processor circuit to receive said timing, control, and select signals to selectively connect said column averaging circuits of sensors having said common colors on the rows of each of said plurality of sub-groups of said array of image photo-sensors.

39. The image photo-sensing device of claim 31 wherein the column averaging circuit comprises:
a first plurality of averaging capacitors, each averaging capacitor connected to receive the light conversion electrical signal from the photo-sensors of a photo-sensor having a common color of the array of image photo-sensors on the columns; and
a first plurality of averaging switches connected to receive the electrical signal from an adjacent photo-sensor on said columns to selectively transfer said electrical signal from said adjacent photo-sensor to a first selected averaging capacitor to average the conversion electrical signals from an attached photo-sensor and the adjacent photo-sensors, each of said first plurality of averaging switches in communication with said addressing, timing, and control processor circuit to receive said timing, control, and select signals to selectively connect one said averaging capacitors to average the light conversion electrical signals of said adjacent photo-sensors of the array of image photo-sensors on the columns.

40. The image photo-sensing device of claim 39 wherein the column averaging circuit further comprises:
a second plurality of averaging capacitors, each averaging capacitor connected to receive the light conversion electrical signal from the photo-sensors of a photo-sensor having the common color of the array of image photo-sensors on the columns; and
a second plurality of averaging switches connected to receive the light conversion electrical signals from the adjacent photo-sensor on said rows to selectively transfer said electrical signal from said adjacent photo-sensor to a selected second averaging capacitor to average the electrical signals from an attached sensor and the adjacent photo-sensors, each of said second plurality of averaging switches in communication with said addressing, timing, and control processor circuit to receive said timing, control, and select signals to selectively connect said second averaging capacitors to average the light conversion electrical signals of said adjacent photo-sensors of the array of image photo-sensors on the rows.

41. The image photo-sensing device of claim 30 wherein said photo-sensors are active pixels sensors, said light is impinging upon said array of active pixel sensors to convert the light to the light conversion electrical signal, and said pattern is a Bayer pattern.

42. The image photo-sensing device of claim 30 wherein the row binning circuit further comprises an amplifier connected to selectively receive one of a group of electrical signals comprising the light conversion electrical signals, the row averaging electrical signals, and the row binning electrical signals to amplify and condition said selected electrical signals for external processing.

43. A method for photo-sensor image resolution adjustment comprising the steps of:
providing an array of image photo-sensors, wherein said array of image photo-sensors is organized in columns and rows and has a plurality of sensor types arranged in a pattern to detect light and convert said light to a light conversion electrical signal, whereby each sensor type detects unique colors of said light;
communicating with said array of image photo-sensors to partition said array of image photo-sensors into a plurality of sub-groups of said array of image photo-sensors and provide partition control signals;
column averaging said light conversion electrical signals from photo-sensors detecting common colors from the columns of each of said plurality of said sub-groups of said array of image photo-sensors from said partition control signals to create column averaged electrical signals of said columns of said plurality of said sub-group of said array of image photo-sensors;
selectively binning said column averaged electrical signals for sensors with said common colors on the rows of each of said plurality of said sub-groups of said array of image photo-sensors to generating binning electrical signals of said rows of said plurality of said sub-group of photo-sensors having common colors of said array of image photo-sensors; and
selectively row averaging said column averaged electrical signals of each sub-group of photo-sensors that detect said common colors arranged on said columns within each sub-group of the array of image photo-sensors from said partition control signals.

44. The method for photo-sensor image resolution adjustment of claim 43 further comprising the steps of:
providing addressing, timing, control, and select signals to coordinate generation of the light conversion electrical signals from the plurality of sub-groups of the array of image photo-sensors, averaging of the light conversion electrical signals from selected sensors within said sub-group to generate the column averaged electrical signals, select signals to activate the step of selectively binning of the column averaged electrical signals from selected photo-sensors within said sub-group to generate the row binning electrical signals, and provide select signals to activate the step of selectively averaging of the column averaged electrical signals selectively generate the row averaged electrical signals.

45. The method for photo-sensor image resolution adjustment of claim 44 comprises the steps of:
determining an averaging light intensity signal;
if said averaging light intensity signals indicates a low intensity light environment, providing select signals to activate binning said column averaged electrical signals for generating said row binning electrical signals.

46. The method for photo-sensor image resolution adjustment of claim 45 comprises the step of:
if said averaging light intensity signals indicates a high intensity light environment, providing select signals to activate row averaging said column averaged electrical signals for generating said row averaging electrical signals.

47. The method for photo-sensor image resolution adjustment of claim 44 further comprising the steps of:

sampling and holding the light conversion electrical signals from selected photo-sensors for averaging; and providing timing, control, and select signals for sampling and holding said light conversion electrical signals.

48. The method for photo-sensor image resolution adjustment of claim 44 wherein said photo-sensors are active pixels sensors and said light is impinging upon said array of active pixel sensors to convert the light to the light conversion electrical signal.

49. The method for photo-sensor image resolution adjustment of claim 43 wherein selectively binning is accomplished by a row binning circuit, said row binning circuit comprising:

a signal integrator that additively combines said row averaged electrical signals for photo-sensors having said common colors on the rows of each of said plurality of said sub-groups of said array of photo-sensors to selectively generate said row binning electrical signals for said rows of said plurality of said sub-group of photo-sensors having common colors of said array of photo-sensors.

50. The method for photo-sensor image resolution adjustment of claim 49 wherein said signal integrator comprises:

a sampling capacitor connected to receive and sample said column averaged electrical signals;

an operational amplifier in communication with said sampling capacitor to receive and amplify the sampling of said column averaged electrical signals;

a feedback capacitor connected to transfer a row accumulation signal integrating said column averaged electrical signals for photo-sensors having said common colors on the rows of each of said plurality of said sub-groups of said array of sensors from an output of said operational amplifier to input of said operational amplifier such that said row accumulation signal and a current column averaged signal of one row of said rows of said photo-sensors having said common attributes on the rows of each of said plurality of sub-groups of said array of photo-sensors are additively combined to generate said row binning electrical signal.

51. The method for photo-sensor image resolution adjustment of claim 50 wherein the signal integrator further comprises:

a first sampling switch in communication with said sampling capacitor and to control said sampling of said column averaged electrical signals;

a second sampling switch in communication between said sampling capacitor and said operational amplifier to control additively combining of said column averaged electrical signals and the row accumulation signal; and a feedback capacitor reset switch in communication between a top and a bottom plate of the feedback capacitor to remove said row binning electrical signals at completion of said additive combining said column averaged electrical signals for photo-sensors having said common on the columns of each of said plurality of said sub-groups of said array of photo-sensors.

52. The method for photo-sensor image resolution adjustment of claim 49 wherein the row binning circuit further comprises an amplifier connected to selectively receive one of a group of electrical signals comprising the light conversion electrical signals, the row averaging electrical signals, and the row binning electrical signals to amplify and condition said selected electrical signals for external processing.

53. The method for photo-sensor image resolution adjustment of claim 43 wherein said row averaging is accomplished by a row averaging circuit comprising:

a plurality of row averaging switches, each row averaging switch connected to the column averaging circuit to receive column averaged electrical signals for sensors with said common colors on the rows of each of said plurality of sub-groups of said array of image photo-sensors to average the column averaged light conversion electrical signals to create the row averaged electrical signals, each of said plurality of row averaging switches to receive said addressing, timing, control, and select signals to selectively connect said column averaging circuits of sensors having said common colors on the rows of each of said plurality of sub-groups of said array of image photo-sensors.

54. The method for photo-sensor image resolution adjustment of claim 43 wherein column averaging is accomplished by a column averaging circuit comprising:

a first plurality of averaging capacitors, each averaging capacitor connected to receive the light conversion electrical signal from the photo-sensors of a photo-sensor having a common color of the array of image photo-sensors on the columns; and a first plurality of averaging switches connected to receive the electrical signal from an adjacent photo-sensor on said columns to selectively transfer said electrical signal from said adjacent photo-sensor to a first selected averaging capacitor to average the conversion electrical signals from an attached photo-sensor and the adjacent photo-sensors, each of said first plurality of averaging switches in communication with said addressing, timing, and control processor circuit to receive said timing, control, and select signals to selectively connect one said averaging capacitors to average the light conversion electrical signals of said adjacent photo-sensors of the array of image photo-sensors on the columns.

55. The method for photo-sensor image resolution adjustment of claim 54 wherein the column averaging circuit further comprises:

a second plurality of averaging capacitors, each averaging capacitor connected to receive the light conversion electrical signal from the photo-sensors of a photo-sensor having the common color of the array of image photo-sensors on the columns; and a second plurality of averaging switches connected to receive the light conversion electrical signals from the adjacent photo-sensor on said rows to selectively transfer said electrical signal from said adjacent photo-sensor to a selected second averaging capacitor to average the electrical signals from an attached sensor and the adjacent photo-sensors, each of said second plurality of averaging switches in communication with said addressing, timing, and control processor circuit to receive said timing, control, and select signals to selectively connect said second averaging capacitors to average the light conversion electrical signals of said adjacent photo-sensors of the array of image photo-sensors on the rows.

56. The method for photo-sensor image resolution adjustment of claim 43 further comprising the steps of:

isolating said light conversion electrical signals, said column averaged electrical signals, and said row averaged electrical signals from effects of a parasitic capacitor.

57. An apparatus for photo-sensor image resolution adjustment comprising:

means for providing an array of image photo-sensors, wherein said array of image photo-sensors is organized in columns and rows and has a plurality of sensor types arranged in a pattern to detect light and convert said light to a light conversion electrical signal, whereby each sensor type detects unique colors of said light;

means for communicating with said array of image photo-sensors to partition said array of image photo-sensors into a plurality of sub-groups of said array of image photo-sensors and provide partition control signals;

means for column averaging said light conversion electrical signals from photo-sensors detecting common colors from the columns of each of said plurality of said sub-groups of said array of image photo-sensors from said partition control signals to create column averaged electrical signals of said columns of said plurality of said sub-group of said array of image photo-sensors;

means for selectively binning said column averaged electrical signals for sensors with said common colors on the rows of each of said plurality of said sub-groups of said array of image photo-sensors to generating binning electrical signals of said rows of said plurality of said sub-group of photo-sensors having common colors of said array of image photo-sensors; and means for selectively row averaging said column averaged electrical signals of each sub-group of photo-sensors that detect said common colors arranged on said columns within each sub-group of the array of image photo-sensors from said partition control signals.

58. The apparatus for photo-sensor image resolution adjustment of claim 57 further comprising:

means for providing addressing, timing, control, and select signals to coordinate generation of the light conversion electrical signals from the plurality of sub-groups of the array of image photo-sensors, averaging of the light conversion electrical signals from selected sensors within said sub-group to generate the column averaged electrical signals, select signals to activate the step of selectively binning of the column averaged electrical signals from selected photo-sensors within said sub-group to generate the row binning electrical signals, and provide select signals to activate the step of selectively averaging of the column averaged electrical signals to selectively generate the row averaged electrical signals.

59. The apparatus for photo-sensor image resolution adjustment of claim 58 comprising:

means for determining an averaging light intensity signal;

means for providing select signals to activate binning said column averaged electrical signals for generating said row binning electrical signals, if said averaging light intensity signals indicates a low intensity light environment.

60. The apparatus for photo-sensor image resolution adjustment of claim 59 comprising:

means for providing select signals to activate row averaging said column averaged electrical signals for generating said row averaging electrical signals, if said averaging light intensity signals indicates a high intensity light environment.

61. The apparatus for photo-sensor image resolution adjustment of claim 58 further comprising:

means for sampling and holding the light conversion electrical signals from selected photo-sensors for averaging; and means for providing timing, control, and select signals for sampling and holding said light conversion electrical signals.

62. The apparatus for photo-sensor image resolution adjustment of claim 61 wherein means for selectively binning comprises a row binning circuit, said row binning circuit comprising:

a signal integrator that additively combines said row averaged electrical signals for photo-sensors having said common colors on the rows of each of said plurality of said sub-groups of said array of photo-sensors to selectively generate said row binning electrical signals for said rows of said plurality of said sub-group of photo-sensors having common colors of said array of photo-sensors.

63. The apparatus for photo-sensor image resolution adjustment of claim 62 wherein said signal integrator comprises:

a sampling capacitor connected to receive and sample said column averaged electrical signals;

an operational amplifier in communication with said sampling capacitor to receive and amplify the sampling of said column averaged electrical signals;

a feedback capacitor connected to transfer a row accumulation signal integrating said column averaged electrical signals for photo-sensors having said common colors on the rows of each of said plurality of said sub-groups of said array of sensors from an output of said operational amplifier to input of said operational amplifier such that said row accumulation signal and a current column averaged signal of one row of said rows of said photo-sensors having said common attributes on the rows of each of said plurality of said sub-groups of said array of photo-sensors are additively combined to generate said row binning electrical signal.

64. The apparatus for photo-sensor image resolution adjustment of claim 63 wherein the signal integrator further comprises:

a first sampling switch in communication with said sampling capacitor to control said sampling of said column electrical signals;

a second sampling switch in communication between said sampling capacitor and said operational amplifier to control additively combining of said column averaged electrical signals and the row accumulation signal; and a feedback capacitor reset switch in communication between a top and a bottom plate of the feedback capacitor to remove said row binning electrical signals at completion of said additive combining said column averaged electrical signals for photo-sensors having said common on the columns of each of said plurality of said sub-groups of said array of photo-sensors.

65. The apparatus for photo-sensor image resolution adjustment of claim 63 further comprising:

a means for isolating said light conversion electrical signals, said column averaged electrical signals, said row averaged electrical signals, and row binned electrical signals from effects of a parasitic capacitor.

66. The apparatus for photo-sensor image resolution adjustment of claim 62 wherein the row binning circuit further comprises an amplifier connected to selectively receive one of a group of electrical signals comprising the light conversion electrical signals, the row averaging electrical signals, and the row binning electrical signals to amplify and condition said selected electrical signals for external processing.

67. The apparatus for photo-sensor image resolution adjustment of claim 57 wherein said means for row averaging comprises a row averaging circuit, and wherein said means for column averaging comprises a column averaging circuit, said row averaging circuit comprising:

a plurality of row averaging switches, each row averaging switch connected to the column averaging circuit to receive column averaged electrical signals for sensors with said common colors on the rows of each of said plurality of sub-groups of said array of image photo-sensors to average the column averaged light conversion electrical signals to create the row averaged electrical signals, each of said plurality of row averaging switches to selectively connect said column averaging circuits of sensors having said common colors on the rows of each of said plurality of sub-groups of said array of image photo-sensors.

68. The apparatus for photo-sensor image resolution adjustment of claim 57 wherein said means for column averaging comprises a column averaging circuit, said column averaging circuit comprising:

a first plurality of averaging capacitors, each averaging capacitor connected to receive the light conversion electrical signal from the photo-sensors of a photo-sensor having a common color of the array of image photo-sensors on the columns; and a first plurality of averaging switches connected to receive the electrical signal from an adjacent photo-sensor on said columns to selectively transfer said electrical signal from said adjacent photo-sensor to a first selected averaging capacitor to average the conversion electrical signals from an attached photo-sensor and the adjacent photo-sensors, each of said first plurality of averaging switches in to selectively connect one said averaging capacitors to average the light conversion electrical signals of said adjacent photo-sensors of the array of image photo-sensors on the columns.

69. The apparatus for photo-sensor image resolution adjustment of claim 68 wherein the column averaging circuit further comprises:

a second plurality of averaging capacitors, each averaging capacitor connected to receive the light conversion electrical signal from the photo-sensors of a photo-sensor having the common color of the array of image photo-sensors on the columns; and a second plurality of averaging switches connected to receive the light conversion electrical signals from the adjacent photo-sensor on said rows to selectively transfer said electrical signal from said adjacent photo-sensor to a selected second averaging capacitor to average the electrical signals from an attached sensor and the adjacent photo-sensors, each of said second plurality of averaging switches to selectively connect said second averaging capacitors to average the light conversion electrical signals of said adjacent photo-sensors of the array of image photo-sensors on the rows.

70. The apparatus for photo-sensor image resolution adjustment of claim 57 wherein said photo-sensors are active pixels sensors and said light is impinging upon said array of active pixel sensors to convert the light to the light conversion electrical signal.

* * * * *

UNITED STATES PATENT AND TRADEMARK OFFICE
CERTIFICATE OF CORRECTION

| | | |
|---|---|---|
| PATENT NO. | : 7,479,994 B2 | Page 1 of 1 |
| APPLICATION NO. | : 10/999875 | |
| DATED | : January 20, 2009 | |
| INVENTOR(S) | : Guang Yang et al. | |

It is certified that error appears in the above-identified patent and that said Letters Patent is hereby corrected as shown below:

Title Page, Item (56)
In the References Cited (56), add -- 7,593,047 Funakoshi et al., 7,256,831 Iizuka, 7,515,183 Yang et al., 2002/0064980 Zhu, 7,548,261 Yang et al., --

In the OTHER PUBLICATIONS add -- XP-002967923, "Programmable Multiresolution CMOS Active Pixel Sensor," by Roger Panicacci et al., pp. 23-30, Center for Space Microelectronics Technology, Jet Propulsion Laboratory - California Institute of Technology, Pasadena, California. --

Signed and Sealed this
Twenty-fourth Day of January, 2012

David J. Kappos
*Director of the United States Patent and Trademark Office*